(12) United States Patent
Jagtap et al.

(10) Patent No.: US 9,754,303 B1
(45) Date of Patent: *Sep. 5, 2017

(54) SERVICE OFFERING TEMPLATES FOR USER INTERFACE CUSTOMIZATION IN CITS DELIVERY CONTAINERS

(71) Applicants: Sameer S. Jagtap, Austin, TX (US); Muhammad Arif, Islandia, NY (US); Manoj K. Thopcherneni, Roslyn, NY (US)

(72) Inventors: Sameer S. Jagtap, Austin, TX (US); Muhammad Arif, Islandia, NY (US); Manoj K. Thopcherneni, Roslyn, NY (US)

(73) Assignee: CA, Inc., New York, NY (US)

(*) Notice: Subject to any disclaimer, the term of this patent is extended or adjusted under 35 U.S.C. 154(b) by 714 days.

This patent is subject to a terminal disclaimer.

(21) Appl. No.: 14/045,379

(22) Filed: Oct. 3, 2013

(51) Int. Cl.
*G06Q 30/00* (2012.01)
*G06Q 30/06* (2012.01)

(52) U.S. Cl.
CPC ..... *G06Q 30/0621* (2013.01); *G06Q 30/0601* (2013.01); *G06Q 30/0603* (2013.01); *G06Q 30/0631* (2013.01); *G06Q 30/0641* (2013.01)

(58) Field of Classification Search
CPC ............ G06Q 30/0601–30/0645; G06Q 30/08
(Continued)

(56) References Cited

U.S. PATENT DOCUMENTS 8,261,295 B1  9/2012  Risbood et al.
8,429,540 B1  4/2013  Yankovich et al.
(Continued)

FOREIGN PATENT DOCUMENTS

DK   WO 2009109925 A2 *  9/2009  ............... G06F 8/63
WO      2013/166682 A1     5/2012

OTHER PUBLICATIONS

NetSuite, The Customizable Cloud: How the cloud provides the more flexible alternative to legacy ERP platforms, 2011, pp. 1-6, [accessed at http://www.netsuite.com/portal/pdf/wp-customizable-cloud-erp-platforms.pdf].*

(Continued)

*Primary Examiner* — Resha Desai
*Assistant Examiner* — Lindsey Smith
(74) *Attorney, Agent, or Firm* — Baker Botts L.L.P.

(57) ABSTRACT

A system, apparatus, method, and computer program product are provided that receive first input via a console to configure a plurality of different combinations of performance parameters that correspond to a manner in which a service may be provided, wherein the console is configured to provide a plurality of other services. The system, apparatus, method, and computer program also publish a plurality of user-facing interfaces to a service request catalog as a plurality of different service offerings, wherein the plurality of different service offerings correspond to the plurality of different combinations of performance parameters for the service. Further, the system, apparatus, method, and computer program initiate the service in a manner that corresponds to one of the plurality of different combinations of performance parameters for one of the plurality of service offerings when that one of the plurality of service offerings is selected with second input received via the console.

21 Claims, 8 Drawing Sheets

(58) Field of Classification Search
USPC .................................................. 705/26.1–27.2
See application file for complete search history.

(56) References Cited

U.S. PATENT DOCUMENTS

| | | |
|---|---|---|
| 2002/0004818 A1 | 1/2002 | Lansio et al. |
| 2004/0015956 A1 | 1/2004 | Barfield et al. |
| 2006/0075399 A1 | 4/2006 | Loh et al. |
| 2006/0224741 A1 | 10/2006 | Jackson |
| 2007/0038934 A1* | 2/2007 | Fellman ............... G06F 9/4443 |
| | | 715/700 |
| 2008/0184225 A1 | 7/2008 | Fitzgerald et al. |
| 2008/0244577 A1 | 10/2008 | Le et al. |
| 2008/0301024 A1 | 12/2008 | Boss et al. |
| 2010/0131084 A1 | 5/2010 | Van Camp |
| 2010/0131948 A1 | 5/2010 | Ferris |
| 2011/0214123 A1 | 9/2011 | Lublin et al. |
| 2011/0239039 A1 | 9/2011 | Dieffenbach et al. |
| 2011/0265164 A1 | 10/2011 | Lucovsky et al. |
| 2011/0295998 A1 | 12/2011 | Ferris et al. |
| 2012/0005346 A1 | 1/2012 | Burckart et al. |
| 2012/0030672 A1 | 2/2012 | Zygmuntowicz et al. |
| 2012/0089666 A1* | 4/2012 | Goswami ............. G06Q 10/103 |
| | | 709/203 |
| 2012/0174096 A1 | 7/2012 | Conover |
| 2012/0203823 A1 | 8/2012 | Manglik et al. |
| 2013/0060928 A1 | 3/2013 | Shao |
| 2013/0151680 A1 | 6/2013 | Salinas et al. |
| 2013/0204849 A1 | 8/2013 | Chacko |
| 2013/0211927 A1* | 8/2013 | Kellogg ................... G06N 7/00 |
| | | 705/14.73 |
| 2013/0227089 A1 | 8/2013 | McLeod et al. |
| 2013/0227560 A1 | 8/2013 | McGrath et al. |
| 2013/0232463 A1 | 9/2013 | Nagaraja et al. |
| 2013/0232470 A1 | 9/2013 | Yung |
| 2013/0232498 A1 | 9/2013 | Mangtani et al. |
| 2013/0254755 A1 | 9/2013 | Yousouf et al. |
| 2013/0275596 A1 | 10/2013 | Subramaniam |
| 2013/0297668 A1 | 11/2013 | McGrath et al. |
| 2014/0040883 A1 | 2/2014 | Tompkins |
| 2014/0053150 A1 | 2/2014 | Barnett et al. |
| 2014/0059226 A1 | 2/2014 | Messerli et al. |
| 2014/0089509 A1 | 3/2014 | Akolkar et al. |

OTHER PUBLICATIONS

United States Patent and Trademark Office, Notice of Allowance issued in related U.S. Appl. No. 13/973,675, mailed Dec. 1, 2016.
United States Patent and Trademark Office, Non-Final Rejection issued in related U.S. Appl. No. 13/618,352 (now U.S. Pat. No. 9,311,161), mailed Jul. 7, 2014.
United States Patent and Trademark Office, Final Rejection issued in related U.S. Appl. No. 13/618,352 (now U.S. Pat. No. 9,311,161), mailed Dec. 12, 2014.
United States Patent and Trademark Office, Non-Final Rejection issued in related U.S. Appl. No. 13/618,126 (now U.S. Pat. No. 9,274,843), mailed Feb. 18, 2015.
United States Patent and Trademark Office, Advisory Action issued in related U.S. Appl. No. 13/618,352 (now U.S. Pat. No. 9,311,161), mailed Feb. 25, 2015.
United States Patent and Trademark Office, Non-Final Rejection issued in related U.S. Appl. No. 13/973,675, mailed Mar. 26, 2015.
United States Patent and Trademark Office, Non-Final Rejection issued in related U.S. Appl. No. 13/618,352 (now U.S. Pat. No. 9,311,161), mailed May 12, 2015.
United States Patent and Trademark Office, Non-Final Rejection issued in related U.S. Appl. No. 13/830,351, mailed Jun. 3, 2015.
United States Patent and Trademark Office, Final Rejection issued in related U.S. Appl. No. 13/618,126 (now U.S. Pat. No. 9,274,843), mailed Jul. 17, 2015.
United States Patent and Trademark Office, Final Rejection issued in related U.S. Appl. No. 13/618,352 (now U.S. Pat. No. 9,311,161), mailed Sep. 4, 2015.
United States Patent and Trademark Office, Final Rejection issued in related U.S. Appl. No. 13/830,351, mailed Oct. 7, 2015.
United States Patent and Trademark Office, Final Rejection issued in related U.S. Appl. No. 13/973,675, mailed Oct. 21, 2015.
United States Patent and Trademark Office, Notice of Allowance issued in related U.S. Appl. No. 13/618,126 (now U.S. Pat. No. 9,274,843), mailed Nov. 6, 2015.
United States Patent and Trademark Office, Advisory Action issued in related U.S. Appl. No. 13/618,352 (now U.S. Pat. No. 9,311,161), mailed Nov. 17, 2015.
United States Patent and Trademark Office, Notice of Allowance issued in related U.S. Appl. No. 13/618,352 (now U.S. Pat. No. 9,311,161), mailed Dec. 17, 2015.
United States Patent and Trademark Office, Non-Final Rejection issued in related U.S. Appl. No. 13/830,351, mailed Mar. 30, 2016.
United States Patent and Trademark Office, Non-Final Rejection issued in related U.S. Appl. No. 13/973,675, mailed Apr. 11, 2016.
United States Patent and Trademark Office, Final Rejection issued in related U.S. Appl. No. 13/973,675, mailed Sep. 21, 2016.

* cited by examiner

SERVICE OFFERING TEMPLATES FOR USER INTERFACE CUSTOMIZATION IN CITS DELIVERY CONTAINERS

BACKGROUND

The present disclosure generally relates to cloud IT services delivery. The disclosed embodiments relate more specifically to a system, apparatus, method, and computer program product that utilize service offering templates to customize user-facing interfaces in CITS Containers.

The information technology (IT) industry is migrating toward automated solutions that are fairly complex and that frequently utilize the point-to-point integration of multiple products and services (e.g., provisioning engines, functional products such as security, external cloud services, etc.) to deliver a complete solution (e.g., a private, hybrid, or public cloud) that addresses a particular market or business need, such as self-service delivery of automated cloud IT services. Frequently, and as a general practice in the industry, such point-to-point integrations are accomplished with lightweight run-book automation (RBA) processes and connectors. Such point-to-point integrations are rapidly gaining acceptance in the industry as a whole. The integration of IT services via RBA-type orchestration technologies, however, presents several challenges.

In purpose-built, multi-product solutions for orchestrating and automating cloud IT services across a breadth of capabilities, the integrity of the products and/or services being delivered is dependent on the integrity of the underlying sets of processes, content, and integrations. Many of those services typically are mission critical and/or chargeable services. And the integrity and supportability of the corresponding processes or process sets must be maintained, managed, and preserved in a production environment without compromising the flexibility of process-based, lightweight integrations and automation so that those processes or process sets can be used in multiple environments.

Each customer environment is unique and may require different variations of processes to match a particular customer's business needs. For example, the process or number of approvals required for the fulfillment of a service request for a first service provider may be different from that of a second service provider, which may be different than the number of approvals required for an enterprise, even though the basic cloud IT service offered by all three generally is the same. That challenge typically is solved by modifying the corresponding process from the process or process set that is delivering the cloud IT service or the multi-product solution as required to suit a particular customer environment or need. That approach, however, is tedious, requires manual intervention, and is prone to errors.

Such errors may break the integrity of the process or process set, which may require potential downtime and/or a thorough re-testing of all other processes in the process or process set to ensure the integrity of the cloud IT service or the multi-product solution being delivered. Moreover, the result of modifying the process or process set is to create one-off implementations, which are difficult to keep track of, manage, and sustain (e.g., fault isolation, updates, diagnosis, etc.). And in an industry that has proliferated a large number of cloud IT services and multi-product solutions that each have a large number of different variations of process-driven integrations that make those services and solutions possible, keeping track of, managing, and sustaining those processes or process sets on an ongoing basis is even more challenging.

Among the specific challenges associated RBA-type orchestration technologies is organizing content related to a cloud IT service into a distributable package. In the context of a cloud IT service delivery solution, the content, processes, connectors, etc. distributed in a particular package are essentially related to and representative of a service. Packaged content, while relatively easy to distribute and configure, loses its context once un-packaged. Accordingly, after content is installed, it is indistinguishable from other processes or content that exists in the environment. In other words, the distributed package is assimilated when it is installed and, therefore, is difficult to manage after that.

Another challenge associated with RBA-type orchestration technologies is that packaged content is easily and necessarily modifiable in the field. Because changes to the content represent changes to the service, managing such changes becomes a crucial and challenging requirement for maintaining the context of the cloud IT service. But even when packaged content correctly represents a cloud IT service, it provides no context for the operations, management, or lifecycle of the cloud IT service it represents (e.g., activation/deactivation, entitlements, metering, changes, content updates, etc.). And without the proper context, the integrity of the cloud IT service being delivered, and even the integrity of the entire solution, will depend on the integrity and manageability of the underlying sets of processes and integrations that are packaged for distribution.

In addition, the entitlement context of a cloud IT service must be maintained. Although packaged content may be access controlled, it has no service context of entitlements. Moreover, packaged content cannot address dependencies, field updateability, or changes related to the support of content packages. And a packaged content set does not maintain state, while a cloud IT service must maintain state in the context of a particular solution (e.g., "is this service active/in-active"). It is those features, among others, that make keeping track of, managing, and sustaining processes and process sets so challenging.

As a result of the foregoing, adding new services or functionality to an existing cloud implementation often requires going back to the drawing board and creating new deployments, new migration exercises, and/or new product customizations, which may take months of planning and may add to build, support, and maintenance costs and concerns. Accordingly, IT administrators may be required to re-deploy existing cloud implementations or to use multiple cloud portals to handle their cloud service management needs. Such requirements compound the challenges associated with managing, maintaining, and updating cloud IT services.

BRIEF SUMMARY

The present disclosure is directed to system, apparatus, method, and computer program product that utilize service offering templates to customize user-facing interfaces in CITS Containers. The apparatus comprises a processor that is configured to execute computer-readable program code. When executed by the processor, the computer-readable program code receives first input via a console to configure a plurality of different combinations of performance parameters that correspond to the manner in which a service may be provided, the console being configured to provide a plurality of other services; publishes a plurality of user-facing interfaces to a service request catalog as a plurality of different service offerings, the plurality of different service offerings corresponding to the plurality of different combinations of performance parameters for the service; and initiates the service in a manner that corresponds to one of the plurality of different combinations of performance parameters for one of the plurality of service offerings when that one of the plurality of service offerings is selected with second input received via the console.

BRIEF DESCRIPTION OF THE DRAWINGS

Aspects of the present disclosure are illustrated by way of example and are not limited by the accompanying figures with like references indicating like elements.

In those figures, like reference numerals refer to like parts, components, structures, and/or processes.

DETAILED DESCRIPTION

Figure 1:
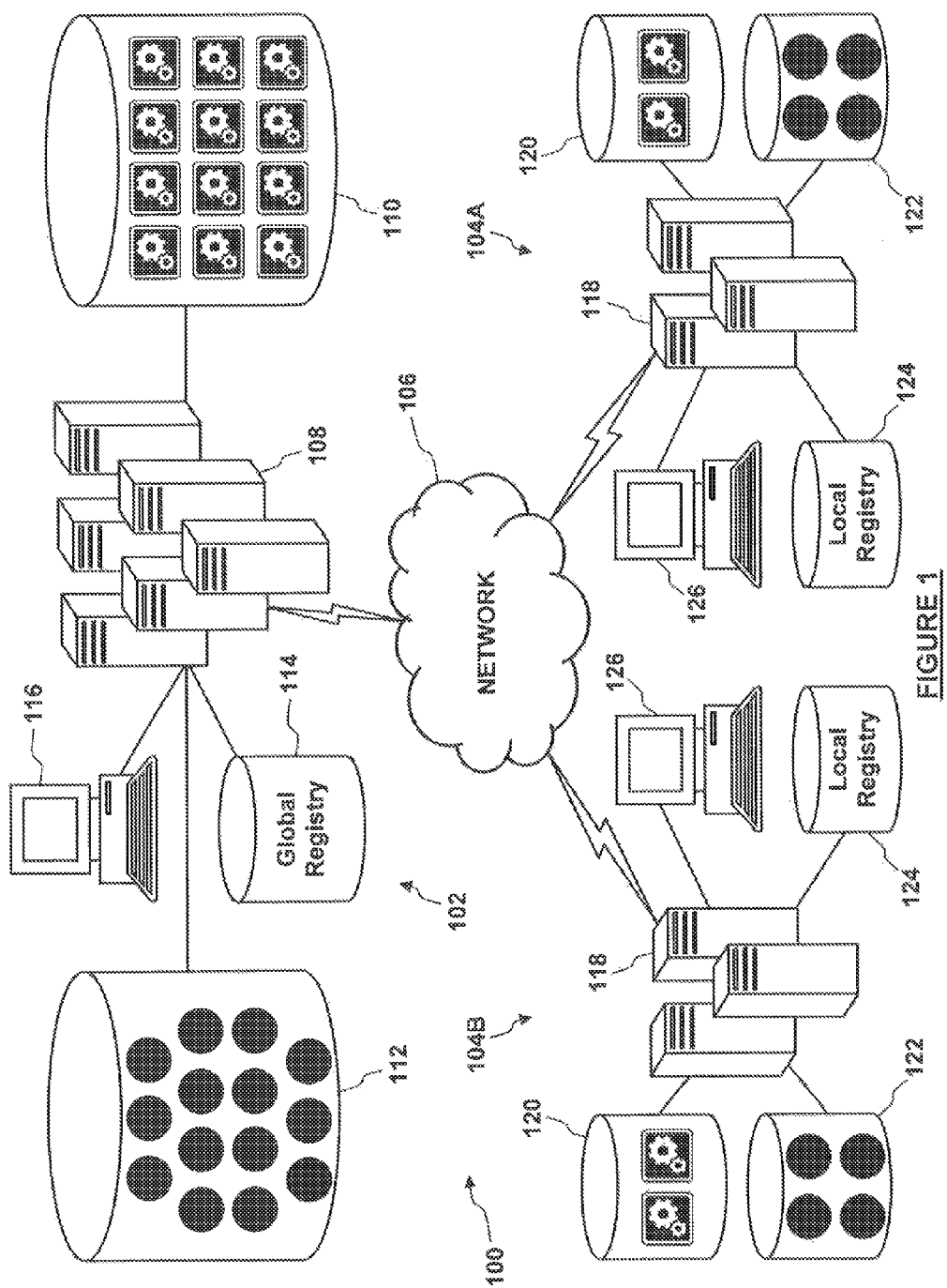
FIG. 1 is a schematic diagram illustrating an example of a communications network according to a non-limiting embodiment of the present disclosure.

As will be appreciated by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to schematic, block, and flow diagrams of systems, methods, apparatuses, and computer program products according to embodiments of the present disclosure. It will be understood that each block of the block and flow diagrams, and combinations of blocks in the block and flow diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the block and/or flow diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the block and/or flow diagram block or blocks. The computer program instructions also may be installed on a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the block and/or flow diagram block or blocks.

The cloud IT service (CITS) Console and CITS Containers disclosed herein provide an exponentially scalable solution model, or framework, that allows for the flexible combination of product capabilities to enable delivery of self-service cloud IT services or service offerings as part of a CITS delivery solution implementation. A hybrid CITS delivery solution is a service delivery solution that enables the definition and metered consumption of cloud IT services or service offerings in a self-service or user-driven manner. The solution model disclosed herein provides a reference architecture for solution administrators and service providers to implement a flexible and modularly expandable CITS delivery solution in a single, pre-integrated solution based on the aggregation and integration of a subset of necessary capabilities provided from multiple underlying products. Via such a pre-integrated solution, solution administrators and service providers may offer a variety of self-service cloud IT services or service offerings to customers without the need to re-deploy that solution to update, modify, or expand those services or service offerings.

The CITS Containers of the disclosed solution model represent portable cloud IT services and service offerings. Those cloud IT services and service offerings may be selected and consumed utilizing orchestrated processes that automate actions initiated by a user. Those user-initiated actions are initiated via user-facing interfaces that may be populated into a service catalog menu, or service request catalog, for access by entitled service consumers or end users of the cloud IT service or service offering. The disclosed system, apparatus, method, and computer program product utilize service offering (SO) templates to restrict or control which user-facing interfaces are exposed to different users in the service request catalog for each cloud IT service and/or service offering that is supported by a CITS Container, rather than exposing all of those user-facing interfaces to all users.

Rather than making a copies of a CITS Container and modifying the copied CITS Container to customize the user-facing interfaces for different users, the disclosed embodiments utilize SO templates to improve the support and manageability of new cloud IT services and service offerings by providing a standardized set of customizable user-facing interfaces that may be implemented across the same or similar cloud IT services and/or service offerings. Such standardization not only ensures that any user-facing interfaces that are customized via the SO template will integrate seamlessly with the other functionality of the solution model, it also ensures that different user-facing interfaces will comprise similar features and functionalities for similar cloud IT services and service offerings, thereby providing a level of familiarity and ease of use for consumers of those cloud IT services and service offerings.

Each CITS Container has its own SO template, which contains all the information needed to configure the operations of the cloud IT service(s) and/or service offering(s) that are supported for by the CITS Container. Utilizing that SO template, a service delivery manager (e.g., a service administrator at the cloud IT service provider with privileges to publish cloud IT services and service offerings to a service request catalog) is able to configure the user-facing interfaces in a registered SO template and publish them to a service request catalog as cloud IT services, service offerings, and/or performance parameters utilizing a generic user interface (UI) wizard. The configuration and publication functionality of the UI wizard allow the service delivery manager to choose, for example, which performance parameters of a service offering are exposed to and/or hidden from a service consumer so the service consumer may customize the performance of that service offering.

By way of example, a provisioning service offering may be supported by a central processing unit (CPU), memory, and a disk. Accordingly, the service delivery manage may fix the number of CPUs for that service offering while allowing service consumers to select from two (2) different levels of memory and disk sizes. The UI wizard allows the service delivery manager to pick the performance parameter for the number of CPUs as a hidden parameter with one (1) CPU as the predefined value, while for the memory and disk size performance parameters the service delivery manager may select two (2) values each from which a service consumer may choose when purchases the provisioning service offering. The service delivery manager then may name the resulting combinations of performance parameters as a particular service offering and set various entitlements to determine which service consumers have access to that service offering. The UI wizard also may allow the service delivery manager to customize various other attributes resulting user-facing interfaces before they are published to the service request catalog.

Turning to the drawings, FIG. 1 illustrates a communications network 100 according to a non-limiting embodiment of the present disclosure. The communications network 100 comprises a solution provider system 102 that is in electronic data communication with two (2) service provider systems 104A and 104B via a network connection 106. It should be understood, however, that the communications network 100 depicted in FIG. 1 is illustrative only and may include any number of solution provider systems 102, any number of service provider systems 104A and 104B, and any number of other systems (e.g., service consumer systems, external resource provider systems, etc.).

The solution provider system 102 is maintained by a solution administrator that offers cloud IT management software and solutions to support different cloud IT service providers' needs. The solution provider system 102 comprises a plurality of solution servers 108, a central container database 110, a central payload database 112, a central registry database 114, and a solution administrator graphical user interface (GUI) 116. And each of the service provider systems 104A and 104B is maintained by a different cloud IT service provider and comprises a plurality of service servers 118, a local container database 120, a local payload database 122, a local registry database 124, and a service provider GUI 126. It should be understood, however, that the solution provider system 102 and the service provider systems 104A and 104B depicted in FIG. 1 are illustrative only and could include any number of each of those network devices 108-126, as well as any number of other network devices (e.g., routers, load balancers, etc.). Because the first service provider system 104A and the second service provider system 104B comprise the same types of network devices 118-126 and operate in a similar manner, any one of those systems 104A or 104B may be referred to generally herein as "a service provider system 104," "the service provider system 104," or some variation thereof (e.g., "that service provider system 104").

Each of the systems 102, 104A, and 104B within the communications network 100 is configured to communicate with each other system via any suitable network connection 106 that supports such communications, such as a WAN connection. Further, the network devices 108-116 in the solution provider system 102 and the network devices 118-126 in each of the service provider systems 104A and 104B are configured to communicate with each other via any suitable wired or wireless connection that supports such communications, such as a LAN connection, a wireless LAN (WLAN) connection, a WAN connection, a cellular network connection (e.g., a Global System for Mobile Communications (GSM) connection, a Code Division Multiple Access (CDMA) connection, a Long Term Evolution (LTE) connection, etc.), or a combination of two or more of those network connections. And any of the network devices 108-126 in any one of those systems 102, 104A, or 104B may communicate with any of the other network devices 108-126 in any of those systems 102, 104A, and 104B via any combination of those network connections.

The solution servers 108 and the service servers 118 each comprise a processor, a memory, and a network interface. The processor may include any number of suitable CPUs that are configured to execute computer program code embodied on the memory and to perform the various functions of those servers 108 and 118 described below. The memory may include one or more types of memory (e.g., ROM, RAM, EEPROM, etc.) as required to store the computer program code executed by the processor and to support the execution of that code. And the network interface may include any number of suitable interfaces (e.g., modems, mobile browsers, wireless Internet browsers, etc.) that are configured to support communications with and between the various network devices 108-126 in the solution provider system 102 and the service provider systems 104A and 104B, as well as with and between the various systems in the communications network 100.

The solution servers 108 are configured to utilize a reference implementation architecture to model hybrid cloud solutions and to automatically provision, configure, and deploy those hybrid cloud solutions in the service provider's infrastructure in accordance with that reference implementation architecture. Those hybrid cloud solutions may be provisioned to the service provider systems 104A and 104B as a set of software bundles, or packages, that represent the various products and/or applications that are required to provide those hybrid cloud solutions and that comprise all of the automation scripts, configuration scripts, and/or orchestration workflows that are required automatically provision, configure, and deploy any resources upon which those products and/or applications may depend. Those hybrid cloud solutions also may be deployed as self-contained virtual appliances, each of which represents a fully configured hybrid cloud solution.

The solution servers 108 also are configured to provide a central service that may be connected to by multiple CITS delivery solution instances. That central, network-accessible service maintains a library of available CITS Containers 202 (FIGS. 2 and 3) that may be downloaded via the network connection 106 to the local container database 120 within a service provider system 104 for instantiation and implementation in a hybrid cloud solution after the foundation for that solution has been deployed at that service provider system 104. The central service also maintains a library of payloads 208 (FIGS. 2 and 3) that may be utilized to support the services or service offerings of a particular CITS Container 202. Those payloads 208 may be downloaded to the local payload database 122 within a service provider system 104 via the network connection 106. The downloaded payloads 208 then may be utilized to automatically provisioned, configured, and deployed within the context of a particular multi-product or sub-product capability CITS delivery solution. Although the delivery of the CITS Containers 202 and payloads 208 is described above as being performed via the network connection 106, it should be understood that delivery may occur locally, such as via flash memory or a CD-ROM. The CITS Console 200 may be delivered in a similar manner.

Figure 2:
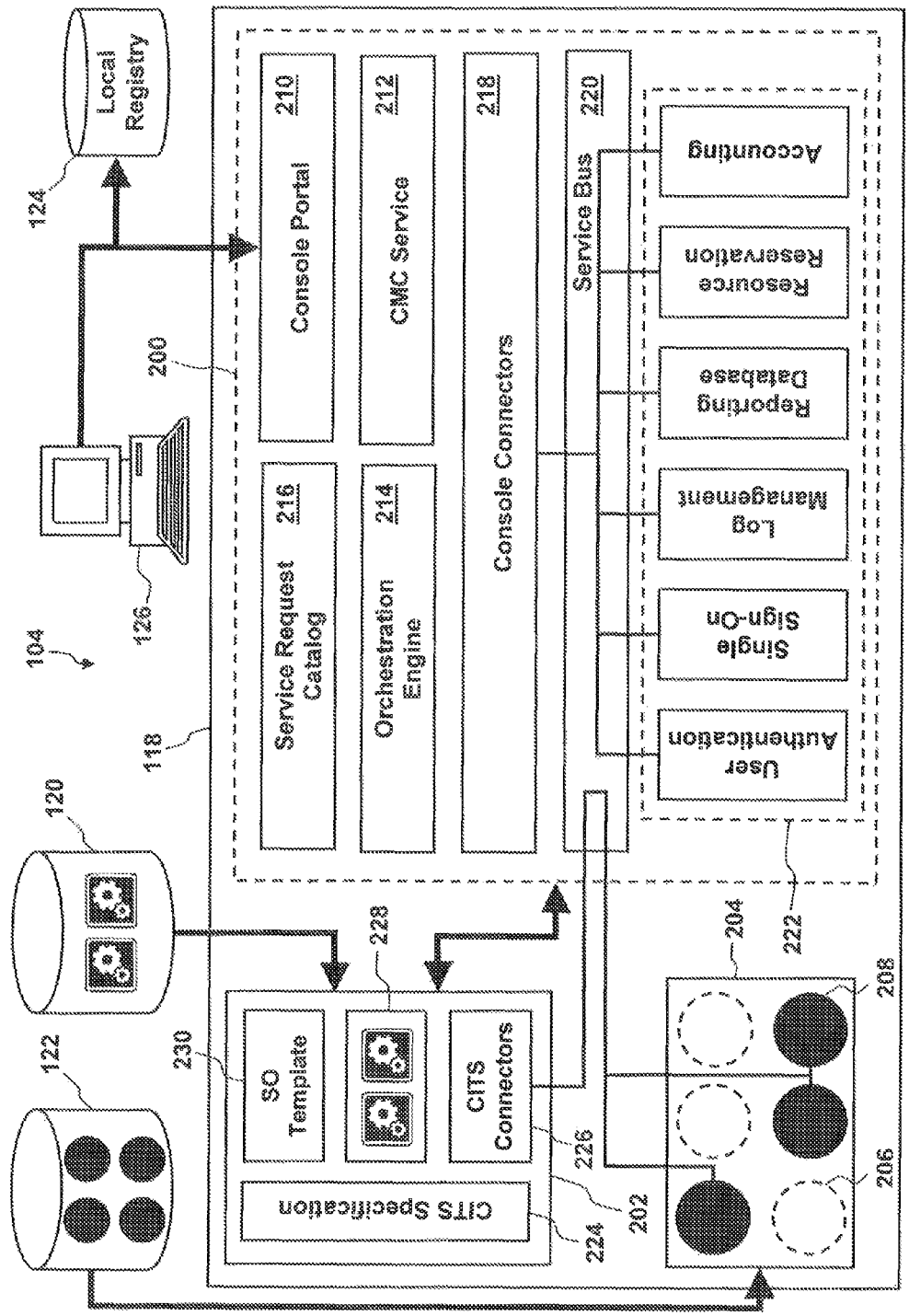
FIG. 2 is a schematic diagram illustrating an example of a service provider system according to a non-limiting embodiment of the present disclosure.

The service servers 118 are configured to provide multi-product or sub-product capability CITS delivery solutions at the service provider systems 104A and 104B. Those hybrid cloud solutions may be deployed on the service servers 118 utilizing a base foundation, or CITS Console 200. The CITS Console 200 forms the basis of the reference implementation architecture utilized by the solution servers 108 to model and deploy those hybrid cloud solutions. And as depicted in FIG. 2, one or more CITS Containers 202 may be plugged into the CITS Console 200 like a cartridge to define the particular cloud IT service(s) or service offering(s) provided by the service servers 118 as part of a hybrid cloud solution. Similarly, each CITS Container 202 may be removed from the CITS Console 200 and replaced with one or more other CITS Containers 202 in a modular manner as required to expand, contract, or otherwise modify the cloud IT services and service offerings provided at the service provider systems 104A and 104B.

Each of the databases 110-114 and 120-124 within the communications network 100 comprises memory that is configured to store data records, files, and other objects for access by a database management system (DBMS). The central container database 110 is configured to store the library of CITS Containers 202 maintained by the solution servers 108; the central payload database 112 is configured to store the library of payloads 208 maintained by the solution servers 108; and the central registry database 114 is configured to store a global registry of supported CITS Containers 202 identified by globally unique identifiers (GUIDs), processes or process sets 228 (FIGS. 2 and 3) identified by GUIDs; container affiliations that are maintained by the solution servers 108, and solution specifications for the reference implementation architectures that are maintained by the solution servers 108 identified by GUIDs. The local container database 120 is configured to store a local library of the CITS Containers 202 downloaded by the service servers 118; the local payload database 122 is configured to store a local library of the payloads 208 downloaded by the service servers 118; and the local registry database 124 is configured to store a local registry of CITS Containers 202 that have been downloaded by the services servers 118 identified by GUIDs, processes or process sets 228 for those downloaded CITS Containers 202 identified by GUIDs, container affiliations for those downloaded CITS Containers 202, and a solution specification for the CITS delivery solution deployed at the service provider system 104 in which the subject services servers 118 reside identified by GUID. Accordingly, the solution servers 108 and service servers 118 each may comprise a DBMS to manage those libraries and registries.

Each of the GUIs 116 and 126 within the communications network 100 comprises a processor, a memory, an input device, an output device, and a network interface. The processor, memory, and network interface may be similar to those described above with respect to the solution servers 108 and the service servers 118. And the input device may include any number of suitable devices that are configured to receive input from a user (e.g., a keypad, a microphone, a camera, a retinal scanner, a print pad, an electronic receiver, a touch screen, etc.), while the output device may include any number of suitable devices that are configured to output data to a user in a meaningful manner (e.g., a display, a printer, a speaker, etc.). Accordingly, each of the GUIs 116 and 126 may be any suitable network device with each of those components (e.g., a personal computer, a tablet computer, a personal digital assistant (PDA), a smartphone, etc.).

As depicted in FIG. 2, the service servers 118 comprise the CITS Console 200, one or more CITS Containers 202, and a payload pool/grid deployment 204 that support the CITS delivery solution provided by a service provider system 104. The CITS Console 200 is configured to provide all of the management and service delivery functions required to implement and operate the CITS Containers 202 such that the common capabilities required to deliver cloud IT services via the CITS Containers 202 are logically separated from the CITS Containers 202, thereby allowing different CITS Containers 202 to be added to, removed from, and managed with the CITS Console 200 via a common framework. The CITS Containers 202 are configured to define the actual cloud IT services or service offerings provided by the service provider system 104 based on the different artifacts of implementation and contents of each CITS Container 202 plugged into the CITS Console 200. And the payload pool/grid deployment 204 is configured to provide a dedicated and secure pool, or grid, of open slots 206 into which each of the payloads 208 that has been downloaded to the local payload database 122 may be instantiated and invoked by one or more of the CITS Containers 202 plugged into the CITS Console 200.

The CITS Console 200 comprises a console portal 210, a Container Management and Configuration (CMC) service 212, an orchestration engine 214, a service request catalog 216, one or more console connectors 218, an intermediary interconnect or service bus 220, and an aggregated set of common capabilities 222. The console portal 210 is configured to provide a self-service user interface via which an authorized user (e.g., the solution administrator or a service administrator at the cloud IT service provider) may access, request, and/or invoke the functionality of the console 200, including the functionality of the CMC Service 212. The CMC Service 212 is configured to provide the functionality via which such authorized users may set the entitlements, accesses, and other privileges of the console portal 210 and may implement, manage, and/or modify the CITS Containers 202 that are plugged into the CITS Console 200.

Figure 3:
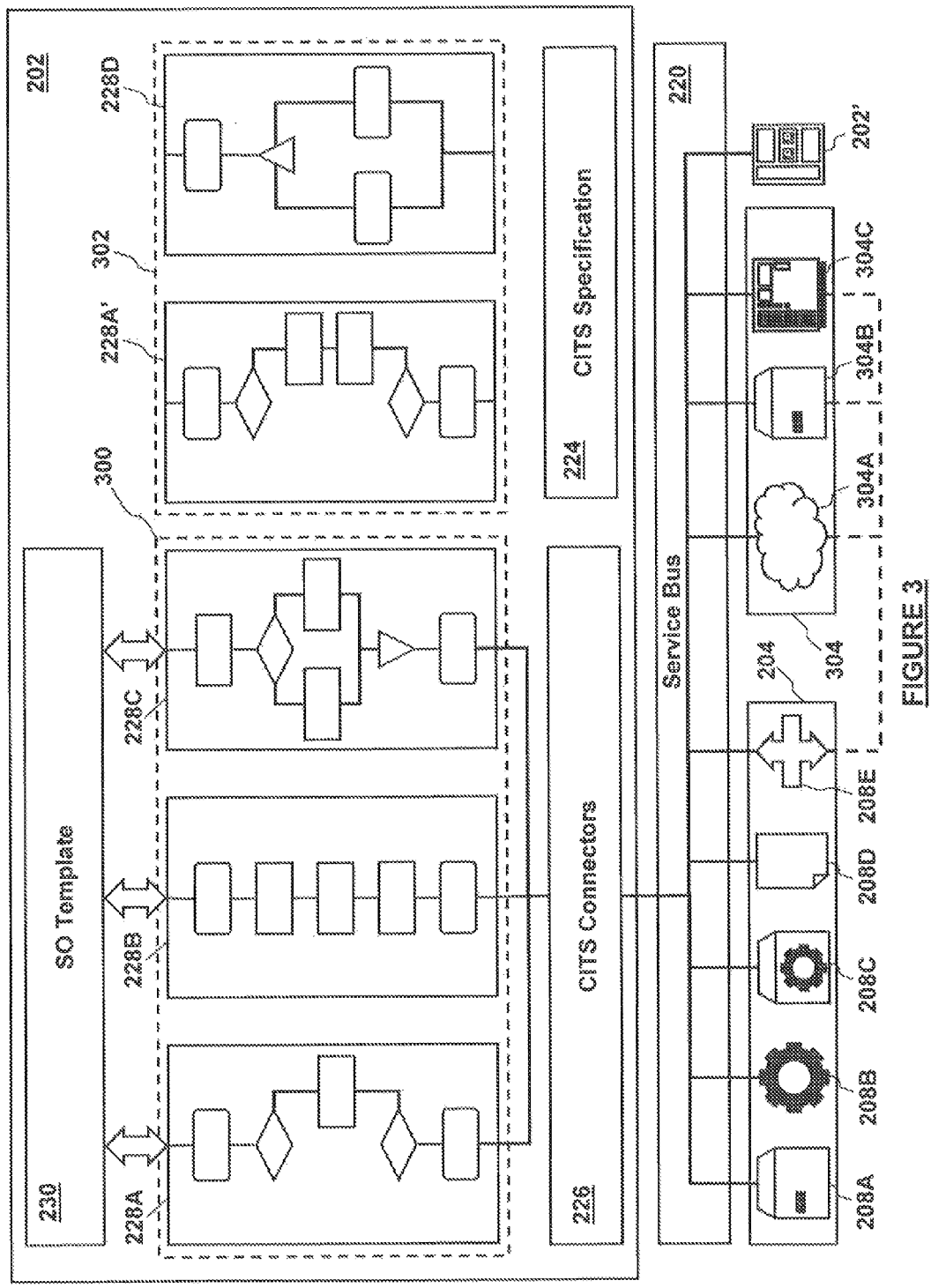
FIG. 3 is a schematic diagram illustrating an example of a cloud service stack according to a non-limiting embodiment of the present disclosure.

The orchestration engine 214 is configured to execute automation scripts, configuration scripts, and/or orchestration workflows provided within CITS specifications 224 of the one or more CITS Containers 202 that are plugged into the CITS Console 200 as required to access, request, and/or invoke the cloud IT services or service offerings of those CITS Containers 202 via the service request catalog 216. The service request catalog 216 is configured to provide a set of user-facing interfaces via which service consumers may access, request, and/or invoke the cloud IT services or service offerings of the one or more CITS Containers 202 that are plugged into the CITS Console 200 in a self-service manner. And the service bus 220 is configured to provide a common integration point or bus via which the CITS Console 200 may connect to the aggregated set of common capabilities 222 and via which the CITS Containers 202 may connect to instantiated payloads 208 and/or external resources 304 (FIG. 3).

The aggregated set of common capabilities 222 comprise those capabilities that are required to enable the functional execution of a cloud IT service or service offering supported by one or more CITS Containers 202. Those capabilities may be provided by one or more IT management products or applications that expose those capabilities 222 via virtualized or neutral operations so that they may be utilized, intelligently orchestrated, or consumed by one or more CITS Containers 202. Those capabilities may be exposed by the service bus 220, and access to those capabilities 222 may be provided by the console connectors 218 of the CITS Console 200 as a corresponding logical operations abstraction for each of those capabilities 222. Thus, each of those capabilities may 222 be provided by integrating the corresponding product or application with or within the CITS Console 200 via the service bus 220.

As illustrated in FIG. 2, for example, the aggregated set of common capabilities 222 comprises user authentication capability, single sign-on (SSO) capability, log management capability, reporting database capability, resource reservation capability, and accounting capability. The user authentication capability is configured to provide identity management and authentication functionality (e.g., creating users, adding users, deleting users, authenticating users, etc.) via which all the user identities and authentication may be uniformly managed. The SSO capability is configured to allow a user to sign onto the CITS Console 200 and access all of the various cloud IT services or service offerings of the CITS Containers 202 plugged into that CITS Console 200, including any payloads 208 and/or external resources 304 required to support those services or service offerings, via a single user ID/password combination. The log management capability is configured to log information regarding the CITS Containers 202 that are downloaded to the service provider system 104 (not just plugged into the CITS Console 200) in the local registry database 124. The reporting database capability is configured to compile the data used by the CITS Containers 202 that are plugged into the console 200 for data analysis, report generation, and/or other data services. The resource reservations capability is configured to create reservations for the resources utilized by the CITS Containers 202 that are plugged into the console 200 to deliver cloud IT services or service offerings. And the accounting capability is configured to provide cost modeling and accounting for the services and resources that are consumed by service providers' tenants.

The foregoing examples of common capabilities 222 generally may be utilized across all of the CITS Containers 202 that are plugged into the Console 200 because they may be utilized to support any type of cloud IT service or service offering. Nevertheless, the aggregated set of common capabilities 222 also may comprise additional capabilities that may be utilized to support only certain types of cloud IT services and service offerings. For example, the aggregated set of common capabilities 222 also may comprise a Service Level Agreement (SLA) management capability that is configured to monitor the performance of certain applications against defined sets of service level objectives that have been agreed to by the solution administrator and the service provider.

Each of the one or more CITS Containers 202 comprises a CITS specification 224, one or more CITS connectors 226, one or more processes or process sets 228, and an SO template 230. The CITS specification 224 comprises a declarative model or schema that is configured to provide all of the information required to identify and automatically implement a particular CITS Container 202, including the various operations and/or interfaces required to manage that particular CITS Container 202 and the information required to download and instantiate any payload(s) 208 and/or external resources 304 required to provide the services that are supported by that particular CITS Container 202. Each of the one or more CITS connectors 226 comprises a logical or abstracted resource definition that provides logical operations for connecting a particular CITS Container 202 to the physical implementations of the payloads 208 and/or external resources 304 upon which the service of that particular CITS Container 202 may depend, such as a resource management capability or an external product or service. Each of the one or more process sets 228 is configured to define one or more operation that may be invoked to provide the actual service(s) or service offering(s) that are supported by a particular CITS Container 202, as well as any operations and/or interfaces that may be invoked by the CMC Service 212 to manage that particular CITS Container 202. And the SO template 230 is configured to provide standardized set of operations and/or interfaces that provide functionality for service consumers to access, request, and/or invoke the cloud IT services or service offerings supported by a particular CITS Container 202 via the service request catalog 216. The SO template 230 also is configured to provide functionality for service delivery managers (e.g., service administrators at the cloud IT service provider with privileges to publish cloud IT services and service offerings to the service request catalog 216) to select the attributes of the user-facing interfaces that are presented to service consumers in the service request catalog 216.

The console connectors 218 of the CITS Console 200 and the CITS connectors 226 of the CITS Container 202 may provide similar functionality for connecting to resources, except that the CITS connectors 226 are configured to connect a particular CITS Container 202 to resources that may vary between different CITS Containers 202 (e.g., payloads 208 and/or external resources 304), while the console connectors 218 are configured to connect the CITS Console 200 to resources that may be common to all CITS Containers 202 (e.g., the aggregated set of common capabilities 222 and/or external resources 304). Further, the console portal 210 and the service request catalog 216 of the CITS Console 200 may provide similar functionality for users to access, request, and/or invoke the functionality of the CITS Console 200 and CITS Containers 202, respectively, except that the service request catalog 216 provides interfaces for service consumers that may vary between different CITS Containers 202 based on the different SO templates 230 provided in those different CITS Containers 202, while the console portal 210 provides interfaces for service providers that may be standardized across all CITS Containers 202 based on the common functionality of the CITS Containers 202 and the aggregated set of common capabilities 222 of the CITS Console 200. Providing such common functionality in the CITS Console 200 allows certain functionality to be removed from otherwise different CITS Containers 202 and allows unique functionality to be modularly added to and/or removed from the CITS Console 200 by adding CITS Containers 202 to and/or removing CITS Containers 202 from the CITS Console 200.

A CITS Container 202 is not functional until it is plugged into the CITS Console 200, where it may utilize, intelligently orchestrate, or consume the aggregated set of common capabilities 222 of the CITS Console 200. Flexibility and modularity is provided in the disclosed CITS delivery solution model at least in part by aggregating such common capabilities 222 in the CITS Console 200 and logically separating them from the intelligence, resources, and discreet capabilities of the cloud IT services or service offerings supported by the CITS Containers 202. As a result, CITS Containers 202 and their respective cloud IT services and service offerings may be modularly added to and/or removed from a service provider systems 104 by adding them to and/or removing them from its CITS Console 200. And as those CITS Containers 202 are added to and/or removed from the CITS Console 200, they flexibly expand, shrink, consume, and/or operate the aggregated set of common capabilities 222 provided in the CITS Console 200. As such, the components 210-222 of the CITS Console 200 operate together to form the basis of a cloud IT service delivery platform, while the CITS Containers 202 flexibly and modularly plug into the CITS Console 200 to define the actual cloud IT services and service offerings provided by that cloud IT service delivery platform based on the artifacts of implementation and contents of the CITS Container 202.

When plugged into the CITS Console 200, a CITS Container 202 may connect to certain products, applications, appliances, or external services to support a particular cloud IT service, service offering, or CITS Container 202. Such products, applications, appliances, external services, and CITS Containers 202 may reside or depend upon certain physical resources. For example, a management or business application may reside on a physical or virtual infrastructure, or it may exist as a virtual appliance of any type (e.g., a hypervisor). The artifacts of implementation of each CITS Container 202 are provided within each CITS Container 202 and may comprise service interface templates; service definition models or schema; container operations and management interfaces; automation scripts; configuration scripts; files; orchestration workflows that implement such interfaces, scripts, and files; console connectors; logical resources represented by logical resource connectors; and logical resource connectors for connecting logical resources to physical resources or underlying capabilities supporting operations for the logical resource connectors. A CITS Container 202 also may comprise manifest descriptors that enable the corresponding CITS Container 202 to deliver or extend its capabilities or services to include those provided by dependent management or business applications or virtual appliance instances that contain such management or business application as a self-service cloud IT service or service offering.

Utilizing a service provider GUI 126, a cloud IT service provider may access the CMC Service 212 via the console portal 210 to implement, manage, and/or modify the CITS Containers 202 that are plugged into the CITS Console 200 and to set the entitlements, accesses, and other privileges for each of the services supported by each of those CITS Containers 202. The services supported by each of those CITS Containers 202 represent a cloud IT service instance, and the CMC Service 212 is configured to operate in that cloud IT service instance in the context of a particular hybrid CITS delivery solution instance deployed by a particular service provider. Accordingly, each of the service provider systems 104A and 104B in the communications network 100 may have its own CITS Console 200 for implementing, managing, and/or modifying the CITS Containers 202 in that service provider system 104A and 104B.

A cloud IT service provider may implement, or plug in, a CITS Container 202 at the CITS Console 200 of a service provider system 104 via the CMC Service 212 by downloading the CITS Container 202 from the solution provider system 102. That download initiates an autonomic process in which the CMC Service 212 automatically implements a CITS Container 202 in a hybrid CITS delivery solution by downloading the CITS Container 202 to the local container database 120 from the central container database 110; instantiating the CITS Container 202 in the context of the solution; reading and decomposing the CITS specification 224; executing container automation scripts that automatically invoke a download from the central payload database 112 to the local payload database 122 of any payload(s) 208 that may be required to implement that CITS Container 202; and establishing a connection with the downloaded payload(s) 208 by invoking payload configuration scripts in the CITS specification 224 to automatically configure, or pair, each CITS Container 202 with its corresponding payload(s) 208. In a similar manner, the CMC Service 212 also may implement a CITS Container 202 that already has been downloaded to the local container database 120 utilizing payloads 208 that already have been downloaded to the local payload database 122. In the absence of the CMC Service 212, such implementation may be performed manually.

Upon implementation in a CITS Console 200, a CITS Container 202 utilizes a declarative model to define the cloud IT services and/or service offerings that it supports. That model also defines the user-facing interfaces required to offer, invoke, and operate the cloud IT services and/or service offerings of the CITS Container 202 via the service request catalog 216, as well as the user-facing interfaces required to manage the CITS Container 202 with the CMC Service 212 via the console portal 210. Those user-facing interfaces are implemented with automation, such as orchestration workflows, to provide flexibility in implementation. Further, just as the user-facing interfaces of the console portal 210 may be standardized across all CITS Containers 202 based on the common functionality of the CITS Containers 202 and the aggregated set of common capabilities 222 of the CITS Console 200, the user-facing interfaces of the service request catalog 216 may be standardized across all of the cloud IT services and/or service offerings that are supported by a particular CITS Container 202. Those standardized interfaces provide a level of abstraction so that the shared features of different CITS Containers 202 can be managed in a uniform manner via the console portal 210 and the shared features of different cloud IT services and/or service offerings of a particular CITS Container 202 can be invoked and operated in a uniform manner via the service request catalog 216.

The standardized interfaces of the service request catalog 216 are published to the service request catalog 216 from the SO templates 230 of the CITS Containers 202 based on selections made by a service delivery manager. Those SO templates 230 define the declarative model, format, and operations of the user-facing interfaces that are published to the service request catalog 216 for a particular type or category of cloud IT service or service offering supported by the corresponding CITS Container 202. And as described above, those SO templates 230 are provided in the CITS Containers 202, rather than in the CITS Console 200, because different user-facing interfaces within the service request catalog 216 may be required for different CITS Containers 202 based on the different cloud IT services and/or service offerings supported by those different CITS Containers 202. Nevertheless, some of the differences between the cloud IT services and/or service offerings provided by a particular CITS Container 202 may not to be of particular interest or importance to certain service consumers. Accordingly, those differences may be abstracted utilizing the SO template 230 of the corresponding CITS Container 202 so that only certain information is published to the service request catalog 216.

For example, a CITS Container 202 may support the same type of cloud IT service (e.g., a virtual desktop) with a plurality of different service offerings (e.g., a VMWARE brand virtual desktop versus a CITRIX brand virtual desktop), and a service consumer may not be interested in or assign importance to the underlying technology utilized to support that cloud IT service. Accordingly, those differences can be abstracted utilizing the SO template 230 of the corresponding CITS Container 202 so that only a general service (e.g., a virtual desktop) and certain performance parameters (e.g., number of desktops, security, and pricing) are published to the service request catalog 216. The service consumer then may choose the desired performance parameters of that service from the user-facing interfaces of service request catalog 216, and the CMC Service 212 may automatically instantiate, configure, and activate whichever of the service offerings (e.g., the VMWARE brand virtual desktop or the CITRIX brand virtual desktop) that operates with the desired performance parameters, regardless of the underlying technology utilized to provide the subject service offering. Accordingly, the service consumer may not be aware of the underlying technology utilized to provide the subject service offering.

Before the user-facing interfaces for a particular cloud IT service or service offering are published to the service request catalog 216, a service delivery manager may select the attributes of those user-facing interfaces utilizing a UI wizard, which may be provided as part of the functionality of the CMC Service 212. Accordingly, the service delivery manager may access the functionality of the UI wizard via the console portal 210. That functionality is configured to operate with the different SO templates 230 of the different CITS Containers 202 so that, like the other functionality of the CMC Service 212, it may be utilized uniformly across a plurality of different CITS Containers 202.

Among the attributes that a service delivery manager may select via the UI wizard are the type of cloud IT services and/or service offerings that are available for consumption from one or CITS Containers 202 that are plugged into the CITS Console 200, the available performance parameters of each of those cloud IT services and/or service offerings, and the appearance of that information in the service request catalog 216. The available types of cloud IT services and/or service offerings may comprise, for example, security services, data management services, claims processing services, virtual desktop services, or other cloud-based services. The available performance parameters for each type of service and/or service offering may comprise, for example, pricing (e.g., monthly costs, service credits, etc.), service details (e.g., level(s) of approval, data architecture(s), claim approval process(es), etc.), service metrics (e.g., service volume, service quality, service availability, etc.), resource details (e.g., physical parameters such as the number of CPUs and amount of RAM, operational parameters such as processing speeds and connection speeds, operating system platform, etc.), and reference values (e.g., requests per second handled, number of process executions results from each request, etc.). And the appearance of that information may be defined, for example, by different fonts, colors, icons, verbiage, and other mechanisms for graphically representing information. Thus, a service delivery manager may utilize the UI wizard not only to select which services and performance parameters are presented to a service consumer in the service request catalog 216, but also to customize the manner in which that information is presented to a service consumer in the service request catalog 216. And providing all of those options within an SO template 230 specifically configured to operate with the service request catalog 216, the resulting user-facing interfaces may be seamlessly integrated with the other functionality of the CITS Console 200.

The user-facing interfaces selected from the SO template 230 may be presented to service consumers, for example, as selectable options on a display at a service provider GUI 126, and the UI wizard provides functionality for a service delivery manager to determine which of those options are available via the service request catalog 216 on a service-by-service and/or consumer-by-consumer basis. For example, for a more sophisticated service consumer, the service delivery manager may utilize the UI wizard to allow that service consumer to select different performance parameters for a particular cloud IT service or service offering (e.g., select the number of CPUs, select the amount of storage, etc.), while for a less sophisticated service consumer, the service delivery manager may utilize the UI wizard to limit the number of options to only the type of service and/or or service offering available to that service consumer. The service delivery manager also may utilize the UI wizard to establish different pricing for the different options selected. And because the service delivery manager may do so on a consumer-by-consumer basis, different pricing may be established for different service consumers, even for the exact same service and/or service offering.

The functionality of an SO template 230 may be initiated when the corresponding CITS Container 202 is first plugged into a CITS Console 200 so that the user-facing interfaces for the cloud IT services and/or service offerings supported by that CITS Container 202 may be selected before those user-facing interfaces are published to the service request catalog 216. For example, a set of orchestration workflows contained within the SO template 230 may be invoked to initiate a process (e.g., FIG. 8) whereby a service delivery manager is prompted to select the particular service offerings that will be made available for consumption from the subject CITS Container 202, the performance parameters that a may be selected each of for those service offerings, and the appearance that those options will have in the service request catalog 216. That process also may include invoking additional workflows that transmit the proposed publication through different departments at the service provider (e.g., accounting, marketing, etc.) to obtain approval for such things as the pricing, appearance, and verbiage that have been selected for different service offerings, before the user-facing interfaces for those service offerings are published to the service request catalog 216. Those workflows may be consumed or executed within the orchestration engine 214 of the CITS Console 200.

Similarly, when the published user-facing interfaces for a particular cloud IT service or service offering are selected/invoked by a service consumer, a set of orchestration workflows contained within the CITS specification 224 of the CITS Container 202 associated with that interface are invoked to enable that CITS Container 202 for run-time execution. Those workflows are consumed or executed within the orchestration engine 214 of the CITS Console 200 to initiate the cloud IT service or service offering that corresponds to the one selected/invoked user-facing interface. As described above, that cloud IT service or service offering may depend upon the aggregated set of common capabilities 222 of the CITS Console 200, which may be consumed by the orchestration workflows contained within the CITS specification 224 of any CITS Container 202 as part of the implementation of the cloud IT service or service offering that it supports. In addition, a CITS Container 202 may depend upon and/or perform operations defined for logical resources as part of the implementation of a particular cloud IT service or service offering.

A CITS Container 202 may or may not comprise logical resources, depending on the type of cloud IT service or service offering that it supports and whether that cloud IT service or service offering depends upon any type of resource or resources. Logical resources represent physical resources (e.g., products, appliances, physical machines, etc.) and/or or functional capabilities (e.g., services, managed objects, datacenter elements such as backup, monitoring, etc.) and define the operations that may be performed on the physical resources and/or functional capabilities that they represent. In the CITS Console 200, logical resources are represented by console connectors 218. And in a CITS Container 202, logical resources are represented by CITS connectors 226.

An example of a logical resource that may be represented by a console connector 218 or a CITS connector 226 is a virtual machine. The physical implementation of a virtual machine may be a virtual machine for VMWARE brand hypervisor, a physical virtual machine for hyper-v hypervisor, or a physical virtual machine for Elastic Compute Cloud ($EC^2$) brand services. A disk is also an example of a logical resource that may be represented by a console connector 218 or a CITS connector 226, and its physical implementation is a disk manager appliance.

Although the logical implementations of such resources generally are the same from one system to another, the physical implementations of those resources may vary. As a result, the same resource may require different translations from its logical implementation to its physical implementation depending on the system in which that resource resides. Accordingly, a single CITS Container 202 may comprise different CITS connectors 226 that represent the same logical resource but that provide different translations so that the subject CITS Container 202 may be utilized with a plurality of different systems, resources, and/or CITS Consoles 200. By contrast, the CITS Console 200 may have a single console connector 218 for each resource upon which it depends because, unlike a CITS Container 202, it does not need to be configured to be utilized with a plurality of different systems. Instead, a CITS Console 200 may be provided as a customized CITS delivery solution by sizing and configuring that CITS delivery solution to operate on a particular service provider system 104, while CITS Containers 200 may be utilized interchangeably between different CITS Consoles 200, regardless of the service provider system 104 on which they have been deployed.

The logical resources and functional capabilities represented by CITS connectors 226 may be provided as payloads 208 and/or external resources 304. They also may be provided by the CITS Console 200. For example, a CITS connector 226 may represent the user authentication capability of the CITS Console 200, wherein the CITS connector 226 for that capability enables the orchestration workflows within CITS Container 202 to authenticate users by performing the operations defined by that CITS connector 226.

For each resource that is represented by a CITS connector 226 in a CITS Container 202 and that is required to support a particular service or service offering, the orchestration engine 214 of the CITS Console 200 may consume or execute the orchestration workflows within the CITS specification 224 of that CITS Container 202 to invoke the resource reservation capability of the CITS Console 200. That resource reservation capability, which is part of the aggregated set of common capabilities 222 of the CITS Console 200, initiates a request for the resources that are represented by the subject CITS connectors 226.

The orchestration engine 214 of the CITS Console 200 also may consume or execute the orchestration workflows within the CITS specification 224 of a particular CITS Container 202 to perform operations on the CITS connectors 226 provided within that CITS Container 202 so that the CITS connectors 226 may be implemented for specific resource providers via the service bus 220 of the CITS Console 200. Thus, the orchestration engine 214 of the CITS Console 200 not only may consume the aggregated set of common capabilities 222 of the CITS Console 200 utilizing the orchestrated workflows in the CITS specification 224 of a CITS Container 202, it also may connect the CITS Container 202 to payloads 208 and/or external resources 304 utilizing those orchestrated workflows to perform operations on the CITS connectors 226 contained within that CITS Container 202.

Although a particular logical resource within a CITS Container 202 may utilize different translations or implementations for different resource providers based on the different resource provider systems in which the corresponding physical resource resides, utilizing CITS connectors 226 at the corresponding CITS Container 202 and performing the operations of the subject resources at the logic layer enables the orchestrated implementations of those logical resources to independently of who the resource provider is or where the resource is located. And rather than being provided in the console connectors 218 of the CITS Console 200, the logical translation abstractions required by a particular CITS Container 202 also may be provided in that CITS Container 202. In either instance, as long as the translation abstraction is available, the orchestrations of the CITS Container 202 may operate at the logic layer independently of who the resource provider is or where the resource is located. Accordingly, the implementation of cloud IT services and/or service offerings via the disclosed embodiments not only is modular, it also is portable and repeatable.

When the resources upon which a CITS Container 202 depends may be implemented utilizing the components 118-126 of the service provider system 104, those resources may be downloaded and instantiated as payloads 208 in the payload pool/grid deployment 204. The payload pool/grid deployment 204 comprises a plurality of open slots 206 where a payload 208 may be instantiated for utilization by one or more CITS Containers 202. In FIG. 2, for example, three (3) payloads 208 have been deployed for the CITS Container 202. And in FIG. 3, for example, five (5) payloads 208 have been deployed for the CITS Container 202.

Although only one CITS Container 202 is depicted in FIGS. 2 and 3, any number of additional CITS Containers 202 also may be plugged into a CITS Console 200. And by virtue of pooling payloads 208 in the payload pool/grid deployment 204, a single instance of any one (1) of those payloads 208 may be utilized by a plurality of CITS Containers 202. Nevertheless, separate instances of a payload 208 also may be provisioned for utilization by separate CITS Containers 202, if required.

To deploy and configure a payload 208, the orchestration engine 214 of the CITS Console 200 utilizes the orchestration workflows of that CITS Container 202 to perform operations that initiate the download, instantiation, and configuration of those payloads 208. For example, automation scripts may be invoked that automatically download any payload(s) 208 that may be required to implement that CITS Container 202 from the central payload database 112 to the local payload database 122 and to instantiate those payload(s) in the payload pool/grid deployment 204. Payload configuration scripts also may be invoked to automatically configure, or pair, each CITS Container 202 with its corresponding payload(s) 208 and/or external resources 304. Such provisioning is performed autonomically by the CITS Console 200 utilizing CITS connectors 226 of the corresponding CITS Container 202 together with the automation scripts, configuration scripts, orchestration workflows, and other information in the CITS specification 224 of the corresponding CITS Container 202.

The CITS Console 200 and/or its associated payload(s) 208 may depend on resources that are provided by a third-party resource provider as external resources 304, such as when sufficient resources are not available at the service provider system 104. Those resources may be physical resources or logical resources. For example, a CITS Container 202 may depend upon a physical resource provided by a third-party resource provider to host a logical resource, and a CITS Container 202 may depend upon a logical resource provided by a third-party resource provider. In the former instance, the logical resource may be deployed and configured as software bundles in a similar manner as described above with respect to payloads 208. And in the latter instance, CITS connector 226 may be utilized to connect the CITS Console 202 to the target resources without the need to invoke automation and configuration scripts to install that logical resource on that physical resource. In either instance, the resource reservation capability of the CITS Console 200 may be utilized to reserve the target resources and orchestration workflows may be invoked to issue physical commands to the corresponding third-party resource providers that may be carried out to deploy and configure the target resources. In response to those commands, the third-party resource provider may return a "completed" or "failed" status based on whether those command results in the successful deployment and configuration of the target resources.

Regardless of whether a resource is provided as or implemented on the components 118-126 of the service provider system 104 or provided as or implemented on an external resource 304 provided by a third-party resource provider, that resource may be connected to a CITS Container 202 via the service bus 220 utilizing a CITS connector 226. As an alternative to connecting a CITS Container 202 to a resource indirectly via the service bus 220, resources also may connect a CITS Container 202 to those resources. And as yet another alternative, a CITS Containers 202 may connect to such resources via standard internet protocols. Accordingly, the CITS connectors 226 in each CITS Container 202 may be configured to provide one or more of those types of connections for any payload 208 and/or external resource 304 upon which that CITS Container 202 and/or its associated payload(s) 208 may depend. It also is possible that a CITS Container 202 and/or its associated payload(s) 208 may not depend upon any resources other than those of the CITS Console 200, in which case no connections are required to any resources, such that the CITS Container 202 is self-sustaining and fully operational (other than its reliance on certain operations of the CITS Console 200) when downloaded from the solution provider system 102.

A cloud IT service provider may manage the CITS Containers 202 downloaded to a service provider system 104 (not just those plugged into the CITS Console 200) via the CMC Service 212 by invoking various Standard Operations supported by the CITS Containers 202 (e.g., Tables 2-4); by collecting, tracking, and recording usage metrics and events associated with the CITS Containers 202 and the services supported by those CITS Containers 202; and by generating a journaled log of changes to and the current state of the CITS Containers 202. Further, a cloud IT service provider may modify one or more of the downloaded CITS Containers 202 by updating one or more of the downloaded CITS Containers 202 when changes to one or more corresponding CITS Containers 202 are made by the solution administrator that maintains the solution provider system 102 so that the CITS Containers 202 in the local container database 120 remain synchronized and up to date with the corresponding CITS Containers 202. A cloud IT service provider also may modify one or more of the CITS Containers 202 that is plugged into the CITS Console 200 by creating one or more custom operations that may be invoked by one or more of the CITS Containers 202; by modifying one or more existing processes or process sets 228 in one or more of the CITS Containers 202; by creating one or more new processes or process sets 228 in one or more of the CITS Containers 202; by adding one or more processes or process sets 228 to one or more of the CITS Containers 202; and/or by removing one or more processes or process sets 228 from one or more of the CITS Containers 202.

When a cloud IT service provider synchronizes CITS Containers 202 in the local container database 120 of the service provider system 104 with CITS Containers 202 in the central container database 110 of the solution provider system 102, the CITS Containers 202 in the local container database 120 may be updated to reflect changes in a newer version of the same CITS Container 202 in the central container database 110 or to reflect changes in a different CITS Container 202 in the central container database 110 that has similar payload dependencies. Similarly, the CITS Containers 202 in the central container database 110 may be updated to reflect changes to corresponding containers in the local container database 120 of one of the service provider systems 104A or 104B. Changes to CITS Containers 202 in the central container database 110 may, for example, correspond to updates generated by the solution administrator that offers IT management software via the solutions provider system 102 and that are intended for proliferation to all of the service provider systems 104A and 104B in the communications network 100, while changes to CITS Containers 202 in the local container database 120 may, for example, correspond to custom operations or a new processes or process sets 228 generated by the cloud IT service provider that maintains the service provider system 104 and that are intended for use within that service provider system 104. In the latter example, the custom operations and/or new processes or process sets 228 may subsequently be proliferated to all of the service provider systems 104A and 104B in the communications network 100 if their corresponding CITS Container 202 is registered with the solutions provider system 102 via the CMC Service 212.

When a cloud IT service provider creates a custom operation or a new process or process set 228, that cloud IT service provider may utilize the CMC Service 212 to upload that operation or process or process set 228 to the solution provider system 102 for testing, certification, and support approval. After the custom operation or new process or process set 228 is tested for potential problems, certified for use with a particular CITS Container 202, and approved for operation with the CITS Console 200, it is added to the global registry, together with its container affiliation. Such certified and approved processes or process sets 228 are identified in the global registry with unique process GUIDs, which then are provided in the CITS specification 224 of any CITS Container 202 that comprises those processes or process sets 228. Similarly, registered CITS Containers 202 may be identified in the global registry with unique container GUIDs.

If a container GUID is stored in the global registry, then the processes or process sets 228 within the corresponding CITS Container 202 are considered to be supported, valid processes or process sets. And if the container GUID is not registered in the global registry, then the processes or process sets 228 within the corresponding CITS Container 202 are considered to be unsupported processes or processes sets. Nevertheless, unsupported processes or process sets 228 still may be invoked by a CITS Container 202. The same is true for the CITS Container 202 itself. But maintaining such a registry in the central registry database 114 helps ensure that the functional/management applications on which a container instance depends are available and correctly configured, which helps ensure the integrity of the corresponding CITS Container 202 and the services supported by that CITS Container 202.

Further, a cloud IT service provider may set the entitlements, accesses, and other privileges for each of the services that are supported by each of the CITS Containers 202 in the service provider system 104 via the CMC Service 212 by writing them to the CITS specification 224 for the each of the CITS Containers 202. Accordingly, the console portal 210 may be configured to provide consumers, or tenants, of the cloud IT service provider's services with access to those services based on the settings in the CITS specification 224. And those entitlements, accesses, and other privileges may be set in the context of the particular services that are supported by each of the CITS Containers 202 in the service provider system 104, which provides the system-by-system service context for the content of those CITS Containers 202. Moreover, any content added to those CITS Containers 202 (e.g., new processes or process sets 228) will automatically inherit those entitlements, accesses, and other privileges by virtue of their being written in the CITS specifications 224 of those CITS Containers' 202A-202C.

The CITS specification 224 comprises a representation of the object schema definition for the corresponding CITS Container 202. That representation may, for example, be based on a specified standard, such as the Extensible Markup Language (XML) standard, while the object schema definition may be defined in a schema definition file, such as an XML schema definition file (.xsd file). The CITS specification 224 comprises references to and descriptions of the specified operations, automation scripts, configuration scripts, and/or orchestration workflows that are utilized by the CMC Service 212 to perform Management Operations (e.g., Table 2) and Service Operations (e.g., Table 3), such as downloading, instantiating, and configuring the payloads 208 and/or external resources 304 (FIG. 3) that are required for the successful implementation of the CITS Container 202. And the object schema definition comprises the general specification of the CITS Container 202.

In addition to the CITS specification 224, each CITS Container 202 comprises an active pool 300 of processes or process sets 228A and a passive pool 302 of processes or process sets 228, as illustrated in FIG. 3. Accordingly, the CITS specification 224 also includes the GUIDs that are utilized by the CMC Service 212 to map CITS Container 202 operations to processes or process sets 228 and to track the processes or process sets 228 that are in the active pool 300 and passive pool 302. And because each instance of a CITS Container 202 in a solution context has a unique CITS specification 224, each instance of a CITS Container 202 in a solution context is based on a correspondingly unique object schema definition.

A solution administrator and/or container developer may utilize a Container Editor Tool that operates with the CMC Service 212 to modify a CITS specification 224, as well as the descriptors within that CITS specification 224. Examples of the notations, tags, and attributes that may be provided in the CITS specification 224 and edited with the Container Editor Tool are listed below in Table 1.

TABLE 1

Object Schema Descriptors

| Descriptor | Description/Function |
| --- | --- |
| Container GUID | Unique identifier for container |
| Name | Name of container |
| Date | Date container was certified/released |
| Version | Version Information |
| Patch Level | Current patch level |
| Container Type | Type of service represented by container (e.g., service, resource, etc.) |
| Supported Solution Name(s) | Description of cloud IT service solution supported by container |
| Cloud Service Description | Description of cloud IT service supported by container |
| Functionality Description | Detailed description of service provided/enabled with container |
| Standard Operations | Operations that must be provided by a container |
| Custom Operations | Operations that may optionally be created for a container as defined by the creator |
| Management Operations | Operations that may be utilized to manage a CITS Container |
| Service Operations | Operations that may be utilized to manage the services or service offerings of a CITS Container |
| Resource Operations | Operations that may be utilized to manage the resources required by a CITS Container |
| Custom/Service Operations | Operations that may optionally be created for a container as defined by the creator |
| Operations Enabled | List of operations supported by container |
| Payload Dependency List | List of Appliance/Workflow/Application/Service dependencies for preconfigured payloads |
| Service Type Template | Standardized service template based on type of cloud IT service (e.g., service, resource, etc.) |
| Process GUID | Unique identifier for processes or process sets |
| Active GUIDs | List of all active processes or process sets currently utilized in container |
| Passive GUIDs | List of all non-active processes or process sets included in container |
| Container Dependency List | List of container compatibility with/dependency on other containers |
| Dirty Bit/Support Bit | Maintained bit for determining support |
| State Information | Current state of container (e.g., Downloaded, Installed, Modified, Registered, Active, Inactive, Updated, Unsupported, etc.) |
| Change/History Log | Log of changes wit date/time stamp for modifications |
| Connector/Interface List | List of connector, adapter, and interface details, including version |
| Documentation | Documentation for container (URL or self-contained) |
| Locale | Language Supported |
| Contact Information | Creator/support contact information |

The Dirty Bit/Support Bit referenced in Table 1 is a resettable "support bit" or "dirty bit" that is utilized to maintain the integrity of the CITS Container 202. Modifications made according to rules or allowed policies do not affect the Dirty Bit/Support Bit, while modifications that may compromise the supportability of the container contents may trigger the Dirty Bit/Support Bit. Thus, the Dirty Bit/Support Bit may be reset to a default value on new installation, and any subsequent modifications to the CITS Container 202 may trigger the dirty bit to a non-default value that denotes the type of integrity breech that the CITS Container 202 has sustained.

The Service Type Template referenced in Table 1 corresponds to the SO template 230 provided in each CITS Container 202. As described above, that SO template 230 defines the declarative model, format, and operations of the user-facing interfaces that are published to the service request catalog 216 for a particular type or category of cloud IT service or service offering supported by the subject CITS Container 202. The model, format, and operations defined by each Service Type Template are standardized for each type or category of cloud IT service or service offering so that the user interactions conducted via the console portal 210 and service request catalog 216 appear the same to a user regardless of the payloads 208 or the other products, workflows, services, appliances, applications, and/or devices upon which a CITS Container 202 may depend to provide a particular cloud IT service or service offering. Those user interactions include the selections made by service consumers when requesting certain cloud IT services and/or service offerings via the service request catalog 216, as well as the selections made by a service delivery manager via the UI wizard of the CMC Service 212 when a CITS Container 202 is first plugged in to a CITS Console 200.

For example, a CITS Container 202 may be configured to provide a security service, but different implementations or instances of that CITS Container 202 may implement the service template model with different processes or process sets 228 that depend on different target resources based on the same declarative model and template for the security service. Despite those different instances of the CITS Container 202 utilizing different target resources or workflows to provide that security service, the interfaces and operations provided by the user-facing interfaces of the SO template 230 will remain the same so as to maintain the consistency of user interactions at the CMC Service 212. Thus, service delivery managers may configure the user-facing interfaces published to the service request catalog 216 for different cloud IT services and/or service offerings in a uniform manner, and service consumers may utilize those user-facing interfaces in a uniform manner. Accordingly, the SO templates 230 ensure a level of familiarity with the user-facing interfaces published to the service request catalog 216 so that service delivery managers and service consumers do not need to learn different configurations and user-facing interfaces for each different CITS Container 202 and its respective cloud IT services and service offerings.

The Service Type Template model may be captured as an XML file within the SO template 230 of the subject CITS Container 202. In the alternative, the Service Type Template may be implemented as a link to an external XML template file that is managed by the CMC Service 212. In the latter configuration, the CMC Service 212 operates as an interface between the standard Service Type Template and one or more cloud IT services or service offerings that implement that standard Service Type Template so that the user interactions at the CMC Service 212 remain consistent. Moreover, different CITS Containers 202 that support different services or service offerings also may specify the same standard Service Type Template to further maintain the consistency of user interactions at the CMC Service 212.

Also in Table 1, the Standard Operations and Custom Operations are captured as automation processes provided within the subject CITS Container 202. All CITS Containers 202 support a set of Standard Operations that are required for compliance with a container standard that is maintained and owned by the solution administrator that maintains the solution provider system 102. That container standard defines the rules and allowed policies that determine the state of the Dirty Bit/Support Bit (e.g., ON=supported and OFF=unsupported) based on whether a modification affects the integrity of the CITS Container 202. Such Standard Operations may be sub-divided into Management Operations, Service Operations, and Resource Operations, which also are referenced in Table 1. Examples of such Management Operations, Service Operations, and Resource Operations are listed below in Tables 2, 3, and 4, respectively.

TABLE 2

Management Operations

| Command | Operation |
|---|---|
| List_Operations | Lists all operations supported by a container, including standard and custom operations |
| Install/Uninstall | Installs/uninstalls a CITS Container in a solution context |
| Register/Unregister | Registers/unregisters a CITS Container in the local registry |
| Activate/Deactivate | Activates or deactivates a processes or process sets in context of a live environment |
| Patch | Patches CITS Container with additional content |
| Upgrade | Upgrades a CITS Container to newer version with the local solution context |
| Rollback | Rolls a CITS Container back to a previous version or, optionally, a specified version by undoing any changes made to that version |
| Reset | Resets to "factory" default settings |
| Sync | Enables content from passive pool of one CITS Container to be synchronized with that of another CITS Container |
| Download_Payload | Runs automation scripts to automatically download payload(s) required for a container |
| Configure_Paylaod | Runs configuration scripts to automatically configure, or pair a container with its payload(s) |
| Activate_Payload | Activates payload(s) in context of a live environment |
| Add/Remove_Entity | Adds or removes service provider and/or tenant |
| Status | Queries and returns current status of container/service, processes, and content |
| List_Content | Produces list of all content details contained within a container |
| List_Service_Descriptions | Lists all services provided/supported by container |
| Query_Data | Enables query of descriptor data |
| Add/Remove_Object | Adds or removes processes or process sets, connectors, scripts, PowerPacks, custom container operations, etc. |
| Configure_Container | Enables the configuration of the container, connector, or other content for container to become operational |
| Get_Metered_Data | Gets data associated with metering of service |
| Set_Entitlement | Adds or removes entitlement for customer or tenant to container |
| Set/Unset | Enables container to be put in/ taken out of maintenance mode |
| Get_Version | Gets container version |
| Add/Remove_Opration | Adds or removes container operations |
| Scale_Up/Scale_Down | Adds or removes resources to CITS delivery solution as required to respond to changes in the CITS delivery solution and/or a service provider's preferences |

TABLE 3

Service Operations

| Command | Operation |
|---|---|
| Test_Consumer | Tests the services or service offerings of a CITS Container from a customer or tenant perspective |
| Test_Admin | Tests the services or service offerings of a CITS Container from an administrator perspective |
| Instantiate | Creates an instance of a service or service offering of a CITS Container so that it is ready for activation |
| Configure | Configures an instantiated service or service offering of a CITS Container |
| Activate | Activates an instantiated service or service offering of a CITS Container |
| Deactivate | Deactivates an activated service or service offering of a CITS Container |
| Remove | Deletes and de-registers a service or service offering of a CITS Container |
| Test | Validates an instantiated and configured service or service offering for integrity and functional use |
| Collect | Collects usage metrics from the services or service offerings of a CITS Container |
| Get_Cost_Estimate | Gets service costing information or cost of service resource(s) from multiple resource providers or payloads |
| Set_Overload_Tenant | Sets a process GUID in a CITS Container to overload another process GUID in the same CITS Container |
| Set/Get_QoS | Sets or determines QoS level specifications for CITS Container (QoS levels may be arbitrary or as defined in CMC Service) |
| Get/Set_QoS_Route | Sets user sessions route for runtime redirection for any user requested resource or user activity or action performed by one or more processes within a CITS Container based on QoS levels specified for that CITS Container and a user's user ID, group ID, tenant ID, and/or target resource specification or tags |
| Get/Set_Transactional_Cost | Sets and determines transactional costs for each workflow or process or process set within a cloud IT service, or for the whole CITS Container |
| Get/Set_Completion_Status | Sets and determines the state or completion status of a user's activity associated with a process or process set within a CITS Container |

TABLE 4

Resource Operations

| Command | Operation |
|---|---|
| Reserve | Creates a new reservation for a provisioned resource and reserves that resource from a start date to an end date |
| End_Reservation | Ends a reservation |
| Extend_Reservation | Extends the reservation date for a resource or resources past the original requested end date |
| Change_Reservation | Changes the reservation parameters for a resource or resources (e.g., CPUs, hard disk capacity, etc.) |
| Manage_Reservation | Manages the state of the reservation for a resource or resources (e.g., stop, start, resume, activate, deactivate, etc.) |
| Return_Reservation | Returns an existing reservation for a currently provisioned resource |
| Get_All | Gets all of the usage data related to a resource or resources (e.g., resource owner, cost center, utilization data, current configuration, etc.) |

The Management Operations listed in Table 2 may be utilized by the CMC Service 212 to manage a CITS Container 202, such as by installing, registering, configuring, activating, and deactivating a CITS Container 202. The Service Operations may be utilized by the CMC Service 212 to manage, or by service consumers to consume, the services or service offerings that are supported by such a CITS Container 202, such as by initiating, configuring, testing, and activating those services or service offerings. And the Resource Operations may be utilized by the CMC Service 212 to manage the resources that are required to support those services or service offerings, such as by reserving, provisioning, and monitoring those resources.

In Table 2, the Install/Uninstall operations invoke workflows in a CITS Container 202 that automatically install and configuration that CITS Container 202 in a CITS Console 200, or that remove, or uninstall that CITS Container 202 from a CITS Console 200. The implementation of those workflows may be specific to each instance of a CITS Container 202. And after a particular CITS Container 202 is instantiated in a CITS Console 200, it is registered in the local registry of a service provider system 104 before the CMC Service 212 of that service provider system 104 may be utilized to perform other Management Operations on that particular CITS Container 202.

The Register/Unregister operations referenced in Table 2 invoke workflows in an installed CITS Container 202 that register that CITS Container 202 in the local registry of a service provider system 104 and notify the CMC Service 212, or that unregister that CITS Container 202. The Register operation may be called as a part of the workflows of the Install operation, or as a standalone operation. And after a particular CITS Container 202 is registered in the local registry, the CMC Service 212 may invoke other Management Operations provided within that CITS Container 202.

The Activate/Deactivate operations referenced in Table 2 invoke management workflows in a CITS Container 202 that mark that CITS Container 202 as active (i.e., ready for use) in the local registry of a service provider system 104, or that mark an active CITS Container 202 as inactive. The Activate operation also may call the Service operation to activate the services or service offerings of that CITS Container 202. Although the Deactivate operation may invoke workflows to mark an activated CITS Container 202 as inactive, that CITS Container 202 may remain registered in the local registry so that it may be re-activated by calling the Activate operation again at a later point in time.

The Patch operation referenced in Table 2 invokes workflows in a CITS Container 202 that add content to that CITS Container 202. The Upgrade operation referenced in Table 2 invokes workflows in a CITS Container 202 that upgrade the lifecycle of that CITS Container 202. Accordingly, both the Patch and Upgrade operations may be utilized to perform routine maintenance on a CITS Container 202. And the Rollback operation referenced in Table 2 invokes workflows in a CITS Container 202 that roll that CITS Container 202 back to a previous version, which may be either a version immediately preceding the version that is being rolled back or a previous version that has been specifically identified. Accordingly, the Rollback operation may be utilized to undo an changes performed by the Patch and/or Upgrade operations, as well as any changes that a container developer may make.

The Sync operation referenced in Table 2 invokes workflows in a CITS Container 202 that cause the contents of a first instance of that CITS Container 202 to be updated and/or synchronized with that of a second instance of that CITS Container 202, such that the same content may be maintained in different instances of the same CITS Container 202 or in different CITS Containers 202 with similar dependencies. Rather than requiring content to be downloaded from the first instance of the CITS Container 202, moved and/or modified, and then uploaded into the second instance of the CITS Container 202, the Sync operation combines those discreet operations into a single, autonomic operation. The Sync operation also facilitates the supportability of the content because it allows a cloud IT service provider to move and/or modify the state of content from a local instance of a CITS Container 202 to a remote instance of the CITS Container 202 for testing, certification, and approval. Moreover, it allows a cloud IT service provider to upload registered content from a remote instance of a CITS Container 202 to a local instance of the CITS Container 202 for inspection and modification. The Sync operation also allows the contents of two local instances of CITS Containers 202 to be synchronized. Any sync operation that may result in conflicts between the contents of different instances of a CITS Container 202 may be referred to an administrator at the solution provider system 102 for resolution.

In Table 3, the Instantiate operation invokes workflows in a CITS Container 202 that create an instance of a service or service offering that is supported by that CITS Container 202 and publish the instantiated service or service offering to the service request catalog 216. After an instance of the service or service offering has been created, it must be activated by the Activate operation before service consumers may request and consume the subject service or service offering, and before additional Service Operations may be performed on the service or service offering.

The Configure operation referenced in Table 3 invokes workflows in a CITS Container 202 that configure or re-configure a service or service offering that is supported by that CITS Container 202, the resources upon which that service or service offering depends, the CITS connectors 226 for those resources, and all associated configurations required to make that service or service offering operational. The Configure operation also may invoke certain post-operational workflows, such as workflows that configure a monitoring application to monitor the performance of that service or service offering after it is operational.

The Activate operation referenced in Table 3 invokes services workflows in a CITS Container 202 that enable a service or service offering that is supported by that CITS Container 202 to be published to the service request catalog 216 for self-service consumption via the console portal 210. The Activate operation also marks that service or service offering as active (i.e., ready for use). The Deactivate operation referenced in Table 3 invokes workflows that disable, or deactivate, that service or service offering and remove it from the service request catalog 216 so that it will not be available for self-service consumption, although it may remain on a CITS Container 202. And the Remove operation referenced in Table 3 invokes workflows that deactivates a service or service offering and deletes it from its CITS Container 202. Accordingly, the workflows of the Deactivate operation may be part of the Remove operation.

The Test operation invokes workflows in a CITS Container 202 that validate the integrity of a service or service offering that is supported by that CITS Container 202. For example, a service or service offering may be placed in a test mode so that it is operational, but is not published in the service request catalog 216 and, therefore, cannot be consumed by service consumers. A successful result of such a test would ensure that the service or service offering is in ready, working condition, while any unsuccessful result would allow a solution administrator to take any corrective actions necessary to bring the service or service offering into a ready, working condition.

The Set_Overload_Tenant operation referenced in Table 3 invokes workflows in a CITS Container 202 that cause a process GUID in that CITS Container 202 to overload another process GUID in the same CITS Container 202 based on a tenant ID to which a particular user belongs. In other words, the user entitlements for a first process or process set 228 identified with a first process GUID will be set, or overloaded, by a second process or process set 228 with a second process GUID to prevent users with a particular tenant ID from invoking the first process or process set 228 while, at the same time, allowing the users with that tenant ID to invoke the second process or process set 228. Such processes or process sets 228 may be mutually exclusive processes or process sets 228, but they may be presented to the different users as the same process or process set 228 via the user interface of the CMC Service 212 to maintain the consistency of user interactions at the CMC Service 212, such as when the CITS Container 202 is implemented in a multi-tenant cloud solution.

For example, a first tenant in a multi-tenant cloud solution may require a default process or process set 228A with one level of approval, and a second tenant in that multi-tenant cloud solution may require an alternative process or process set 228A' with two levels of approval. But both of those processes or process sets 228A and 228A' may be presented to those tenants' users as the same approval process via the user interface of the CMC Service 212 (e.g., an approval process). Thus, the alternative process or process set 228A' may overload the default process or process set 228 with a Set_Overload_Tenant operation so that, when a user with a tenant ID corresponding to the second tenant requests that approval process, that user's request is directed from the default process or process set (i.e., the overloaded process set) 228A to the alternative process set 228A (i.e., the overloading process set). The redirection of that request is performed in the background so that it is transparent to the user. By contrast, when a user with a tenant ID corresponding to the first tenant requests that approval process, that user's request goes directly to the default process or process set 228A.

Although the foregoing example includes a default process or process set 228A and an alternative process set 228A', a Set_Overload_Tenant operation also may be performed between different instances of the same process set 228. Moreover, a Set_Overload_Tenant operation may be performed on different instances of the same process set 228 in both the active pool 300 and the passive pool 302. For example, one instance of a process set 228 may be provided in the active pool 300 and a redundant instance of that same process set 228 may be provided in the passive pool 302. The instance of that process or process set 228 in the passive pool may perform the Set_Overload_Tenant operation to overload the instance of that process or process set 228 in the active pool 300 such that, when a user with a tenant ID that matches the tenant ID specified in the Set_Overload_Tenant operation requests the subject process or process set 228, that user's request is directed to the instance of the process or process set 228 in the passive pool 302, which then is automatically moved to the active pool 300 so that it may be invoked. A similar process may be performed when both instances of the same process or process set 228 are provided in the active pool 300, except that both of the processes or process sets 228 may be invoked without changing their statuses to active because both already are in the active pool 300.

The Set/Get_QoS operation referenced in Table 3 enables authorized users (e.g., the solution administrator or a service administrator at the cloud IT service provider) to specify one or more QoS levels or constraints for a particular CITS Container 202. A single QoS level may be specified for a particular CITS Container 202 (e.g., Priority 5) so that all of the users that access the services supported by that CITS Container 202 are subject to the same performance constraints (e.g., throughput, packet loss, latency, jitter, etc.). Or a plurality of QoS Levels (e.g., bronze, silver, gold, etc.) may be specified for a particular CITS Container 202 so that different users may be subject to different performance constraints based on different criteria, such as user ID, group ID), tenant ID, or the targeted resource (e.g., a downloaded payload 208 versus an external resource 304). In the former instance, the CMC Service 212 determines if a QoS level constraint is satisfied for a user before a user is able to access the services supported by the CITS Container 202. And in the latter instance, the CMC Service 212 allows the user to access the services supported by the CITS Container 202, but then governs the user's session routing and resource requests based on one or more of the foregoing criteria. Those accesses may be controlled via the console portal 210.

The Set_QoS_Route operation referenced in Table 3 enables authorized users to specify the route selected for each QoS level such that user requests are redirected at run time via that specified route. The Set_QoS_Route operation may be a separate process or process set 228 from those for which it directs user requests. The Set_QoS_Route operation also may be an element of a process or process set 228 for which it directs user requests. Accordingly, via the Set/Get_QoS operation and the Set_QoS_Route operation, the run time behavior of the services supported by a particular CITS Container 202 may be shaped by run time data and the one or more QoS levels specified for that CITS Container 202.

The Get/Set_Transactional_Cost operation referenced in Table 3 enables authorized users to assign a cost model to a particular CITS Container 202, to each consumable process or process set 228 within that CITS Container 202, to each consumable element of those processes or process sets 228, and/or to each payload 208 or other resource targeted by those processes or process sets 228. Those cost models are maintained by the accounting capability of the CITS Console 200 and may either be transactional-based costing models (e.g., charged per transaction), subscription-based costing models (e.g., charged flat fee), or a combination thereof (e.g., some services charged per transaction and others covered under a flat fee). The assignment of cost models to CITS Containers 202 and/or the elements within a CITS Container 202 enable transactional tracking and cost reporting calculations to be performed at run time in a utility model for each cloud IT service or service offering that is managed via the CMC Service 212. And the resulting usage information may be logged in a central registry database 114 of the solution provider system 102 utilizing the log management capability of the CITS Console 200.

Also in Table 3, the Get/Set_Completion_Status operation enables the reporting database capability of the CITS Console 200 or an external application to set or determine the state, or completion status, of a particular process or process set 228, task, or activity associated with or initiated by a user or by another process or process set 228 within the context of a particular CITS Container 202. The status of completion may be maintained as a percent of task completion and may be set/determined from outside the context of the CITS Container 202. The status of completion also may be set/determined from within the CITS Container 202, such as by an element of the process or process set 228 that is being tracked or by another process or process set 228. Moreover, each CITS Container 202 may define any number of different states for each process or process set 228, task, or activity to facilitate different types of status tracking.

The Change_Reservation operation referenced in Table 5 may comprise resource management operations that are configured to change the reservation parameters for a resource or resources (e.g., CPUs, hard disk capacity, etc.). And the Manage_Reservation operation referenced in Table 5 may invoke workflows that manage the state of the reservation for a resource or resources (e.g., stop, start, resume, activate, deactivate, etc.) as required to provide a service or service offering that is supported by a CITS Container 202.

Each of those Standard Operations also may be subdivided into mandatory and optional operations. Mandatory operations must be implemented for a CITS Container 202 to comply with the container standard, while optional operations may be optionally implemented or not implemented without preventing the CITS Container 202 from complying with the container standard when they are not implemented. Nevertheless, the presence of certain optional operations in a CITS Container 202 still may be required to comply with the container standard.

By contrast to mandatory and optional Standard Operations, Custom Operations are new operations that may be defined by an authorized user (e.g., the solution administrator or a service administrator at the cloud IT service provider) utilizing the Container Editor Tool. Such custom operations may be specific to a particular cloud IT service or service offering being provided with a CITS Container 202. For example, a custom operation may be to fetch a report from an underlying product database associated with a cloud IT service and to email that report to the authorized user, or some other user, every time that operation is invoked. When such a custom operation is defined, the Container Editor Tool adds an entry to the CITS specification 224 (e.g., Get_Report) that contains the information for invoking the orchestrated workflow associated with that custom operation. As a result, the custom operation will appear among the operations supported by the CITS Container 202 (e.g., List_Operations).

Each of the foregoing operations is maintained as part of the object schema definition in the CITS specification 224 of a CITS Container 202. Those operations are separate from the processes or process sets 228 that may be implemented in the CITS Container 202 so that they are not directly inline with, or tied to, the cloud IT services or service offerings supported by that CITS Container 202. Because the cloud IT services delivered via the CITS Containers 202 utilize the automation of processes or process sets 228 that typically depend on one or more external product, service, appliance, application, and/or device for successful configuration and implementation, payloads 208 and/or external resources 304 are specified within the CITS specification 224 to ensure that those dependencies are satisfied when a CITS Container 202 is downloaded from the solution provider system 102.

The resources (e.g., products, services, appliances, applications, devices, etc.) upon which a CITS Container 202 may depend may reside in physical or virtual environments. Accordingly, payloads 208 may comprise virtual appliances 208A that represent a fully configured functional module or application (e.g., an n-tier application comprising multiple virtual appliances) upon which a CITS Container 202 depends to deliver its services. Such virtual appliances 208A may operate as management modules that provide value-added services for the management applications, business applications, or services being delivered within the cloud IT service delivery solution. Further, payloads 208 also may comprise such management or business applications 208B, virtual or physical appliances 208C hosting such applications, and/or automation scripts 208D that may be invoked to reconfigure content for use in the context of a particular CITS Container 202.

When the resources upon which a CITS Container 202 may depend reside on external resources 304, those external resources 304 may be exposed as physical resources via the translation logic provided at the console connectors 218 of the CITS Console 200 in combination with the CITS connectors 226 of the CITS Container 202, as depicted by the solid lines between the CITS connectors 226 and the external resources 304 in FIG. 3. They also may be exposed via application program interfaces (APIs) 208E in the payload pool/grid deployment 204, as depicted by the dashed lines between the API 208E and the external resources 304 in FIG. 3. Such external resources 304 may comprise, for example, external cloud IT resources 304A (e.g., IT management as cloud IT services that are delivered from IT management applications, such as monitoring services, security services, data backup services, $EC^2$ services, simple storage services ($S^3$), etc.), an external physical or virtual appliance 304B, and/or an external physical or virtual machine 304C.

A CITS Container 202 also may depend on services exposed by another CITS Container 202'. If not already plugged into the CITS Console 200, that other CITS Container 202 may need to be downloaded from the solution provider system 102 and implemented. Or if that other CITS Container 202' already has been downloaded to the local container database 120 of a service provider system 104, it may be implemented without being downloaded again. In either instance, for each product, service, appliance, application, and/or device upon which a CITS Container 202 depends to support its cloud IT services or service offerings, the CITS specification 224 not only specifies which payloads 208, external resources 304, and/or other CITS Containers 202' are required to successfully configure and implement that CITS Container 202, it also specifies the automation scripts, configuration scripts, and/or orchestration workflows required to download, configure, and/or connect, or pair, that CITS Container 202 with any payloads 208, external resources 304, or other CITS Containers 202' upon which that CITS Container 202 may depend.

Returning to Table 1, the Active GUIDs identify all of the processes or process sets 228 currently in the active pool 300 of the CITS Container 202 by their process GUIDs, and the Passive GUIDs identify all of the processes or process sets 228 currently in the passive pool 302 of the CITS Container 202 by their process GUIDs. If all of the processes or processes sets 228 in a particular CITS Container 202 have been approved for operation with the CITS Console 200, the container GUID for that CITS Container 202 will be registered. Accordingly, one may determine whether all of the processes or process sets 228 in the active pool 300 or passive pool 302 of a CITS Container 202 have been approved for operation with the CITS Console 200 based on whether or not the container GUID for the corresponding CITS Container 202 has been registered. Nevertheless, unapproved processes or process sets 228 also may be present in the active pool 300 or passive pool 302 of a CITS Container 202.

The processes or process sets 228 that are tracked with those process GUIDs are separated into an active pool 300 and a passive pool 302 so that new processes or process sets 228 and/or content may be uploaded to a CITS Container 202 in a live environment without affecting the active processes or process sets 228 and/or content. The active pool 300 comprises the processes or process sets 228 that are in an "active" state, such that they are available for external consumption by the consumers of the cloud IT service being delivered with that CITS Container 202. And the passive pool 302 comprises the processes or process sets 228 that are in an "inactive" state, such that they are not available for consumption but are available to be added to the active pool 300 or switched with processes or process sets in the active pool 300 by changing their state from "inactive" to "active." Because they are not in an "active" state, the processes or process sets 228 in the passive pool 302 may be operated on outside the context of a live deployment, while the CITS Container 202 is in the live environment, which allows for modifications, testing, expansion, and updates to processes or process sets 228 to be performed while maintaining the integrity of the CITS Container 202 in the live environment.

Each process or process set 228 in the active pool 300 may have any number of corresponding redundant, alternative, or additional processes or process sets 228 that may not be used in a particular deployment context. Those redundant, alternative, or additional processes or process sets 228 are provided in the passive pool 302. As depicted in FIG. 3, for example, there are three (3) default processes or process sets 228A-228C in the active pool 300, and one (1) alternative process or process set 228A' and one (1) additional process or process set 228D in the passive pool 302. Although the three (3) default processes or process sets 228A-228C in the active pool 300 represent the cloud IT service or service offering currently being supported by the CITS Container 202, one or both of the processes or process sets 228A' and 228D in the passive pool 302 may be switched with one or more of the processes or process sets 228A-228C in the active pool 300. In the alternative, one or both of the processes or process sets 228A' and 228D in the passive pool 302 may be added to the active pool 300 without removing any of the default processes or process sets 228A-228C from the active pool 300.

By way of more specific example, the default first process or process set 228A may support a service that requires one level of approval from a manager, and the alternative first process or process set 228A' may support the same service but require two levels of approval from a manager. And a first cloud IT service provider may need to provide its tenants with a service that requires one level of approval, while a second cloud IT service provider may need to provide its tenants with a service that requires two levels of approval. Accordingly, both the default first process or process set 228A and the alternative first process or process set 228A' are packaged in the CITS Container 202 so that different cloud IT service providers may implement different levels of service with the same CITS Container 202. Moreover, the additional process or process set 228D is packaged in the CITS Container 202 so that cloud IT service providers also may add to the existing services provided to their tenants, rather than or in addition to providing an alternative form of an existing service.

During onsite implementation of the CITS Container 202, the CITS Container 202 is implemented with the default processes or process sets 228A-228C in the active pool 300. And if a cloud IT service provider's tenants require two levels of approval, the default first process or process set 228A may be switched out for the alternative first process or process set 228A', such that the default first process or process set 228A is moved to the passive pool 302 (i.e., the status of the default first process or process set 228A is changed to "inactive") and the alternative first process or process set 228A' is moved to the active pool 300 (i.e., the status of the alternative first process or process set 228A' is changed to "active"). Similarly, the additional process or process set 228D may be switched or added to the active pool 300 (i.e., the status of the additional process or process set 228D may be changed to "active") to provide an additional, different service to the cloud IT service provider's tenants. Such switching and/or adding of processes or process sets 228 may be accomplished in the field without modifying the content of the CITS Container 202.

Providing an active pool 300 and a passive pool 302 in each CITS Container 202 not only allows flexibility in the onsite configuration of the CITS Container 202 by enabling cloud IT service providers to switch or add processes or process sets 228 as required to suit different tenants without modifying the content of the CITS Container 202, it also allows new processes or process sets 228 to be uploaded to the CITS Container 202 to expand the services provided by the cloud IT service providers while the CITS Container 202 is being utilized in a live environment. For example, an authorized user (e.g., the solution administrator or a service administrator at the cloud IT service provider) may invoke the Add/Remove_Object command to move a new process or process set 228 to the passive pool 302 and then invoke the Activate/Deactivate command to activate the process or process set 228 by changing its state to "active," such that it is moved to the active pool 300. Such processes or process sets 228 automatically inherit the entitlements of the CITS Container 202 in which they are activated.

In addition to new and/or alternative processes or process sets 228, the passive pool 302 also may comprise one or more redundant processes or process sets 228 that provide substantially the same functionality as one or more corresponding processes or process sets 228 in the active pool 300. Accordingly, those redundant processes or process sets 228 may be modified, tested, expanded, and/or updated in a live environment while their corresponding processes or process sets 228 remain functioning in the active pool 300. Thus, a redundant process or process set 228 may be modified, tested, expanded, and/or updated as required in the passive pool 302 and then switched with its corresponding process or process set 228 in the active pool 300 without requiring that the services supported by that process or process set 228 be taken off line for any more time than is required to make that switch. Switching, adding, modifying, testing, expanding, and updating processes or process sets 108 in that manner may be performed with the Container Editor Tool of the CMC Service 212.

The CMC Service 212 not only provides functionality for authorized users to switch, add, modify, test, expand, and update the processes or process sets 108 within a particular CITS Container 202, it also provides functionality for authorized users and/or service consumers to switch, add, modify, test, expand, and update the CITS Containers 202 that are downloaded to the local container database 120 of a service provider system 104. Modifications to a CITS Container 202 may be performed via the Container Editor Tool that is provided as part of the CMC Service 212. And just as processes or process sets 108 may be in an "active" or "inactive" state within a particular CITS Container 202 (i.e., in the active pool 300 or the passive pool 302), CITS Containers 200 may be in an "active" or "inactive" state when plugged into the CITS Console 200. Although a CITS Cartridge 200 that has been downloaded to the local container database 120 of a service provider system 104 also is in an "inactive" state, it is not considered to be "plugged in" to the CITS Console 200 unless it has at least been instantiated and registered in the CMC Service 212 (e.g., FIG. 6, Step 604).

Updates to and synchronizations of a CITS Container 202 may be performed by the CMC Service 212 of the CITS Console 200 regardless of whether that CITS Container 202 is plugged into the CITS Console 200. Further, changes to and the current state of a CITS Container 202 may be logged by the log management capability of the CITS Console 200 regardless of whether that CITS Container 202 is plugged into the CITS Console 200. But by plugging a CITS Cartridge 202 into the CITS Console 200, authorized users may utilize the CMC Service to modify certain core functionality of a CITS Container 202 when it is in an "inactive" state. Authorized users may test those modifications, or make and test modifications to other functionality (e.g., processes and process sets 228), when the CITS Container 202 is plugged in and in an "active" state. Also when the CITS Container 202 is in an "active" state, service consumers may select certain cloud IT services or service offerings from the service request catalog 216 for run-time execution.

An authorized user may modify the core functionality of a CITS Container 202 in the "passive" state after it is instantiated or registered, but before its corresponding cloud IT services or service offerings are published to the service request catalog 216. Such modifications might include, for example, adding or creating one or more Custom Operations in the CITS specification 224, adding or creating one or more custom CITS connectors 226 for a particular physical resource, and/or adding or creating a custom set of user-facing interfaces for a particular service or service provider, rather than utilizing an SO template 230 to configure those user-facing interfaces. After such modifications have been completed, the corresponding CITS Container 202 may be placed in the "active" state and tested in an isolated test environment. Such a test environment may comprise the actual payloads 208 and/or external resources 304 upon which that particular CITS Container 202 depends, in which case those payloads 208 and/or external resources 304 may need to be downloaded and/or connected to; it may comprise virtualizations of those payloads 208 and/or external resources 304; or it may comprise some combination thereof. Accordingly, an isolated test environment may be created as required to ensure that the subject CITS Container 202 may be tested without interrupting or interfering with the operation of any of the other CITS Containers 202 that also may be plugged into the CITS Console 200.

Upon the successful completion of such testing, the corresponding cloud IT services or service offerings may published to the service request catalog 216 for consumption by service consumers, or tenants. In the alternative, the modified CITS Container 202 may be returned to the inactive state for further modification or unplugged from the CITS Console 200 for subsequent retrieval from the local container database 120. Further, the modified CITS Container 202 may be uploaded to the solution provider system 102 for testing and support approval. If certified for operation within the CITS Console 200, the modified CITS Container 202 is added to the central container database 110 and identified in the global registry with a unique container GUID.

As discussed above, authorized users may modify and test the processes or process sets 228 within the CITS Container 202 not only while the CITS Container 202 is in an "active" state, but also while it is in a live environment. That can be accomplished, for example, by providing duplicate instances of the same process or process set 228—one instance in the active pool 300 and one instance in the active pool 302. The first instance may be enabled for run-time execution in the active pool 300 while the other instance is being modified and tested in the passive pool 302. The two instances then may be switched with each other upon completion of the modifications and testing. A similar result may be achieved when modifying the core functionality of a CITS Container 202 by downloading duplicate instances of the same CITS Container 202 to a CITS Console 200 and modifying one in the "inactive" state while the other is in the "active" state and being operated in a live environment.

The solution model provided by the CITS Console 200 and the CITS Containers 202 not only allows solution administrators and service providers to implement flexible and modularly expandable hybrid cloud solutions, it also forms the basis for a reference implementation architecture that allows solution administrators to rapidly provision, configure, and deploy those hybrid cloud solutions in a repeatable and predictable manner. That reference implementation architecture is utilized by the solution provider system 102 to model hybrid cloud solutions at a service provider system 104 by determining which CITS Containers 202 are required to support a particular CITS delivery solution as well as the quantities and types of other resources that are required to support that particular CITS delivery solution. Although a service provider may subsequently add, remove, and/or modify cloud IT services or service offerings by adding, removing, and/or modifying the corresponding CITS Container 202, the solution provider system 102 utilizes the reference implementation architecture to determine which CITS Containers 202 and resources are required to support a particular cloud IT service or service offering upon its initial implementation, according to the service provider's initial requirements. The solution provider system 102 creates a solution specification for that particular hybrid cloud solution, which it then may utilize to automatically provision, configure, and deploy the CITS delivery solution in a predictable and repeatable manner.

Figure 4:
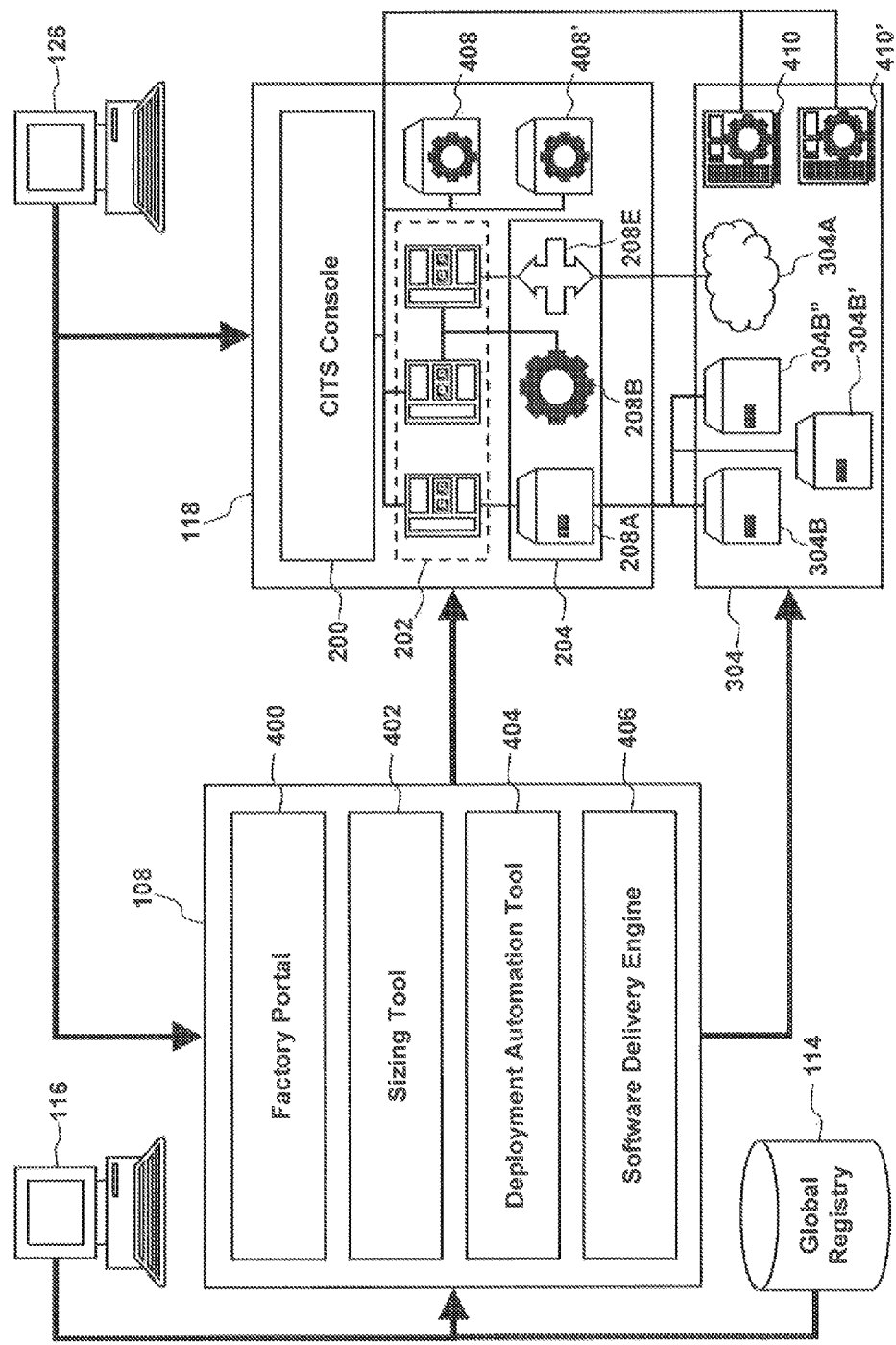
FIG. 4 is a schematic diagram illustrating an example of a solution provider system and a cloud IT service solution according to a non-limiting embodiment of the present disclosure.

When utilized in combination with one or more components 108-116 of the solution provider system 102, the computer program code stored on the memory of the solution servers 108 may function as one or more modules. As depicted in FIG. 4, for example, the solutions servers 108 may comprise a factory portal 400, a sizing tool 402, a deployment automation tool 404, and a software delivery engine 406. The factory portal 400 is configured to provide a portal via which a solution provider may access, request, and/or invoke the functionality of the sizing tool 402, the deployment automation tool 404, and the software delivery engine 406. The factory portal 400 also is configured to gather the sizing information and personalization information that is utilized by the sizing tool 402, deployment automation tool 404, and software delivery solution 406 to assemble a particular CITS delivery solution. The sizing tool 402 is configured to model a CITS delivery solution utilizing a reference implementation architecture and to determine the quantities and types of logical and physical resources that are required to support that particular CITS delivery solution at a target service provider system 104 based on the criteria provided by the service provider that maintains that service provider system 104. The deployment automation tool 404 is configured to generate a set of software bundles or virtual appliances that represent the various products and/or applications that are required to provide that particular cloud IT solution. And the software delivery engine 406 is configured to consume those software bundles or set of virtual machines and process them into the target service provider system 104. Together, the factory portal 400, sizing tool 402, deployment automation tool 404, and software delivery engine 406 operate as a solution factory, or assembly line, that generates and deploys CITS delivery solutions in a predictable and repeatable manner.

The factory portal 400 comprises a set of interactive forms that are configured to gather sizing information and personalization information for a particular CITS delivery solution based on a corresponding reference implementation architecture. A solution administrator may access one or more of those forms via a solution administrator GUI 116 and may input that information utilizing an input device (e.g., a keyboard, a mouse, etc.) at that solution administrator GUI 116. Similarly, a service provider may access one or more of those forms via a service provider GUI 126 and may input that information utilizing an input device (e.g., a keyboard, a mouse, etc.) at that service provider GUI 126. In the alternative, those forms may be automatically populated by extracting the corresponding information from electronic documents and/or the target service provider system 104. For example, sizing information may be extracted from a service contract that has been loaded into the factory portal 400 in a machine-readable format (e.g., .xml, .txt, .doc, .pdf, etc.) and/or from a configuration management database (CMDB) that has been constructed to represent the various resources at the target service provider system 104 as configuration items (CIs). Sizing information also may be gathered by the sizing tool 402 as historical data from other CITS delivery solutions via the log management capability of the CITS Console 200 within each of those CITS delivery solutions.

The sizing tool 402 utilizes sizing information to define the actual CITS delivery solution that will be deployed on the target service provider system 104 and to size that solution based on the resources available at the target service provider system 104 and the service level required by the service provider. As described above, such sizing information may comprise, for example, the type of service (e.g., security service, data management service, claims processing service, etc.) and various performance parameters for each type of service; and such performance parameters may comprise, for example, service details (e.g., level(s) of approval, data architecture(s), claim approval process(es), etc.), service metrics (e.g., service volume, service quality, service availability, etc.), resource details (e.g., physical parameters such as the number of CPUs and amount of RAM, operational parameters such as processing speeds and connection speeds, operating system platform, etc.), and reference values (e.g., requests per second handled, number of process executions results from each request, etc.). Collectively, that sizing information may be utilized by the sizing tool 402 to define the scope and scale of the cloud IT solution required by the service provider, the core operating characteristics of the resources available at the service provider system 104 maintained by that service provider, and the environmental details of that service provider system 104.

Examples of sizing information input into the sizing tool 402, reference values relied upon by the sizing tool 402, and sizing parameters output by the sizing tool 402 are provided below in Table 5.

TABLE 5

| | Sizing Data |
|---|---|
| Tag | Description/Function |
| Com_ClientID | Client ID for the customer |
| Com_Comment | Comments about solution calculations |
| Com_ClientName | Name of the client requesting the solution |
| Com_PreparedBy | Name of the person preparing or providing input |
| Com_ActiveVMs | Average number of active operating virtual machines (VMs) |
| Com_TotalVMs | Number of defined virtual machines |
| Com_NumDataCenterLocations | Number of data center locations to which to apply the solution |
| Com_HostQty | Number of host servers |
| Com_HostPlatform | Total RAM in each host server in GB |
| Com_HostCores | Number of cores per CPU on each host server |
| Com_HostSockets | Number of CPU sockets at a host server |
| Com_HostMemory | Total RAM in each host server in GB |
| Com_TotalNumberofNICs | Number of network interface controllers (NICs) at a host server |
| Com_HostLocalStorage | Total amount of local storage available at a host server in MBs |
| Com_HostCPUSpeed | Processing speed of the host CPUs in GHz |
| Com_NumberofInterconnectNICs | Number of NICs per host server dedicated to interconnects |
| Com_NumberofPublicNICs | Number of NICs dedicated to public IPs in a host server |
| Com_HostInterconnectionSpeed | Speed of the interconnect connections between host servers |
| Com_TypeOfRemoteStorage | Type of remote storage available to the host servers |
| Com_TotalRemoteStorageGB | Total amount of remote storage available in each host server in GB |
| Com_Typeof RemoteStorageController | Type of remote storage controller installed in a host server |
| Com_HostRemoteStorageSpeed | Speed of the connection to remote storage |
| Com_NumberofRemoteStorageConnections | Number physical connections to remote storage |
| Com_HostPublic IPConnectionSpeed | Speed of the public IP NICs in Mbits |
| Com_HostPublicIPSaturation | Inverse of the amount of available bandwidth |

TABLE 5-continued

Sizing Data

| Tag | Description/Function |
| --- | --- |
| Basic_RequestTimes | Times during which requests for services are to be processed each day |
| Basic_NumRequest | Number of basic requests expected to be processed each day during peak hours |
| Basic_RequestAvgDuration | Average number of minutes it takes to complete a service request |
| Basic_RequestNumPeakHours | Number of hours each day during which request volume is the greatest |
| Basic_RequestPercentPeak | Percent of total requests expected to occur during peak hours |
| Basic_NumProc | Number of all processes each day |
| Basic_ProcAvgDuration | Average duration of all processes |
| PhysicalServerNonVM_Qty | Number of physical servers required to host a non VM solution |
| PhysicalServerNonVM_Platform | Declares the operating system platform for physical servers hosting a non-VM solution |
| PhysicalServerNonVM_Cores | Number of CPU cores per physical server hosting a non-VM solution |
| PhysicalServerNonVM_Sockets | Number of CPU sockets per physical server hosting a non-VM solution |
| PhysicalServerNonVM_Memory | Amount of RAM per physical server hosting a non VM solution |
| PhysicalServerNonVM_NIC | Number of NICs per physical server hosting a non VM solution |
| PhysicalServerNonVM_Storage | Amount of storage per physical server hosting a non-VM solution |
| PhysicalServerVM_Qty | Number of servers required to host a VM solution |
| Physical ServerVM_ Platform | Declares the operating system platform for physical servers hosting a VM solution |
| PhysicalServerVM_Cores | Number of CPU cores per physical server hosting a VM solution |
| PhysicalServerVM_Sockets | Number of CPU Sockets per physical server hosting a VM solution |
| PhysicalServerVM_Memory | Amount of RAM per physical server hosting a VM solution |
| PhysicalServerVM_NIC | Number of NICs per physical server hosting a VM solution |
| PhysicalServerVM_Storage | Amount of storage per physical server hosting a VM solution |
| VirtualServer_Qty | Number of virtual servers required to host a VM solution |
| VirtualServer_Platform | Declares the operating system platform for virtual servers hosting a VM solution |
| VirtualServer_CPU | Number of CPU cores per virtual server hosting a VM solution |
| VirtualServer_Memory | Amount of RAM per virtual server hosting a VM solution |
| VirtualServer_NIC | Number of NICs per virtual server hosting a VM solution |
| VirtualServer_Storage | Amount of storage per virtual server hosting a VM solution |
| Virtual Server_Product | Product that is contributing the virtual server |
| SC_ClientSCVersion | Version number of the service catalog to be used |
| SC_ClientLoad | Number of service catalog end users (e.g., service consumers) |
| SC_ClientUsers | Clients that have full access to the service catalog |
| SC_Attachment | Average number of attachments per service request |
| SC_ClientServicesRequest | Users that may initiate a service request |
| SC_ClientWFOrch | Workflow orchestrator that is being used |
| SC_Cluster | Declares a server operating against a cluster |
| SC_Custom_Virtual | Declares a server running on a virtual host |
| SC_DataRetention | Number of months to retain production data |
| SC_EDV_Size | Declares the environment data values and customer decision points |
| SC_EnableContent | Declares that out-of-band content will be used |
| SC_MDB | Size of the service catalog database in MB |
| SC_Request | Number of service catalog requests per year |
| SC_ServiceElement | Number of service option elements in the service catalog |
| SC_ServiceOptions | Number of options associated with a service |
| SC_Services | Services designed into the service catalog |
| SC_Virtualized | Declares that the service catalog server will utilize virtual machines |
| SC_WFComplexAudit | Declares if a service catalog server will utilize complex audit trail log files |

TABLE 5-continued

Sizing Data

| Tag | Description/Function |
| --- | --- |
| SC_WFVirtualizedDefault | Declares that the service catalog servers will all be on virtual machines |
| PAM_IPMNumProc | Number of incident and problem management (IPM) processes executed each day |
| PAM_IPMNumConProc | Number of concurrent IPM processes each day |
| PAM_IPMNumProcInst | Number of process instances for each IPM process |
| PAM_IPMAvgDuration | Average duration of IPM processes |
| PAM_IPMNumDay | Number of other processes that are driven by IPM processes each day |
| PAM_IPMNumPeakHours | Number of hours each day during which demand for IPM is the greatest |
| PAM_IPMPercentPeak | Percent of total requests for IPM expected to occur during peak hours |
| PAM_EventNumProc | Number of physical access manager (PAM) events each day |
| PAM_EventNumConProc | Number of concurrent PAM event processes each day |
| PAM_EventNumProcInst | Number of process instances for each PAM event process |
| PAM_EventAvgDuration | Average duration of PAM event processes |
| PAM_EventNumDay | Number of other processes that are driven by PAM event processes |
| PAM_EventNumPeakHours | Number of hours each day during which demand for PAM events is the greatest |
| PAM_EventPercentPeak | Percent of total requests for PAM events expected to occur during peak hours |
| PAM_CCMNumProc | Number of change and configuration management (CCM) processes each day |
| PAM_CCMNumConProc | Number of concurrent CCM processes each day |
| PAM_CCMNumProcInst | Number of process instances for each CCM process |
| PAM_CCMAvgDuration | Average duration of CCM processes |
| PAM_CCMNumDay | Number of other processes that are driven by CCM processes |
| PAM_CCMNumPeakHours | Number of hours each day during which demand for CCM is the greatest |
| PAM_CCMPercentPeak | Percent of total requests for CCM expected to occur during peak hours |
| PAM_ServerNumProc | Number of server provisioning processes each day |
| PAM_ServerNumConProc | Number of concurrent sever provisioning processes each day |
| PAM_ServerNumProcInst | Number of process instances for server provisioning process |
| PAM_ServerAvgDuration | Average duration of provisioning processes |
| PAM_ServerNumDay | Number of other processes that are driven by server provisioning each day |
| PAM_ServerNumPeakHours | Number of hours each day during which demand for server provisioning is the greatest |
| PAM_ServerPercentPeak | Percent of total requests for server provisioning expected to occur during peak hours |
| PAM_ServerPerRequest | Number servers that correspond to each request for server provisioning |
| PAM_ServerStoragePerRequest | Total amount of storage that corresponds to each request for server provisioning |
| PAM_InfraMaintNumProc | Number of infrastructure maintenance processes each day |
| PAM_InfraMaintNumConProc | Number of concurrent infrastructure maintenance processes each day |
| PAM_InfraMaintNumProcInst | Number of process instances for each infrastructure maintenance process |
| PAM_InfraMaintAvgDuration | Average duration of infrastructure maintenance processes |
| PAM_InfraMaintNumDay | Number of other processes that are driven by server infrastructure maintenance processes |
| PAM_InfraMaintNumPeakHours | Number of hours each day during which demand for infrastructure maintenance is the greatest |
| PAM_InfraMaintPercentPeak | Percent of total requests for infrastructure maintenance expected to occur during peak hours |
| PAM_InfraMaintAutoManaged | Total automanaged servers that correspond to infrastructure maintenance |
| PAM_DRNumProc | Number of data recovery processes each day |
| PAM_DRNumConProc | Number of concurrent data recovery processes each day |
| PAM_DRNumProcInst | Number of process instances for each data recovery process |
| PAM_DRAvgDuration | Average duration of data recovery processes |
| PAM_SupportNumProc | Number of support management processes each day |

TABLE 5-continued

Sizing Data

| Tag | Description/Function |
| --- | --- |
| PAM_SupportNumConProc | Number of concurrent support maintenance processes each day |
| PAM_SuportNumProcInst | Number of process instances for each support management process |
| PAM_SupportAvgDuration | Average duration of support management processes |
| PAM_SupportMonthlyNewHires | Number of new hires processed monthly |

In Table 5, at least some of the reference values (e.g., values defined by tags with the suffix "NumProc," "ProcInst," "NumDay," and "NumPeakHours") may be known resource operating parameters, or it may be based on historical data gathered by the sizing tool 402 from other CITS delivery solutions via the log management capability of the CITS Console 200 within each of those CITS delivery solutions. And the sizing tool 402 may utilize those reference values, together with sizing information gathered by the factory portal 400, to generate different sizing parameters as an output.

For example, a service provider may request that services be provided by the CITS delivery solution twelve (12) hours each day (i.e., Basic RequestTimes=12 hours). And the historical data may indicate that requests for server provisioning will have the greatest volume during the first two (2) hours and the last two (2) hours of that service period (i.e., PAM_ServerNumPeakHours=2 hrs.+2 hrs.=4 hrs.). Accordingly, the sizing tool 402 may determine that the percent of total requests for server provisioning that are expected to occur during peak hours is approximately 33% (i.e., PAM_ServerPercentPeak=4 hrs.÷12 hrs.×100=33.3%).

Before the sizing tool 402 performs such calculations, it determines which reference implementation architecture is required to model the subject CITS delivery solution. The sizing tool 402 then evaluates various elements of reference implementation architecture to validate the boundaries of the CITS delivery solution and determine what other information is required to model that solution. The sizing tool 404 utilizes that other information to actually model the CITS delivery solution within the selected reference implementation architecture and to begin building a solution specification for that referenced implementation architecture. The sizing tool 402 may utilize the type of service information gathered by the factory portal 400 to determine which reference implementation architecture should be selected to model the subject CITS delivery solution.

Each reference implementation architecture comprises a solution specification. And each solution specification comprises a declarative model or schema that is configured to provide all of the information required to identify, size, and configure a particular CITS delivery solution, including the identify of the various resources required to support that particular CITS delivery solution and any information required to deploy those resources within the context of the CITS delivery solution. For example, the solution specification may identify a particular CITS Console 200 that may be utilized to implement a particular CITS delivery solution, the aggregate set of common capabilities 222 that may be utilized by that CITS console 200, and each of the resources upon which that CITS Console 200 and/or that aggregate set of common capabilities 222 may depend. By way of more specific example, the solution specification may identify a particular CITS Console 200, one or more capabilities from among the aggregated set of common capabilities 222 that depends upon a management application hosted on one or more virtual appliances 408 and 408' at one or more services servers 118, and one or more other capabilities from among the aggregated set of common capabilities 222 that depends upon a business application hosted on one or more external physical machines 410 and 410' maintained by a third-party resource provider, as depicted in FIG. 4.

A different CITS Console 200 may be provided for each different reference implementation architecture, and the aggregated set of common capabilities 222 provided within each such CITS Console 200 may be common to the type of CITS delivery solution that is supported by the corresponding reference implementation architecture. In the alternative, the same CITS Console 200 may be utilized by different reference implementation architectures and, if required, the aggregated set of common capabilities 222 may be modified for different types of CITS delivery solutions without modifying the other components 210-220 of the CITS Console 200. In the former instance, the sizing tool 402 automatically selects the appropriate CITS Console 200 utilizing the type of service determined by the factory portal 400. And in the latter instance, the sizing tool 404 also may automatically identify any other capabilities that need to be added to the aggregated set of common capabilities 222 of the selected CITS Console 200 to support that type of service. Therefore, both the appropriate CITS Console 200 and any other capabilities that are required to support a designated type of service may be identified within the solution specification of a reference implementation architecture.

Each reference implementation architecture and its corresponding solution specification may be stored in the global registry 114 at the solution provider system 102. In their initial state, however, those solution specifications may not identify any specific CITS Containers 202, the resources upon which those CITS Containers 202 may depend (e.g., payloads 208 or external resources 304), or any specific hardware to which the subject CITS delivery solution may be provisioned. Instead, that information may be added to the solution specification as the CITS delivery solution is assembled by the various components 400-406 of the solution factory.

For example, the sizing tool 402 may utilize the service details obtained by the factory portal 400 to automatically select one or more CITS Containers 202 that are configured to provide the underlying services or service offerings defined by those service details. The sizing tool 402 then may utilize the CITS specifications of those CITS Containers 202 to identify the resources upon which those CITS Containers 202 depend. By way of more specific example, the sizing tool 402 may utilize the service details obtained by the factory portal 400 to automatically select three (3) CITS Containers 202 to plug into the selected CITS Console 200—the first of which depends upon at least one virtual appliance 208A; the second of which depends upon a business application 208B and the third CITS Container 202; and the third of which depends upon an external cloud IT resource 304A and an API 208E that it utilizes to connect to the external cloud IT resource 304, as depicted in FIG. 4. Although not shown in FIG. 4, it should be understood that the connections between the CITS Container 202 and their respective payloads 204 and external resources 304 are provided via the CITS connectors 226 in each of those CITS Container 202 and the service bus 220 of the CITS Console 200, as depicted in FIGS. 2 and 3.

The sizing tool 402 also may utilize the service details obtained by the factory portal 400 to determine the specific processes or process sets 228 to place in the active pool 300 of a particular CITS Container 202, which may or may not affect the resources upon which that particular CITS Container 202 depends. As specific CITS Containers 202 and specific processes or process sets 228 are identified for utilization within a particular reference implementation architecture, the container GUID for those CITS Containers 202 and process GUIDs for those processes or process sets 228 are written to the solution specification for that reference implementation architecture. Accordingly, the automation scripts, configuration scripts, and/or orchestration workflows that are required to automatically provision, configure, and implement those CITS Containers 202 and the resources upon which they depend may be provided in the CITS specifications 224 of those CITS Containers 202, rather than in the solution specification. Nevertheless, the identities of those resources and their core operating characteristics may be written to the solution manifest so that those resource details may be utilized by the sizing tool 402 to associate container GUIDs and/or process GUIDs with the specific requirements of the corresponding CITS Containers 202 and/or processes or process sets 228 within the context of a particular reference implementation architecture.

Also written to the solution specification are the service metrics that define the service level requested by the service provider and the resource details for the resources upon which the CITS Console 200 and the aggregated set of common capabilities 222 depend. The sizing tool utilizes those resource details together with the service metrics to determine the number of each resource that is required to provide the requested service level via a particular reference implementation architecture. For example, the resource detail for a particular service provider may establish that the service provider system 104 maintained by that service provider employs a physical server host standard that specifies a DELL brand blade server with X86-based hardware, including a dual socket quad core CPU and 64 GB of RAM at each physical server (i.e., Com_HostPlatform=X86 Dell; Com_HostCPUSockets=2; Com_HostCPUCores=4; Com_HostRAMGB=64 GB), and a hosted virtual server standard that specifies a VMware hypervisor with dual virtual CPUs (vCPUs) each requiring 4 GB of RAM at each virtual server (i.e., VirtualServer_Platform=VMware hypervisor; VirtualServer_CPU=2; VirtualServer_Memory=2 CPUs×4 GB/CPU=8 GB). And the service metrics for that service provider may specify an average of 1.2 M virtual machine provisioning requests per day (i.e., PAM_ServerNumProc=1.2 M requests/day). The sizing tool 402 will utilize that sizing information, together with the appropriate reference values, to determine the number of each physical and virtual server that is required to provide that service level.

Based on the corresponding reference values, the sizing tool 402 may presume that each gateway, or catalog, server within the CITS delivery solution is configured to handle five (5) requests per second (i.e., Basic_NumRequest=5 requests/sec.), that each virtual machine provisioning request results in fifty-one (51) transaction process executions (i.e., PAM_ServerNumProcInst=51 process executions/request), and that each orchestration server within the CITS delivery solution is configured to handle 21.6 M simultaneous processes per day (i.e., Basic_NumProc=21.6 M processes/day). The sizing tool 402 converts the number of requests per day to requests per seconds to place it in same the units of measure as the catalog server (i.e., PAM_ServerNumProc=1.2 M requests/day÷24 hr./day÷60 min./hr.÷60 sec./min.=13.9 requests/sec.). Rounding up wherever a fraction results, the sizing tool 402 then determines the number of catalog servers required to support that number of requests based on the capacity of those catalog servers (i.e., 13.9 requests/sec.÷5 requests/sec./server→3 servers).

Continuing with that example, the sizing tool 402 next determines the number of transaction process executions that must be supported by those requests (i.e., 13.9 requests/sec.×51 process executions/request=708.9 process executions/sec.). The sizing tool 402 also converts the number of simultaneous process executions per day to simultaneous process executions per second to place it in the same units of measure as the number of process requests (i.e., Basic_NumProc=21.6 M process executions/day÷24 hr./day÷60 min./hr.÷60 sec./min.=250 process executions/sec.). Again rounding up wherever a fraction results, the sizing tool 402 determines the number of orchestration servers required to support that number of process executions based on the capacity of those orchestration servers (i.e., 708.9 process executions/sec.÷250 process executions/sec./server→3 servers). Finally, the sizing tool utilizes the resource details for the physical and virtual servers at the service provider system 104 to determine the number of each of those resources that is required to support the calculated number of catalog servers and orchestration servers.

Because six (6) virtual servers are required (i.e., VirtualServer_Qty=3 catalog servers+3 orchestration servers=6 virtual servers) and each virtual server utilizes two (2) CPUs and 8 GB of RAM (i.e., 2 CPUs/server×4 GB/CPU=8 GB), the sizing tool 402 determines that a total of twelve (12) CPUs (i.e., 6 virtual servers×2 CPUs/server=12 CPUs) and 32 GB of RAM (i.e., 6 virtual servers×8 GB/server=48 GB) are required to support the subject CITS delivery solution. And by rounding up where a fraction results and taking the larger of the two numbers when the results are different for CPUs and RAM, the sizing tool 402 determines that a total of two (2) physical servers are required to host those six (6) virtual servers because each physical server only provides eight (8) CPUs and 64 GB of RAM (i.e., 12 CPUs 8÷CPUs/server→2 servers; 48 GB÷64 GB/server→1 server; 2>1; Com_HostQty=2). The sizing tool 402 also may determine that one (1) additional physical server is required to host data, for a total of three (3) physical servers. Those physical servers may, for example, correspond to the service servers 118 at a particular service provider system 104.

In a similar manner, the sizing tool 402 also may determine the quantities of various other physical and logical resources that may be required to provide the requested service level via a particular reference implementation architecture. Those resources may reside at a particular service provider system 104, they may be downloaded as payloads 208, they may be provided as external resources 304, or they may be some combination thereof. For example, the sizing tool may determine that two (2) virtual appliances 408 and 408' are required to provide the requested service level via a particular management application, and that two (2) external physical machines 410 and 410' are required to provide the requested service level via a particular business application, as depicted in FIG. 4. As discussed above, one or more capabilities from among the aggregated set of common capabilities 222 may depend upon such management application, and one or more other capabilities from among the aggregated set of common capabilities 222 may depend upon such a management application.

Continuing with that example, the sizing tool 402 also may determine that four (4) virtual appliances 208A, 304B, 304B', and 304B" are required to provide the requested service level via a particular CITS Container 202. There may not be enough virtual server capacity remaining at the subject service provider system 104 to support all four (4) of those virtual appliances 208A, 304B, 304B', and 304B" due to other demands on the services servers 118 at that service provider system 104 (e.g., the demands of the management application that requires two (2) virtual appliances 408 and 408'). Accordingly, one (1) virtual appliance 208A may be downloaded as a payload 208 and deployed on the services servers 118, while three (3) external virtual appliances 304B, 304B', and 304B" may be deployed as external resources 304 on one or more external servers that are maintained by a third-party resource provider, as depicted in FIG. 4. Thus, as particular resources run out of capacity at the service provider system 104, the sizing tool 402 may look outside of that service provider system 104 to identify and determine the number of any external resources 304 that may be required to provide the requested service level.

Because the third-party resource providers that maintain such external resources 304 may adopt different standards from the service provider (e.g., physical server host standards, hosted virtual server standards, etc.), the sizing tool 402 may gather the corresponding sizing information (e.g., VirtualServer_CPU, VirtualServer_Memory, etc.) from those third-party resource providers and determine the number of each of those external resources 304 that is required to provide the requested service level. The sizing tool 402 then may perform different sizing calculations to apportion resource requirements across different systems. For example, the sizing tool 402 may determine that a total of eight (8) CPUs and 96 MB of RAM are required to provide a particular service level supported by a particular resource, and that only two (2) CPUs and 16 MB of RAM remain available at the service provider system 104. Accordingly, the sizing tool 402 may subtract the remaining capacity of the service provider system 104 from the total required capacity to determine the capacity that must be supported by external resources 304 (i.e., 8 CPUs–2 CPUs=6 CPUs; 96 GB–16 GB=80 GB). And if the third-party resource provider that maintains the subject external resources 304 adopts a physical server host standard that specifies a HEWLETT PACKARD brand blade server with X86-based hardware, including a single socket quad core CPU server and 32 GB of RAM at each physical server (i.e., PhysicalServerVM_Platform=X86 Hewlett Packard; PhysicalServerVM_Sockets=1; PhysicalServerVM_Cores=4; PhysicalServerVM_Memory=32 GB), the sizing tool 402 will utilize that sizing information to determine that three (3) physical servers are required at the third-party resource provider (i.e., 6 CPUs÷4 CPUs/server→2 servers; 80 GB÷32 GB/server→3 server; 3>2; PhysicalServerVM_Qty=3).

In the alternative, the sizing tool 402 may determine the capacity that must be supported by third-party resource provider and provide that requirement to the third-party resource provider so that the third-party resource provider may determine for itself the number of physical and/or logical resources that must be provided to support that capacity. That sizing information may be provided in terms of physical requirements (e.g., number of CPUs, amount of RAM, etc.) when only a physical resource is required, or it may be provided in terms of the actual service level required (e.g., service volume, service quality, service availability, etc.) when both physical and logical resources are required. In the latter instance, for example, the sizing tool 402 may determine that virtual servers hosted on the services servers 118 can handle 800,000 requests per day of a 1.2 M request per day service level requirement, in which case the sizing tool 402 would request virtual servers at a third-party resource provider that can handle the balance of 400,000 request per day (i.e., 1.2 M requests/day–800,000 requests/day=400,000 request/day). The third-party resource provider then may allocate its virtual servers and the physical servicers that host those virtual servers accordingly.

After determining the number of each resource required to provide the requested service level for a particular reference architecture implementation, the sizing tool 402 writes those sizing parameters to the solution specification for that particular reference architecture implementation. Accordingly, the solution specification specifies the core operating characteristics of each of the resources required to deploy the underlying CITS delivery solution (e.g., Com_HostInterconnectionSpeed, Com_TotalNumberofNICs, SC_ClientSCVersion, etc.), the detailed deployment topology and configuration of those resources within that CITS delivery solution (e.g., SC_ClientWFOrch, SC_Cluster, SC_EDV_Size, etc.), and the quantities of each of those resources that are required to support the requested service level with that CITS delivery solution (e.g., Com_HostQty, PhysicalServerVM_Qty, VirtualServerQty, etc.). The sizing tool 402 then may export the solution specification to the deployment automation tool 404 as a machine-readable file (e.g., .xml, .txt, .doc, .pdf, etc.). That file may be consumed by the deployment automation tool 404 and utilized to generate pre-configured software bundles or set of virtual appliances that may be deployed as the subject CITS delivery solution. If the automation tool 404 determines that the file generated by the sizing tool 402 does not contain all of the information required to generate those software bundles or that set of virtual appliances, the solution administrator or service provider may be prompted to input any additional information that may be required, such as via an input device (e.g., a keyboard, a mouse, etc.) at the solution administrator GUI 116 or the solution provider GUI 126.

The software bundles that may be generated by the deployment automation tool 404 are configured to be provisioned to physical and/or logical resources within the context of a particular CITS delivery solution. Each such software bundle is configured to function interoperably with each other software bundle so that, when deployed, all of those software bundles seamlessly integrate within one another to provide a single, multi-product CITS delivery solution. Accordingly, different products may be embodied in separate software bundles. Different products also may be packaged in the same software bundles, such as when those products are configured to be deployed on the same physical or logical resource, such that software bundles are generated on a resource-by-resource basis, rather than on a product-by-product basis.

The deployment automation tool 404 is configured to expand the information written to the solution specification into all of the automation scripts, configuration scripts, orchestration workflows, and resource connectors that are required to automatically provision, configure, and deploy the various resources that are required to support a particular CITS delivery solution. Accordingly, each software bundle may comprise its own set of automation scripts, configuration scripts, orchestration workflows, and resource connectors so that each such software bundle may be automatically deployed on or as a separate resource. And because certain products and/or resources may need to be provisioned, configured, and/or deployed before others, each software bundle also may comprise sequencing information that establishes the logical order in which each software bundle is to be provisioned, configured, and/or deployed.

A software bundle may be provisioned to a physical resource or a logical resource. A software bundle also may be deployed as a logical resource. Accordingly, a software bundle may provision a logical resource to a physical resource. A software bundle also may comprise both an application and the logical resource that hosts that application. As depicted in FIG. 4, for example, a first software bundle may comprise a virtual appliance and a management application that are configured to be deployed as a management application hosted on two (2) virtual appliances 408 and 408' at one or more of the services servers 118, and a second software bundle may comprise a business application that that is configured to be deployed on two (2) external physical machines 410 and 410' maintained by a third-party resource provider. Those software bundles are packaged as separate bundles so that they may be deployed on separate systems (i.e., the service provider system 104 and a third-party resource provider system). And although not shown in FIG. 4, it should be understood that the connections between the CITS Console 200 and the virtual appliances 408 and 408' and external physical machines 410 and 410' may be provided via the console connectors 218 in that CITS Console 200 and the service bus 220 of the CITS Console 200, as depicted in FIGS. 2 and 3.

As an alternative to such software bundles, the deployment automation tool 404 also may package all of the products that are required to support a particular CITS delivery solution in a single set of fully configured virtual appliances. For example, a set of fully configured virtual appliances may be deployed on a hypervisor that operates on a physical/virtual infrastructure platform (e.g., a VBLOCK brand hardware platform from VCE, a UCS brand hardware platform from Cisco, an ESX brand hypervisor from VMware running on a VBLOCK or UCS brand hardware platform, etc.). Like the software bundles described above, each virtual appliance within that set of virtual appliances may comprise all of the automation scripts, configuration scripts, orchestration workflows, and resource connectors that are required to automatically provision, configure, and deploy that particular appliance. And because the target hypervisor may support a single automation/configuration standard, the process of creating those automation scripts, configuration scripts, orchestration workflows, and resource connectors also may utilize a single automation/configuration standard. By contrast, the deployment automation tool 404 may be required to utilize multiple different single automation/configuration standard when software packages must be deployed on multiple different resources.

Regardless of the type of output generated by the deployment automation tool 404, that output may comprise all of the relevant documentation notes about the each resource that makes up the underlying CITS delivery solution; any extensible elements utilized by those resources; any templates that may be applied to or by those resources; the characteristics of each node for each of those resources; the group characteristics of those nodes; the topology characteristics for those individual nodes and those groups of nodes, relational data defining the relationships between those resources, those nodes, and those groups of nodes; the identify of the type of each of those resources and each of those nodes; and the execution plans for provisioning, configuring, and deploying the components of the subject CITS delivery solution in the proper sequence. That output is provided to the software delivery engine 406, where it is utilized to provision, configure, and deploy those resources and those nodes in the sequence set forth in that execution plan. Further, that output may be saved as a named solution in the central registry database 114 of the solution provider system 102 and/or the local registry database 124 of a service provider system 104 so that it may subsequently be re-used by the solution administrator and/or a service provider to re-deploy the resulting CITS delivery solution.

The software delivery engine 406 provisions resources by exporting the subject software bundles or set of virtual appliances to the logical and/or physical resource(s) on which each software bundles was configured to be deployed. As depicted in FIG. 4, for example, the software delivery engine 406 may utilize a first software bundle to install a CITS Console 200 on the services servers 118 at a particular service provider solution 104; utilize a second software bundle to install a two (2) virtual appliances 408 and 408' on that services servers 118 and to install a management application on those virtual appliances 408 and 408'; and utilize a third software bundle to install a business application on two (2) external physical machines 410 and 410' that are maintained by a third-party resource provider. Although only the services servers 118, the virtual appliances 408 and 408', and the physical machines 410 and 410' are shown as resources that support the common functionality of the CITS Console 200, it should be understood that other resources also may be required to support that common functionality. Moreover, unique functionality may be added by plugging CITS Containers 202 into that CITS Console 200, which may require other resources to be provisioned, as also depicted in FIG. 4.

The software delivery engine 406 may configure resources by utilizing the CITS connectors 226 in the CITS Console 200 to connect those resources to each other. Those connections may be direct or via the service bus 220. They also may be made via standard internet protocols. The software delivery engine 406 also may configure resources by applying operating parameters (e.g., instructing a server to operate against a cluster, enabling out-of-bounds content, etc.) and service provider preferences (e.g., setting storage preferences, adopting a specific enterprise nomenclature, etc.) to those resources. Those operating parameters are based on the solution model defined by the selected reference implementation architecture and the output of the sizing tool 402, and those consumer preferences are based on personalization information gathered by the factory portal 400.

Personalization information may be gathered by the factory portal 400 as input received from a service provider via an input device (e.g., a keyboard, a mouse, etc.) at a service provider GUI 126, or it may automatically be extracted from a service contract that has been loaded into the factory portal 400 in a machine-readable format (e.g., .xml, .txt, .doc, .pdf, etc.) and/or from a CMDB. Such personalization information comprises, for example, security preferences (e.g., antivirus preferences, single sign-on preferences, etc.), authorizations (e.g., users with full access to catalog, users that may initiate service requests, etc.), performance preferences (e.g., QoS levels, QoS routes, etc.), storage preferences (e.g., tiers, source platforms, etc.), network preferences (e.g., static IP addressing, NIC preferences, etc.), licensing details (e.g., terms of licensed storage, licensed software packages, etc.), enterprise nomenclature (e.g., server names, type of environment, etc.), and sequencing preferences (e.g., resource availability, deployment preferences, etc.). The software delivery engine 406 utilizes that personalization information to configure resources and the access to those resources according to a service provider's specific preferences so that the underlying CITS delivery solution may be customized to operate within the parameters of an existing enterprise solution.

The software delivery engine 406 may deploy the resources required by a particular CITS delivery solution either before or after those resources are configured according to the service provider's preferences. Those resources provide the foundation for the overall CITS delivery solution, which may be modularly expanded through the addition of CITS Containers 202. Accordingly, the initial deployment of the CITS delivery solution generally may comprise a CITS Console 200 and each of the resources upon which it depends. And after that CITS Console 200 and its corresponding resources are deployed, the software delivery engine 406 may validate that deployment by testing the connections between those solution components and verifying that each of those solution components is functioning properly.

The software delivery engine 406 then may determine if any CITS Containers 202 are required to support the overall CITS delivery solution. If CITS Containers 202 are required, those CITS Containers 202 may automatically be implemented by the CMC Service 212. As described above, such implementation comprises provisioning, configuring, and deploying any resources (e.g., payloads 208 and/or external resources 304) upon which each of those CITS Containers 202 depends. As depicted in FIG. 4, for example, three (3) CITS Containers 202 are required to support the overall CITS delivery solution—the first of which depends upon a plurality of virtual appliances 208A, 304B, 304B', and 304B"; the second of which depends a business application 208B and the third CITS Container 202; and the third of which depends upon an external cloud IT resource 304A that it connects to via an API 208E. Accordingly, each of those resources is provisioned, configured, and deployed by the CMC Service 212 to complete the deployment of the CITS delivery solution. That completed CITS delivery solution then may be made available for consumption by the service provider's customers.

Turning to FIGS. 5-8, an example of a solution model deployment process 500 is illustrated. That process 500 may be utilized to automatically provision, configure, and deploy a CITS delivery solution at a servicer provider system 104 and comprises each of the steps depicted in FIG. 5 (i.e., Steps 502-528), at least some of the steps depicted within the dashed-line box in FIG. 6 (i.e., Steps 602-612), each of the steps depicted in FIG. 7 (i.e., Steps 702-716); and each of the steps depicted within the dashed-line box in FIG. 8 (i.e., Steps 802-814), as depicted by off-page connectors A-E in FIGS. 5-8. The remaining steps in FIG. 6 (i.e., Steps 614-626) may be utilized, together with the steps depicted within the dashed-line box (i.e., Steps 602-612), to perform a container implementation and modification process 600 for implementing and modifying different CITS Containers 202 after the underlying CITS delivery solution is deployed via the solution model deployment process 500. And the remaining steps in FIG. 8 (i.e., Steps 816 and 818) may be utilized, together with the steps depicted within the dashed-line box (i.e., Steps 802-814), to perform a container execution process 800 for selecting and invoking different services or service offerings 228 within a CITS Container 202 that has been implemented via the solution model deployment process 500 and/or the container the implementation and modification process 600. The steps 702-716 depicted in FIG. 7 may be utilized to perform a service offering publication process 700.

In the solution model deployment process 500 of FIGS. 5-8, the subject CITS delivery solution is deployed as a CITS Console 200, which comprises the console portal 210, the CMC Service 212, the orchestration engine 214, the service request catalog 216, the console connectors 218, the intermediary interconnect or service bus 220, and the aggregated set of common capabilities 222. If the CITS delivery solution also requires one or more CITS Consoles 202 as part of that solution, the CMC Service 212 may be utilized to implement those CITS Containers 202 during the solution model deployment process 500. Accordingly, the CMC Service 212 comprises, among other elements, a pool/grid controller that instantiates and deploys any payloads 208 upon which those CITS Containers 202 may depend.

Figure 5:
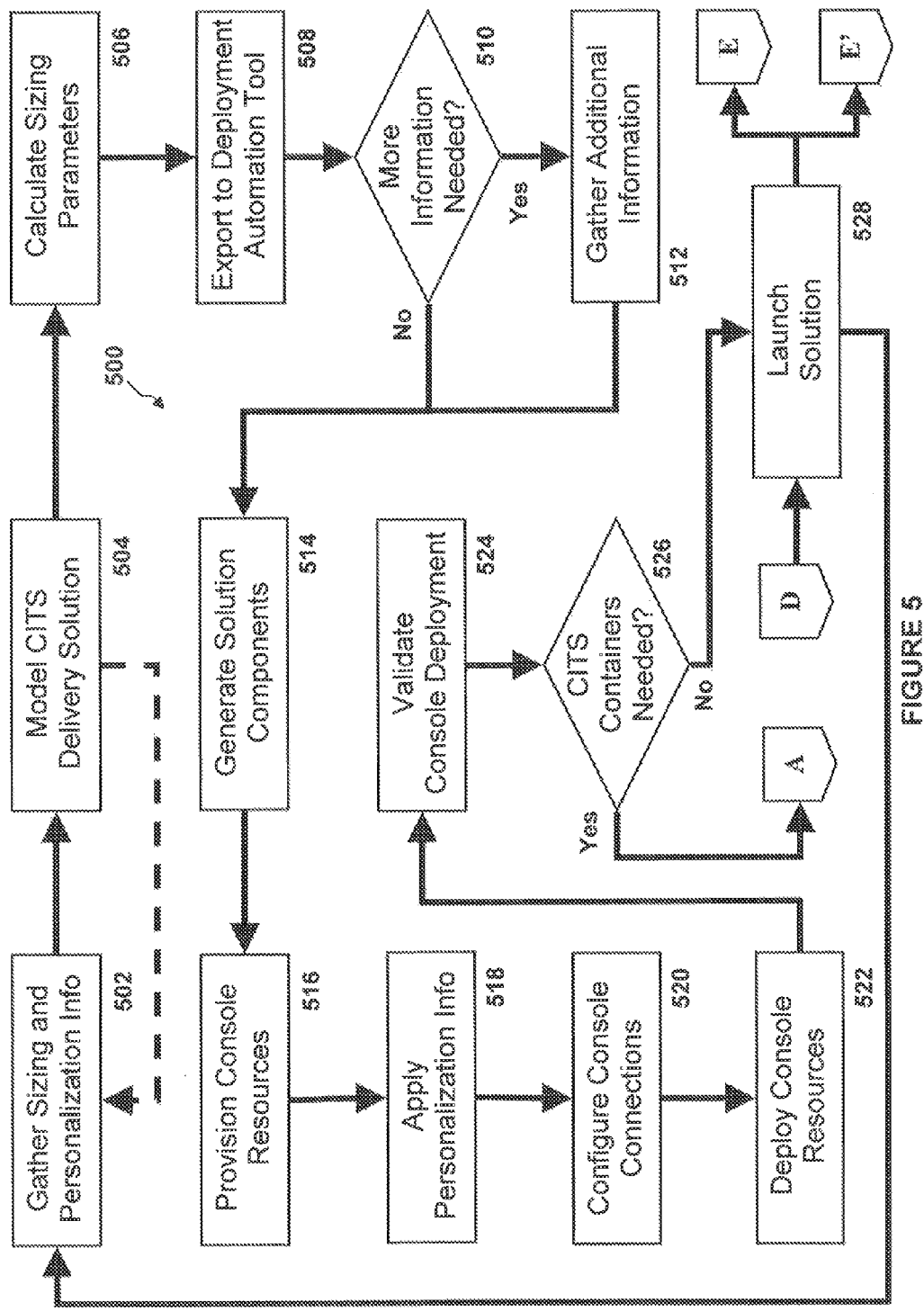
FIG. 5 is a flow diagram illustrating an example of a solution model deployment process according to a non-limiting embodiment of the present disclosure, which includes portions of the processes depicted in FIGS. 6 and 7.

At step 502, the factory portal 400 gathers the sizing information that is utilized by the sizing tool 402 to model the CITS delivery solution and the personalization information that is utilized by the software delivery engine 406 to customize that CITS delivery solution to suit a particular service provider's preferences. That information may be input manually via an input device (e.g., a keyboard, a mouse, etc.) at a solution administrator GUI 116 or a service provider GUI 126, it may be extracted automatically from a service contract that has been loaded into the factory portal 400, it may be extracted automatically from a CMDB or machine-readable file, or it may be gathered using any combination thereof. And although FIG. 5 depicts that both the sizing information and the personalization information are gathered in a single step, it should be understood that the personalization information may be gathered as a separate step at any point prior to its use by the software delivery engine 406 at step 518.

At step 504, the sizing tool 402 utilizes the personalization information gathered by the factory portal 400 to select a reference implementation architecture to model the subject CITS delivery solution. For example, the sizing tool 402 may utilize the type of service information gathered by the factory portal 400 to determine which reference implementation architecture should be selected to model the subject CITS delivery solution. The sizing tool 402 also may evaluate the various elements of the selected reference implementation architecture at step 504 to validate the boundaries of the CITS delivery solution and determine what other information is required to model that CITS delivery solution. If any additional information is required, the solution administrator and/or the service provider may be prompted to input such information by repeating step 502, as depicted by the dashed-line arrow extending from step 504 back to step 502 in FIG. 5.

The reference implementation architecture selected at step 502 may be selected from among a plurality reference implementation architectures stored in the global registry 114 at the solution provider system 102. Each reference implementation architecture comprises a solution specification that provides all of the information required to identify, size, and configure a particular CITS delivery solution, including the identify of the various resources required to support that particular CITS delivery solution and any information required to deploy those resources within the context of the CITS delivery solution. For example, the solution specification may identify a particular CITS Console 200 that may be utilized to deploy a particular CITS delivery solution. The solution specification also may identify any CITS Containers 202 that are required to provide specific services and/or service offerings as part of a particular CITS delivery solution.

The sizing tool 402 may model the CITS delivery solution at step 504 by selecting which capabilities to provide as part of the aggregated set of common capabilities 222 of the CITS Console 200 that is identified by the solution specification, selecting which processes and/or process sets 228 to activate within each CITS Container 202 that is identified by the solution specification, by identifying the various resources upon that CITS Console 200 those CITS Containers 202 may depend, and by mapping the dependencies of those resources within the overall CITS delivery solution. For example, the sizing tool 402 may utilize the service details obtained by the factory portal 400 to automatically select one or more CITS Containers 202 that are configured to provide the underlying services or service offerings defined by those service details and to automatically select the specific processes or process sets 228 to place in the active pool 300 of a particular CITS Container 202 to support those services or service offerings. Those CITS Containers 202 then are mapped to any resources upon which they may depend so that the required quantity of each of those resources may be determined.

At step 506, the sizing tool 402 utilizes the sizing information gathered by the factory portal 400 together with the corresponding reference values to determine the quantity of each resource identified by the solution specification that is required to provide the service level requested by the service provider for whom the CITS delivery solution is being generated. An example of the sizing calculations that may be performed at step 506 are provided above. In that example, the sizing tool 402 determines the quantity of physical servers (e.g., services servers 118, servers at third-party resource providers, etc.) that must be deployed to support a particular CITS delivery solution based on the number of server provisioning requests that a service provider specifies as a required service level. Similarly, the sizing tool 402 may determine the required quantity of other resources based on the number of requests that must be handled for the services, service offerings, and/or functionality that are supported by those resources, such that the overall resource requirements may be determined by totaling the results of those calculations for each resource.

For example, the sizing tool 402 may determine that four (4) virtual appliances 208A, 304B, 304B', and 304B" are required to support a specified number of requests for a service or service offering that is supported by a particular CITS Container 202. And if the sizing tool determines that there is only a certain amount of capacity remaining on the services servers 118 at the service provider system 104 on which the CITS delivery solution is to be deployed based on the results of other sizing calculations, the sizing tool 402 may determine that only one (1) virtual appliance 208A may be deployed on the services servers 118 at that service provider system 104 and that the remaining capacity is to be provided by three (3) external virtual appliances 304B, 304B', and 304B" at one or more external servers, as depicted in FIG. 4. Those external resources 304 also may be mapped by the sizing tool 402 so that, as the sizing tool 402 determines the quantity of each resource required by a particular CITS delivery solution, the solution specification may be updated to reflect the resulting topology and configuration characteristics of CITS delivery solution.

The sizing tool 402 also may determine quantity of each resource upon which the CITS Console 200 depends, apart from any CITS Containers 202, so that the CITS Console 200 may be deployed independently of CITS Containers 202. In FIG. 4, for example, the sizing tool 402 determines that one or more capabilities from among the aggregated set of common capabilities 222 depends upon a two (2) virtual appliances 408 and 408' at one or more services servers 118 and that one or more other capabilities from among the aggregated set of common capabilities 222 depends upon two (2) external physical machines 410 and 410' maintained by a third-party resource provider. Those additional resources also are mapped by the sizing tool 402.

At step 508, sizing tool 402 writes the resulting sizing parameters to the solution specification of the selected reference architecture implementation and exports that solution specification to the deployment automation tool 404 as a machine-readable file (e.g., .xml, .txt, .doc, .pdf, etc.) that may be consumed by the automation tool 404. The resulting solution specification comprises the core operating characteristics of each of the resources required to deploy the underlying CITS delivery solution, the detailed deployment topology and configuration of those resources within that CITS delivery solution, and the quantities of each of those resources that are required to support the requested service level with that CITS delivery solution. And if the automation tool 404 determines at step 510 that the solution specification does not contain all of the information required to generate deployable solution components at step 514 (i.e., Step 510=Yes), the solution administrator or service provider may be prompted to input the required information at step 512, such as via an input device (e.g., a keyboard, a mouse, etc.) at the solution administrator GUI 116 or the solution provider GUI 126, before the solution model deployment process 500 proceeds to step 514.

At step 514, the deployment automation tool 404 utilizes the output of the sizing tool 402 to generate deployable solution components either as pre-configured software bundles or as a set of virtual appliances. The deployment automation tool 404 is configured to expand the information written to the solution specification into all of the automation scripts, configuration scripts, orchestration workflows, and resource connectors that are required to automatically provision, configure, and deploy the various resources that are required to support a particular CITS delivery solution. Accordingly, each such software bundle may be configured to be deployed separately to different logical or physical resources but to function interoperably with each other so that, when deployed, all of those software bundles seamlessly integrate within one another to provide a single, multi-product CITS delivery solution. As an alternative to such software bundles, the deployment automation tool 404 also may package all of the products that are required to support a particular CITS delivery solution in a single set of fully configured virtual appliances that may be deployed on a single resource (e.g., a hypervisor that operates on a physical/virtual infrastructure platform).

At step 516, the software delivery engine 406 provisions the subject software bundles or set of virtual appliances to the logical and/or physical resource(s) on which each software bundles was configured to be deployed. That step of provisioning may comprise exporting those software bundles or that set of virtual appliances to the target resource(s) and initiating their installation on those target resource(s). As depicted in FIG. 4, for example, the software delivery engine 406 may utilize a first software bundle to install a CITS Console 200 on the services servers 118 at a particular service provider solution 104; utilize a second software bundle to install a two (2) virtual appliances 408 and 408' on that services servers 118 and to install a management application on those virtual appliances 408 and 408'; and utilize a third software bundle to install a business application on two (2) external physical machines 410 and 410' that are maintained by a third-party resource provider. In that example, the first and second software bundles are transmitted to the services servers 118 at the target service provider system 104. Accordingly, those two (2) software bundles also may be provisioned as a single bundle that is configured to install those different software components on those services server 118. As yet another alternative, the second software bundle may be provisioned as two (2) separate bundles—a first bundle that installs the virtual appliance on the services servers 118 and a second bundle that installs the management application on that virtual appliance 408.

As should be understood from the foregoing example, each such software bundle comprises an execution plan that establishes the proper sequence for provisioning, configuring, and deploying each software bundle and its corresponding resource. The execution plan for that example may establish that the CITS Console 200 is to be loaded onto the services servers 118 first, that the two (2) virtual appliances 408 and 408' are to be installed on that services servers 118 second, that the corresponding management application is to be installed on those two (2) virtual appliance 408 and 408' third, and that a business application is to be installed on the two (2) external physical machines 410 and 410' any time after the CITS Console 200 is loaded onto the services servers 118. That sequence ensures that the proper foundation is laid for each succeeding installation so that each component of the CITS delivery solution can be installed and configured in the proper context. Accordingly, the software delivery engine 406 also may begin to configure the provisioned resources at step 516 by applying various operating parameters (e.g., instructing a server to operate against a cluster, enabling out-of-bounds content, etc.) to those resources.

Although step 516 is described in terms of installing the CITS Console 200 on the services servers 118 of the target service provider system 104, it should be understood that the CITS Console 200 also may be installed on the solution servers 108 of the solution provider system 102 or on a third-party system maintained by a third-party resource provider. It should also be understood that the different components 210-222 of the CITS Console may be provided on different systems. For example, the CMC Service 212 may be installed on the solution servers 108 of the solution provider system 102 and accessed via the network connection 106. And as depicted in FIG. 4, a business application upon which one or more of the aggregated set of common capabilities 222 depends may be installed on an external physical machine 410 maintained by a third-party resource provider.

At step 518, the software delivery engine 406 utilizes the personalization information gathered by the factory portal 400 at step 502 to apply service provider preferences (e.g., setting storage preferences, adopting a specific enterprise nomenclature, etc.) to the provisioned resources. For example, the software delivery engine 406 may configure a tiered storage solution, establish static IP addresses, and name servers according to those service provider preferences. The software delivery engine 406 also may establish different access rights, service levels, and service routes based on those service provider preferences. Accordingly, the underlying CITS delivery solution may be customized to operate within the established parameters of an existing enterprise solution.

At step 520, the software delivery engine 406 may complete the configuration of the provisioned resources by utilizing the CITS connectors 226 in the CITS Console 200 to connect those resources to each other. Those connections may be direct or via the service bus 220. They also may be made via standard internet protocols. As depicted in FIG. 4, for example, one or more capabilities from among the aggregated set of common capabilities 222 is connected to a management application hosted on two (2) virtual appliances 408 at step 520, and one or more other capabilities from among the aggregated set of common capabilities 222 is connected to a business application hosted on two (2) external physical machines 410 at step 520. Completing those connections completes the configuration of the provisioned console resources.

At step 522, the software delivery engine 406 deploys the provisioned and configured console resources, thereby rendering the subject CITS delivery solution operational. The resulting deployment provides the foundation for the overall CITS delivery solution, which may be modularly expanded through the addition of CITS Containers 202. And after that CITS Console 200 and its corresponding resources are deployed at step 522, the software delivery engine 406 may validate that deployment at step 524 by testing the connections between those solution components and verifying that each of those solution components is functioning properly. Accordingly, step 524 also may comprise any troubleshooting that is required resolve any issues with the deployment before the solution model deployment process 500 proceeds to step 526.

At step 526, the software delivery engine 406 determines whether any CITS Containers 202 are required as part of the subject CITS delivery solution. If the software delivery engine 406 determines that no CITS Containers 202 are required (i.e., Step 526=No), the solution model deployment process 500 proceeds to step 528, during which the validated CITS delivery solution is made available for consumption by the service provider's customers. And if the software delivery engine 406 determines that CITS Containers 202 are required (i.e., Step 526=Yes), the solution model deployment process 500 proceeds to step 602 of the container implementation and modification process 600, as depicted by off-page connector A in FIGS. 5 and 6.

Figure 6:
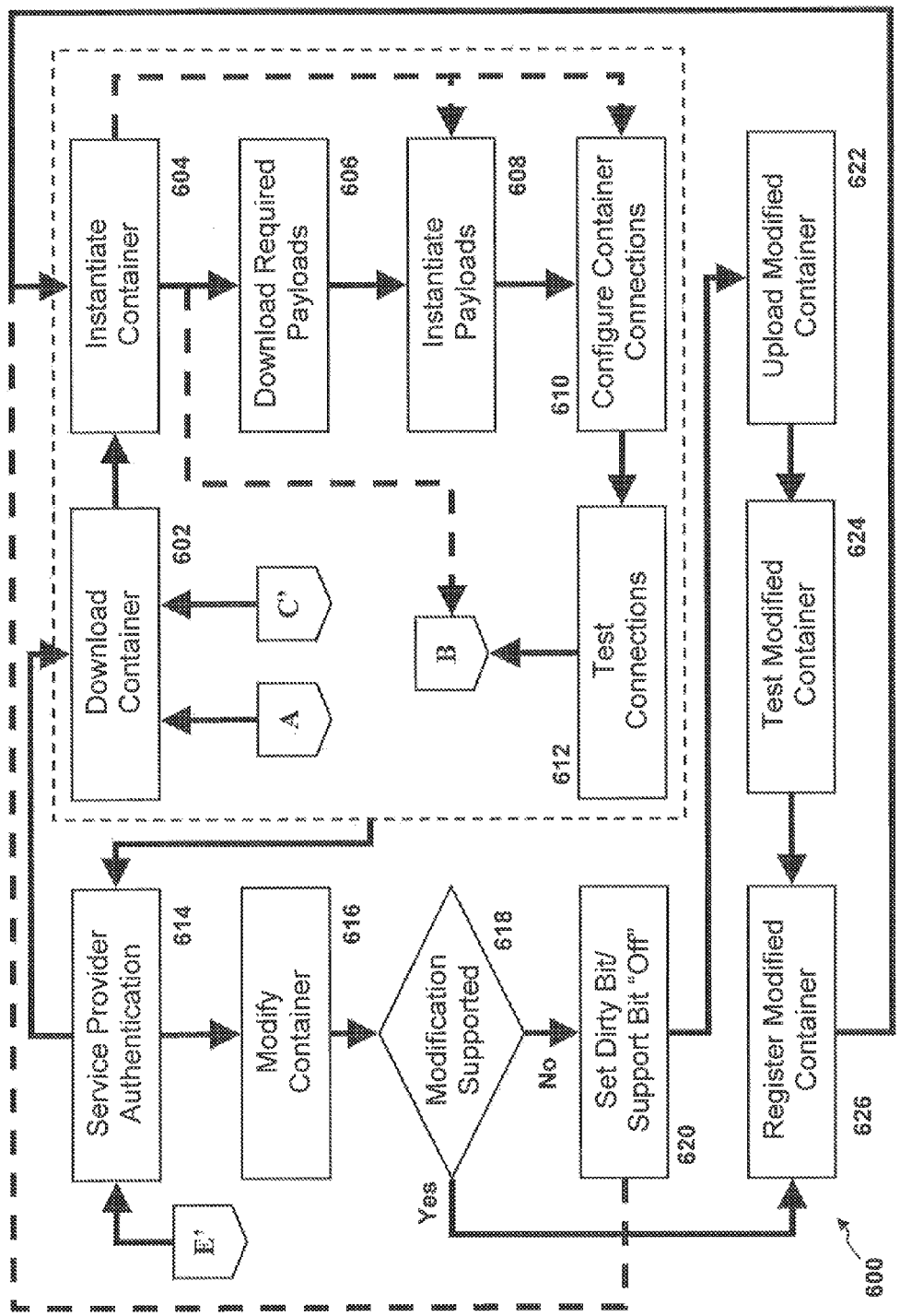
FIG. 6 is a flow diagram illustrating an example of a container implementation and modification process according to a non-limiting embodiment of the present disclosure.

Turning to FIG. 6, the depicted container implementation and modification process 600 may be automatically initiated at step 602 by the software delivery engine 406 if the software delivery engine 406 determines that CITS Containers 202 are required (i.e., Step 526=Yes), or it may be manually initiated at step 602 by either a solution administrator or a service provider after the CITS delivery solution has been launched at step 528. Downloading a CITS Container 202 at step 602 initiates an autonomic process, which is performed at steps 604-612. The CITS Containers 202 that are downloaded at step 602 of the container implementation and modification process 600 are selected from the global container registry that is maintained in the central registry database 114 of the solution provider system 102. Those CITS Containers 202 then are downloaded from the central container database 110 of the solution provider system 102 to the local container database 120 of the service provider system 104.

When a CITS Container 202 is downloaded to the local container database 120 of the service provider system 104, it is added to the local container library that is maintained on the local container database 120. Further, if the downloaded CITS Container 202 is designated as a supported CITS Container 202, its container GUID is registered in the local registry on the local registry database 124 together with the process GUIDs for any processes or process sets 228 provided in that CITS Container 202. The SO template 230 also may be registered in the local registry on the local registry database 124 so that the CMC Service 212 may keep track of the SO templates 230 provided for each of the different cloud IT services as well as the CITS Containers 202 that are configured to utilize those SO templates 230.

At step 604, the orchestration engine 214 instantiates the downloaded CITS Container 202 in the context of the particular cloud IT service solution by invoking operations provided in the CITS specification 224 (e.g., Instantiate, Activate, etc.). At step 606, the orchestration engine 214 reads and decomposes automation scripts from the CITS specification 224 and invokes those scripts or workflows to automatically download any payload(s) 208 that may be required to implement that CITS Container 202. As described above, the CMC Service 212 may automatically connect to the solution provider system 102 and download the payload(s) 208 to the local payload database 122 of the service provider system 104 from the central payload database 112 of the solution provider system 102. And at step 608, the pool/grid controller instantiates the downloaded payloads 208 by invoking instances of those the downloaded payloads 208 in the payload pool/grid deployment 204.

When a payload 208 is downloaded, it is added to the local payload library on the local payload database 122. That payload 208 then may be utilized to support any CITS Container 202 that may subsequently be downloaded and that also depends on that payload 208. Accordingly, a payload 208 may be deployed directly from the local payload database 122 when it already has been downloaded, rather than being downloaded from the central payload database 112 before it is deployed for a particular CITS Container 202. Thus, step 606 may be skipped if all of the payloads 208 required by a downloaded CITS Container 202 already have been downloaded, as depicted by the dashed-line arrow extending from step 604 to step 608 in FIG. 6. Further, a downloaded CITS Container 202 may depend only upon external resources 304, such that no payloads 208 need to be downloaded at step 606 or instantiated at step 608. Thus, both step 606 and step 608 may be skipped if no additional payloads 208 are required by a downloaded CITS Container 202, as depicted by the dashed-line arrow extending from step 604 to step 610 in FIG. 6.

At step 610, the orchestration engine 214 reads and decomposes configuration scripts from the CITS specification 224 and invokes those scripts to automatically configure, or pair, the CITS Container 202 with the instantiated payload(s) 208 and/or with any external resource 304 or other CITS Containers 202 upon which that CITS Container 202 may depend. The CITS Container 202 is paired with those payloads 208, external resources 304, and/or other CITS Containers 202 via its corresponding CITS connectors 226. And if that CITS Container 202 depends upon one or more payloads 208 or other logical resources, the orchestration engine 214 consumes or executes orchestration workflows to perform operations on the appropriate CITS connectors 226 provided within the CITS Container 202 so that those CITS connectors 226 may be translated to their corresponding physical implementations at the service provider servers 118 of the service provider system 104, the console connectors 218 of the CITS Console 200, and/or the external resources 304 provided by a third-party resource provider. Accordingly, the CITS Container 202 may be configured to connect to payloads 208 and/or external resources 304 directly via its corresponding CITS connectors 226; indirectly via its corresponding CITS connectors 226 and the console connectors 218 of the CITS Console 200; or indirectly via its corresponding CITS connectors 226, the console connectors 218 of the CITS Console 200, and the service bus 220. As yet another alternative, the CITS Container 202 also may be configured to connect to payloads 208 and/or external resources 304 via standard internet protocols.

The object schema definition in the CITS specification 224 contains the download instructions and the link information for any payload(s) 208 and/or external resources 304 that may be required to implement a particular CITS Container 202, as well as any information required to determine and apply the appropriate translation between any logical resource and its physical implementation at a payload 208 and/or external resource 304. The specific resource abstractions required to perform such translations may be provided resource connectors, such as the console connectors 218 and the CITS connectors 226. The abstractions of the console connectors 218 may be utilized to perform translations for more than one CITS Container 202, while the abstractions of the CITS connectors 226 may be specific to a particular CITS Container 202, which is why the latter are provided in the CITS Container 202, rather than in the CITS Console 200.

At step 612, the orchestration engine 214 runs a test to confirm that the connections between the CITS Containers 202 and the payloads 208 and/or external resources 304 configured at step 610 are properly functioning. More specifically, the orchestration engine 214 runs a test to determine whether the processes or process sets 228 in each CITS Container 202 are configured to connect to the correct payloads 208 and/or external resources 304, and that those connections are configured as required to provide the services that are supported by that CITS Container 202. Such a test may include establishing temporary connections with and issuing test commands to the subject payloads 208 and/or external resources 304. The subject payloads 208 and/or external resources 304 then will return a "completed" or "failed" status and the reporting database capability of the CITS Console 200 will monitor the performance of the connections. If the returned status is "completed" and the connections perform as required, the connections will pass the test performed at step 612 and the container implementation and modification process 600 will proceed to step 702 of the service offering publication process 700, as depicted by off-page connector B in FIGS. 6 and 7. Accordingly, step 612 completes the autonomic process initiated by downloading a CITS Container 202 at step 602.

In addition to being utilized as part of solution model deployment process 500, steps 602-612 of the container implementation and modification process 600 also may be utilized after the CITS delivery solution has been launched at step 528 to add new services or service offerings to the CITS delivery solution in a self-service manner by adding new CITS Containers 202 to the CITS Console 200. After the CITS delivery solution has been launched at step 528, a service provider may be authenticated at step 614 of the container implementation and modification process 600 before that service provider is permitted to modify any CITS Containers 202 that have already been downloaded. A service provider also may be authenticated at step 614 before that service provider is permitted to download additional CITS Containers 202 after the CITS delivery solution has been launched at step 528, as depicted by off-page connector E' in FIGS. 5 and 6. Further, steps 616-626 of the container implementation and modification process 600 may be utilized after the CITS delivery solution has been launched at step 528 to modify any CITS Containers 202 that were downloaded during or after the CITS delivery solution was launched at step 528.

Depending on the cloud IT service or service offering and the contents of a particular CITS Container 202, that CITS Container 202 may not depend upon any payloads 208 and/or any external resources 304 to support its cloud IT services or service offerings. In that instance, the CITS Container 202 may comprise all of the operations required to implement its cloud IT services or service offerings when combined with the aggregated set of common capabilities 222 of the CITS Console 200. Thus, steps 606-612 may be skipped if the CITS Container 202 does not depend upon any payloads 208 or any external resources 304 to support its cloud IT services or service offerings, as depicted by the dashed-line arrow extending from step 604 to off-page connector B in FIG. 6.

Figure 7:
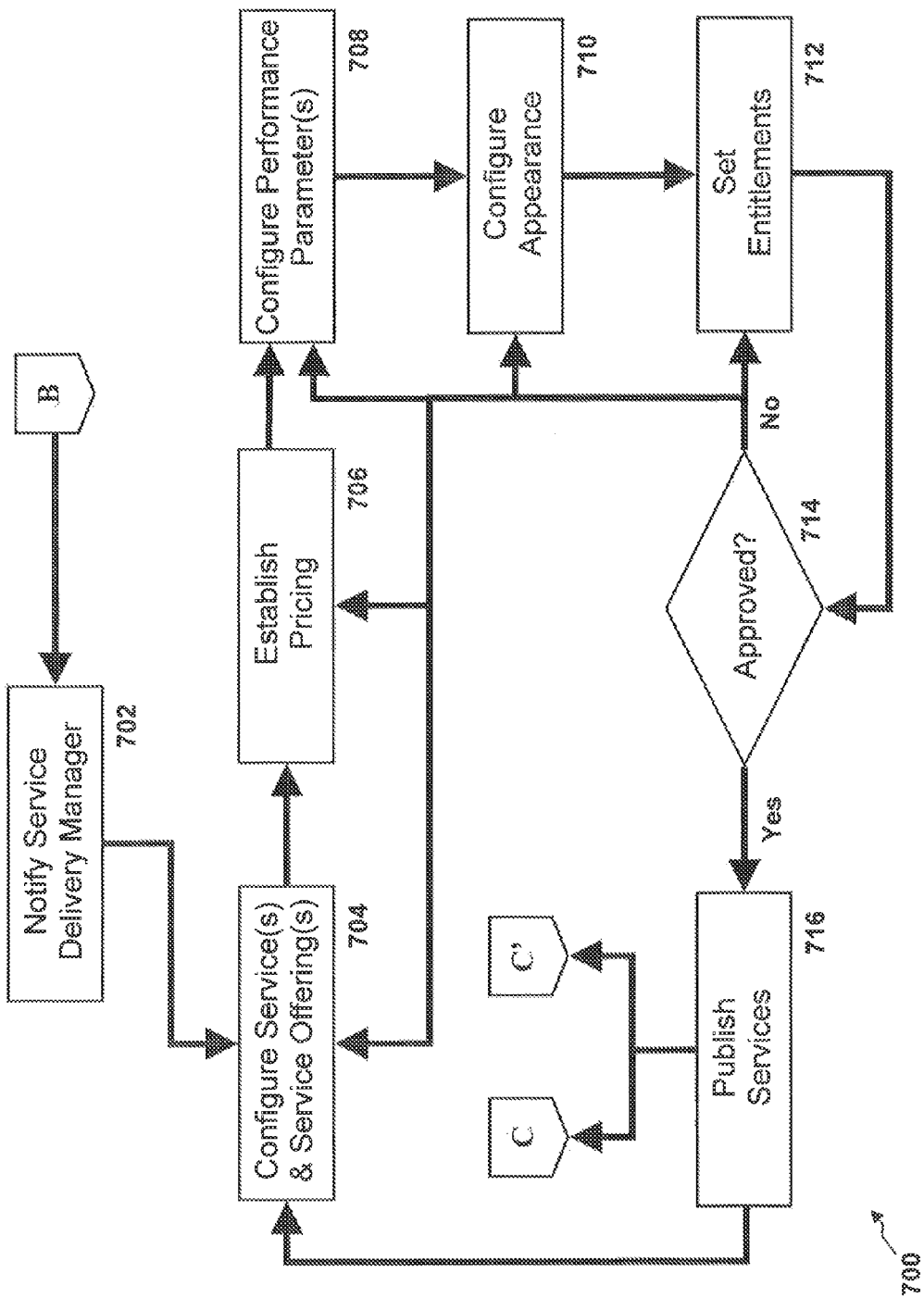
FIG. 7 is a flow diagram illustrating an example of a service offering publication process according to a non-limiting embodiment of the present disclosure.

Turning to FIG. 7, at step 702 of the service offering publication process 700 depicted therein, a service delivery manager (e.g., a service administrator at the cloud IT service provider with privileges to publish cloud IT services and service offerings to the service request catalog 216) is notified that a CITS Container 202 has been, or is being, plugged in to the CITS Console 200 and that the user-facing interfaces for the cloud IT services and/or service offerings supported by that CITS Container 202 need to be configured for publication to the service request catalog 216. The service delivery manager may receive that notification via any suitable means, such as a pop-up box provided on a display at a service provider GUI 126, an e-mail received at the service provider GUI 126 and/or a smartphone, or a short message service (SMS) text at a smartphone. That notification may include a link that, when selected, navigates the service delivery manager to the functionality of the UI wizard, which may be accessed via the console portal 210.

At step 704, the service delivery manager may utilize the UI wizard to configure which of the cloud IT services and service offerings of the CITS Container 202 to offer to service consumers via the service request catalog 216. For example, the CITS Container 202 that has been, or is being, plugged in to the CITS Console 200 may support a plurality of different service offerings and/or a plurality of different service offerings for a particular service. Accordingly, rather than having all of the user-facing interfaces for all of those services and/or service offerings published to the service request catalog 216, the service delivery manager may designate which of those user-facing interfaces will be published to the service request catalog 216. By way of more specific example, the service delivery manager may designate an entire service at step 704 so that the user-facing interfaces for all of the service offerings that correspond to the designated service are published to the service request catalog at step 716, or the service delivery manager may designate individual service offerings for a particular service at step 704 so that only the user-facing interfaces for those individual service offerings are published to the service request catalog at step 716.

At step 706, the service delivery manager may establish the pricing for each of the service offerings designated at step 704. The service delivery manager may establish the pricing for each of the different service offerings based on the performance parameters that may be utilized to implement each of those service offerings as well as the sizing information. For example, the service delivery manager may establish higher prices for a particular service offering at step 706 based on certain performance parameters when those performance parameters and the corresponding the sizing information require a greater number of resources to support that particular service offering, and the service delivery manager may establish lower prices for a particular service offering at step 706 based on certain performance parameters and sizing information when those performance parameters require fewer resources to support that particular service offering. By way of more specific example, the service delivery manager may establish different levels of monthly charges for different amounts of storage and different levels of security that are available for different service offerings for a data management service. The service delivery manager also may establish pricing based on other factors, such as differences between the service consumers to whom the service offering will be presented via the service request catalog 216.

Although step 706 is described as being performed by the service delivery manager, it should be understood that step 706 also could be performed by another user, such as accounting and/or marketing personnel at the cloud IT service provider. For example, workflows in the SO template 230 may route the pertinent information to that other user as part of step 706, or that information may be provided by that other user as it is created and stored in the local registry database 124 for subsequent retrieval at step 706. Accordingly, step 706 may include notifying personnel in the accounting and/or marketing departments of the cloud IT service provider that their input and/or approval is required for certain pricing information. Such approval may be obtained, for example, at step 714, or at any other time before the resulting user-facing interfaces are published to the service request catalog 216 at step 716.

At step 708, the service delivery manager may utilize the UI wizard to configure which performance parameters are made available for selection by service consumers via the service request catalog 216. For example, the service delivery manager may designate various pricing (e.g., monthly costs, service credits, etc.), service details (e.g., level(s) of approval, data architecture(s), claim approval process(es), etc.), service metrics (e.g., service volume, service quality, service availability, etc.), and resource details (e.g., physical parameters such as the number of CPUs and amount of RAM, operational parameters such as processing speeds and connection speeds, operating system platform, etc.) for selection by a service consumer so that a CITS delivery solution that satisfies all of those performance parameters may be implemented based on those selections. By way of more specific example, the service delivery manager may designate different, predefined combinations of performance parameters for different service offerings at step 708 so that the resulting combinations have different prices and the service consumer may select from those different combinations, or packages, based on those predefined performance parameters, such as by selecting the price associated with a particular combination. Or the service delivery manager may designate different performance parameters for selection by the service consumer so that the service consumer can define a custom combination of performance parameters by selecting those performance parameters from among a plurality of different options, such as by selecting a performance parameters from different pull-down menus.

In the latter example of step 708, the price of the resulting combination of performance parameters may change as the service consumer selects the various performance parameters that are to be used to implement the subject CITS Container 202. And in both examples of step 708, the SO template 230 may abstract the underlying technology away from the service consumer so that the service consumer is not aware of the actual product(s) and/or application(s) being utilized to provide a particular service offering. In other words, the CMC Service 212 may implement a CITS Container 202 based on the combination of performance parameters selected at step 806 without the service consumer knowing which CITS Container 202, which processes or process sets 228, and/or which resources (e.g., network devices 118-126, payloads 208, external resources 304, etc.) are being utilized to provide a particular cloud IT service and/or service offering.

The performance parameters that are available for configuration at step 708 correspond to the CITS Containers 202, processes or process sets 228, and resources that will actually be utilized to provide each cloud IT service and/or service offering published to the service request catalog 216. Those performance parameters may be made available for configuration via the UI wizard at step 708 as each CITS Container 202 is implemented at steps 602-612. Accordingly, the performance parameters that are available for configuration at step 708 may correspond to the CITS Containers 202, processes or process sets 228, and resources that actually are available for deployment, as they become available for deployment. That deployment occurs as part of the container execution process 800 depicted in FIG. 8.

As described above, different service consumers may have different levels of sophistication and/or different types of needs. Accordingly, at step 708, the service delivery manager may select greater or fewer options to be published to service request catalog 216 based on those different levels of sophistication and/or different types of needs. For example, for a more sophisticated service consumer, the service delivery manager may utilize the UI wizard at step 708 to allow that service consumer to select from a large number of different performance parameters, while for a less sophisticated service consumer, the service delivery manager may utilize the UI wizard at step 708 to prevent the service consumer from being able to select any performance parameters other than pricing. In the latter example, the service consumer would only be allowed to select the type of cloud IT service and/or or service offering based on predefined combinations of performance parameters, including pricing.

At step 710, the service delivery manager may configure the appearance of the various user-facing interfaces that are utilized in the service request catalog 216 to present to service consumers the different cloud IT services, service offerings, and/or performance parameters that are configured for selection by the service delivery manager at steps 704 and 708. For example, the service delivery manager may choose different fonts, colors, icons, verbiage, and other graphical information to present different cloud IT services, service offerings, and/or performance parameters to service consumers via the service request catalog 216. Although that graphical information may be defined by the SO template 230 to ensure that the functionality of the resulting user-facing interfaces integrates properly with the CITS Console 200, certain custom information also may be uploaded via the UI wizard for use with the SO template 230 without compromising that integration. For example, custom fonts, colors, icons, and images may be uploaded via the UI wizard for use with the SO template 230.

Although step 710 is described as being performed by the service delivery manager, it should be understood that step 710 also could be performed by another user, such as graphic design and/or marketing personnel at the cloud IT service provider. For example, workflows in the SO template 230 may route the pertinent information to that other user as part of step 710, or that information may be provided by that other user as it is created and stored in the local registry database 124 for subsequent retrieval at step 710. Accordingly, step 710 may include notifying personnel in the graphic design and/or marketing departments of the cloud IT service provider that their input and/or approval is required for the appearance of certain information. Such approval may be obtained, for example, at step 714, or at any other time before the resulting user-facing interfaces are published to the service request catalog 216 at step 716.

As also described above, the UI wizard provides functionality for a service delivery manager to determine which options are provided to the service consumer for selection via the service request catalog 216 on a service-by-service and/or consumer-by-consumer basis. Accordingly, at step 712, the service delivery manager may set the entitlements to the corresponding user-facing interfaces so that only certain options are presented to certain users. For example, the same cloud IT services and/or service offerings may be offered to different service consumers, but based on the entitlements established at step 710, those different service consumers may be presented with different performance parameters to select from and/or different levels of pricing for each of those different performance parameters. By way of more specific example, a more sophisticated service consumer may be entitled to select different performance parameters different service offerings from the service request catalog 216 at step 804, while a less sophisticated service consumer may only be able to select between those different service offerings at step 804. Further, the same service offerings, with all other performance parameters being the same, may be published to the service request catalog 216 with different pricing for different service consumers.

Also at step 710, the service delivery manager may set the entitlements, accesses, and other privileges that determine which users may implement, manage, and/or modify the CITS Container 202 that has been, or is being, plugged in to the CITS Console 200. Similar to the manner in which the service delivery manager may designate which user-facing interfaces are presented to service consumers via the service request catalog 216, the service delivery manager may set the entitlements, accesses, and other privileges that determine which user-facing interfaces, if any, for implementing, managing, and/or modifying a particular CITS Container 202 are presented to different users via the console portal 210. For example, the service delivery manager may authorize the solution administrator and/or a service administrator at the cloud IT service provider to implement, manage, and/or modify a particular CITS Container 202, while denying others access to that functionality of the CMC Service 212.

Although step 712 is described as being performed by the service delivery manager, it should be understood that step 712 also could be performed by another user, such as the solution administrator or a service administrator at the cloud IT service provider. For example, workflows in the SO template 230 may route the pertinent information to that other user as part of step 712, or that information may be provided by that other user as it is created and stored in the local registry database 124 for subsequent retrieval at step 712. Accordingly, step 712 may include notifying or a service administrator at the cloud IT service provider that their input and/or approval is required for certain entitlements, accesses, and other privileges. Such approval may be obtained, for example, at step 714, or at any other time before the resulting user-facing interfaces are published to the service request catalog 216 at step 716.

At step 714, approval may be obtained for each of the user-facing interfaces configured at steps 704-710, as well as for the entitlements, accesses, and other privileges set at step 712. For example, if the service delivery manager performs each of steps 704-710, one or more different departments at the cloud IT service provide may be notified at step 714 that their approval is required of the corresponding aspects of the proposed publication. By way of more specific example, the accounting department may be notified at step 714 that their approval is required for the pricing established at step 706, the marketing department may be notified at step 714 that their approval is required for the graphical information configured at step 710, and the service administrator may be notified at step 714 that approval is required for the entitlements, accesses, and other privileges set at step 712. In the alternative, and as discussed above, approval may be obtained from each of those departments and/or personnel at any time after those steps 706-710 are completed.

If approval is not obtained at step 714 (i.e., Step 714=No), the service offering publication process 700 may return to the step(s) that corresponds to the configuration(s) or entitlement(s) that require modification for approval, as depicted by the arrows extending from step 714 to each of steps 704, 706, 708, 710, and 712 in FIG. 7. Depending on which is repeated, other steps may also be repeated if approval is not obtained at step 714. For example, if new pricing is established by repeating step 706, it may be necessary to also repeat step 708 to account for that new pricing if the performance parameters previously configured at step 708 included that pricing. Or if the appearance of a user-interface needs to be reconfigured at step 710, it may not be necessary to repeat step 712 because the entitlements set at step 712 may not be dependent on or affected by the appearance of the user-facing interfaces previously configured at step 712. And if approval is obtained at step 714 (i.e., Step 714=Yes), the service offering publication process 700 proceeds to step 716.

At step 716, the user-facing interfaces configured at steps 704-710 are published to the service request catalog 216 based on the entitlements set at step 712. Accordingly, service consumers may be required to log on to the service provider system 104 at step 802 of the container execution process 800 to access those user-facing interfaces based on their particular entitlements, as depicted by off-page connector C in FIGS. 7 and 8. Thus, different service consumers may be presented with different user-facing interfaces, and therefore different cloud IT services, service offerings, and/or performance parameters, that correspond to their respective entitlements. Those service consumers then may select those different cloud IT services, service offerings, and/or performance parameters in a self-service manner at steps 804 and 806 of the container execution process 800.

Step 716 completes the implementation of a CITS Container 202 in a CITS delivery solution. Steps 602-612 of the container implementation and modification process 600 and steps 702-716 of the service offering publication process 700 may be repeated each time a CITS Container 202 is downloaded until all of the CITS Containers 202 required to support a particular CITS delivery solution have been downloaded and implemented, as depicted by the dashed-line box surrounding steps 602-612 in FIG. 6 and off-page connecter C' in FIGS. 6 and 7. That container implementation process may be performed as part of the solution model deployment process 500, or it may be performed independently of the solution model deployment process 500 after the CITS delivery solution has been launched by that process at step 528. In the latter instance, the service provider may be authenticated at step 614 before the process may begin.

Returning to FIG. 6, an authorized user (e.g., the solution administrator or a service administrator at the cloud IT service provider) may utilize the Container Editor Tool of the CMC Service 212 to modify a downloaded CITS Container 202 in a live environment, after it has been implemented. For example, a downloaded CITS Container 202 may initially comprise one or more processes or process sets 228 in the active pool 300 that define the complete capabilities of the cloud IT service or service offering supported by that CITS Container 202. And the CITS Container 202 may comprise zero or more processes or process sets 228 in the passive pool 302 that define additional or redundant cloud IT services or service offerings that may optionally be delivered by that CITS Container 202. Because that CITS Container 202 was downloaded from the solution provider system 102 at step 602, that CITS Container 202 and each of the processes or process sets 228 in each of its pools 300 and 302 will be registered as being supported by the CMC Service 212 in the global container registry that is maintained in the central registry database 102. Accordingly, the Dirty Bit/Support Bit in the CITS specification 224 is set to a default value of "supported," or "on," which represents the starting state of the CITS Container 202 when it is downloaded.

At step 616, an authorized user may modify the CITS Container 202 by switching, adding, and/or removing one or more processes or process sets 228 at the active pool 300 and the passive pool 302, which may be done by changing the state of those processes or process sets 228. Switching, adding, and/or removing one or more processes or process sets 228 at the active pool 300 and the passive pool 302 changes the capabilities of the cloud IT service or service offering supported by the CITS Container 202. In FIG. 3, for example, the authorized user may switch out the default first process or process set 228A for the alternative first process or process set 228A', such that the default first process or process set 228A is moved to the passive pool 302 (i.e., the state of the default first process or process set 228A is changed to "inactive") and the alternative first process or process set 228A' is moved to the active pool 300 (i.e., the state of the alternate first process or process set 228A' is changed to "active"). Or the authorized user may add the additional process or process set 228D into the active pool 300 (i.e., the state of the additional process or process set 228D is changed to "active") to provide an additional, different service. Such modifications may be performed in a live environment, without compromising the integrity of the CITS Container 202.

Also at step 616, an authorized user may create and/or modify one or more processes or process sets 228, rather than switching processes or process sets 228 between pools 300 and 302 and/or adding processes or process sets 228 from the passive pool 302 to the active pool 300. To maintain the integrity of the CITS Container 202 in the live environment, however, processes or process sets 228 may not be modified in the active pool 300. Thus, to modify a process or process set 228 that currently is in the active pool 300, the authorized user must first move that process or process set 228 to the passive pool 302 by changing the state of that process or process set 228 to "inactive." In the alternative, the authorized user may upload, or copy, a redundant instance of the same process or process set 228 to the passive pool 302 so that the corresponding process or process set 228 need not be removed from the active pool 300, thereby preventing the disruption of the service supported by that process or process set 228. Accordingly, such modifications also may be performed in a live environment, without compromising the integrity of the CITS Container 202.

The authorized user may create and/or modify one or more processes or process sets 228 with the Container Editor Tool, which supports operations for copying, modifying, or creating new processes or process sets 228 in the passive pool 302. Accordingly, the authorized user may modify an existing process or process set 228 or create a new process or process set 228 from scratch when a CITS Container 202 that suits the cloud IT service provider's needs is not available for download from the solution provider system 102. In response to the creation and/or modification of a process or process set 228, the Container Editor Tool writes a new, unregistered container GUID to the CITS specification 224 because the subject CITS Container 202 comprises a new and/or modified process or process set 228 that has not yet been determined to be supported.

In response to any type of modification (e.g., switching, adding, removing, modifying, or creating processes or process sets 228), the Container Editor Tool also generates a log of those modifications and writes that log to the CITS specification 224, together with the current state of the CITS Container 202. That modification log may be queried by the CMC Service 212 to identify specific modifications to a CITS Container 202 and when they were made. Such a log may be utilized by the solution administrator when determining whether a modification is approved for operation in the CITS Console 200 at step 626.

At step 618, the CMC Service 212 determines if the modification performed at step 616 is supported. If the processes or process sets 228 already provided in a registered CITS Container 202 were switched, added, and/or removed to/from the active pool 300 at step 616, the modification is determined to be supported at step 618 (i.e., Step 618=Yes). But if processes or process sets 228 were created and/or modified at step 616, those new processes or process sets 228 will be determined to be unsupported at step 618 (i.e., Step 618=No). Thus, the Container Editor Tool toggles the Dirty Bit/Support Bit in the CITS specification 224 to "unsupported," or "off," at step 620 when a process or process set 228 is modified and/or created at step 616, while switching, adding, and/or removing processes or process sets 228 already provided in a registered CITS Container 202 to/from the active pool 308 at step 616 does not affect the Dirty Bit/Support Bit, which remains set to the default value of "supported," or "on," at step 620 after such a container modification.

Toggling the Dirty Bit/Support Bit to "unsupported," or "off," at step 620 represents that the subject process or process set 228 has not been approved for operation with the CITS Console 200. Nevertheless, the authorized user may add that modified process or process set 228 to the active pool 300 at step 616. The addition of such an unsupported process or process set 228 to the active pool 300, however, may compromise the integrity of the CITS Container 202. Accordingly, the authorized user also may leave the modified process or process set 228 in the passive pool 302 and upload an instance of the modified CITS Container 202 to the solution provider system 102 at step 622 for testing, certification, and support approval.

At step 624, a new or modified process or process set 228 is moved to the active pool 300 by changing its state to "active" in the uploaded instance of the CITS Container 202, and it is tested for problems. After any problems are identified and resolved, the new or modified process or process set 228 may be certified for use with the CITS Container 202 and approved for operation with the CITS Console 200. The corresponding CITS Container 202 then is registered in the global registry at step 626 to indicate that the processes or process sets 228 of that CITS Container 202 have been certified and approved. Such registered CITS Containers 202 are identified in the global registry with unique container GUIDs. Then, after the CITS Containers 202 with the modified process or process set 228 is registered at step 626, the authorized user may switch and/or add that process or process set 228 to the active pool 300 of the live instance of the corresponding CITS Container 202 without compromising the integrity of that CITS Container 202, and without interrupting the services that are supported by the live instance of that CITS Container 202.

Even though switching and/or adding processes or process sets 228 to the active pool 300 in registered CITS Containers 202 does not affect the Dirty Bit/Support Bit in the CITS specification 224, such a modification changes the content of the CITS Container 202. Accordingly, the modified CITS Container 202 also may be registered with the solution provider system 102 at step 626 when a modification is determined to be supported at step 618. Such modified CITS Containers 202 may be registered both in the local registry maintained in the local registry database 124 and the global registry maintained in the central registry database 114 so that the solution provider system 102 may track such modifications, which allows the solution administrator to update their default processes or process sets 228 in response to the modifications being made in the field. The registration of CITS Containers 202 with new or modified processes or process sets 228 at step 626 supports similar tracking.

Being able to switch, add, remove, modify, and/or create processes or process sets 228 enables cloud IT service providers to flexibly change the capabilities of a CITS Container 202 in a self-service manner. And being able to perform such modifications on processes or process sets 228 in a passive pool 302 enables cloud IT perform those modifications in a live environment without compromising the integrity of the CITS Container 202 or the service supported by that CITS Container 202. Moreover, registering those modifications with the solution provider system 102 supports the development and proliferation of enhancements of to cloud IT services provided by such CITS Containers 202. In addition, by encompassing multiple switchable, processes or process sets 228 in a single CITS Container 202, a cloud IT service provider may modify a cloud IT service being delivered by a CITS Container 202 on the fly without having to re-test all the services that may be affected by the change, thus saving time, avoiding costly delays, costs and custom implementations.

To provide additional flexibility, different container operations may be created and/or modified for a particular CITS Container 202 in a similar manner to that described above with respect to modifying and/or creating processes or process sets 228 (e.g., Steps 616-620). Further, those new and/or modified operations may be uploaded, tested, and registered with the solution provider system 102 in a similar to that describe above with respect to processes or process sets 228 (e.g., Steps 622-626). Registering new and/or modified container operations in that manner further prevents compromising the integrity of a CITS Container 202 while, at the same time, enabling flexibility of design. And although the modifications described above were performed with the CITS Container 202 in an "active" state after the cloud IT services or service offerings of that CITS Container 202 have been published to the service request log 216 at step 716 of the service offering publication process 700, they also may be performed with the CITS Container 202 in an "inactive" state, before the cloud IT services or service offerings of that CITS Container 202 have been published to the service request catalog 216 at step 716 of the service offering publication process 700.

For example, rather than modifying a CITS Container 202 in a live environment, after the supported cloud IT services or service offerings have been published to the service request catalog 216 at step 716 of the service offering publication process 700, steps 614-626 may be performed any time after the subject CITS Container 202 has been instantiated at step 604, as depicted by the arrow that generally connects step 614 to the dashed-line box around steps 602-612 in FIG. 6. Performing such modifications before the supported cloud IT services or service offerings have been published to the service request catalog 216 may be advantageous, for example, when the core functionality of the subject CITS Container 202 is being modified. In that way, the services or service offerings that are affected by that core functionality will not be available for consumption by service consumers while those modifications are being performed. And to prevent service interruptions, a duplicate instance of the subject CITS Container 202 may be downloaded to the CITS Console 200 so that the services or service offerings of that duplicate instance of the CITS Console 200 may be published to the service request catalog 216 and selected and used by service consumers while the core functionality of the other instance of that CITS Container 202 is being modified.

Regardless of whether a CITS Container 202 is modified before or after its cloud IT services or service offerings have been published to the service request catalog at step 716 of the service offering publication process 700, that modified CITS Container 202 must be re-instantiated at step 604 for the modification to be enabled for run-time execution, as depicted by the arrow extending from step 626 to step 604 in FIG. 6. As discussed above, such modifications result in new container GUIDs being written to the CITS specification 224. For example, modifying the core functionality of a CITS Container may result in a new container GUID being written to the CITS specification 224, and modifying a process or process set 228 may result in a new process GUID being written to the CITS specification 224. Accordingly, a CITS Container 202 must be re-instantiated at step 604 after being modified so that its CITS specification 224 may be updated in the context of the CITS delivery solution in which it is being implemented.

A modified CITS Container 202 may be re-instantiated at step 604 and enabled for run-time execution regardless of whether the subject modifications are registered via steps 622-626. For example, an authorized user may modify a CITS Container 202 at step 616 by adding a certified and approved process or process set 228 to the active pool 300 of that CITS Container 202. Because that process or process set 228 already is certified and approved for use in the CITS Console 200 and CITS Container 202, the Dirty Bit/Support Bit of that CITS Container 202 remains set to the default value of "supported," or "on," at step 620. Thus, that CITS Container 202 also may be re-instantiated at step 604 and enabled for run-time execution after step 620, as depicted by the dashed-line arrow extending from step 620 to step 604 in FIG. 6. Similarly, a CITS Container 202 that has its Dirty Bit/Support Bit toggled to "unsupported," or "off," at step 620 because it contains an unapproved modification also may be re-instantiated at step 604 and enabled for run-time execution. As described above, however, implementing such unapproved modifications may compromise the integrity of that CITS Container 202 or the CITS Console 200.

A CITS Container 202 is enabled for run-time execution by at least performing steps 706-716 of the service offering publication process 700 after that CITS Container 202 is re-instantiated at step 604. For example, a CITS Container 202 may have been modified at steps 616-626 in a live environment such that all of the payloads 208 required to support the cloud IT services or service offerings of that CITS Container 202 already have been downloaded, instantiated, configured, and tested at steps 606-612. Thus, when that CITS Container 202 is re-instantiated at step 604, it may be enabled for run-time execution by configuring the user-facing interfaces at steps 702-710 to determine what will be published to the service request catalog 216 at step 716 and by setting the entitlements to the corresponding cloud IT services, service offerings, and/or performance parameters at step 712 to determine which of those cloud IT services, service offerings, and/or performance parameters will be accessible certain service consumers when they are published to the service request catalog 216 at step 716.

Steps 606-612 also may be performed, for example, if the modifications to the CITS Container 202 performed at step 616 require different payloads 208 to be downloaded and instantiated at steps 606 and 608, respectively and/or different connections to be made and tested at steps 610 and 612, respectively. Accordingly, steps 606-612 may be performed again after such modifications are made, as depicted by the arrow extending from step 626 to step 604 in FIG. 6. And after the cloud IT services or service offerings of a CITS Container 202 are published to the service request catalog 216 at step 716 of the service offering publication process 700, the corresponding service or service offering may be selected for consumption by a service consumer in a self-service manner via the container execution process 800 of FIG. 8.

Figure 8:
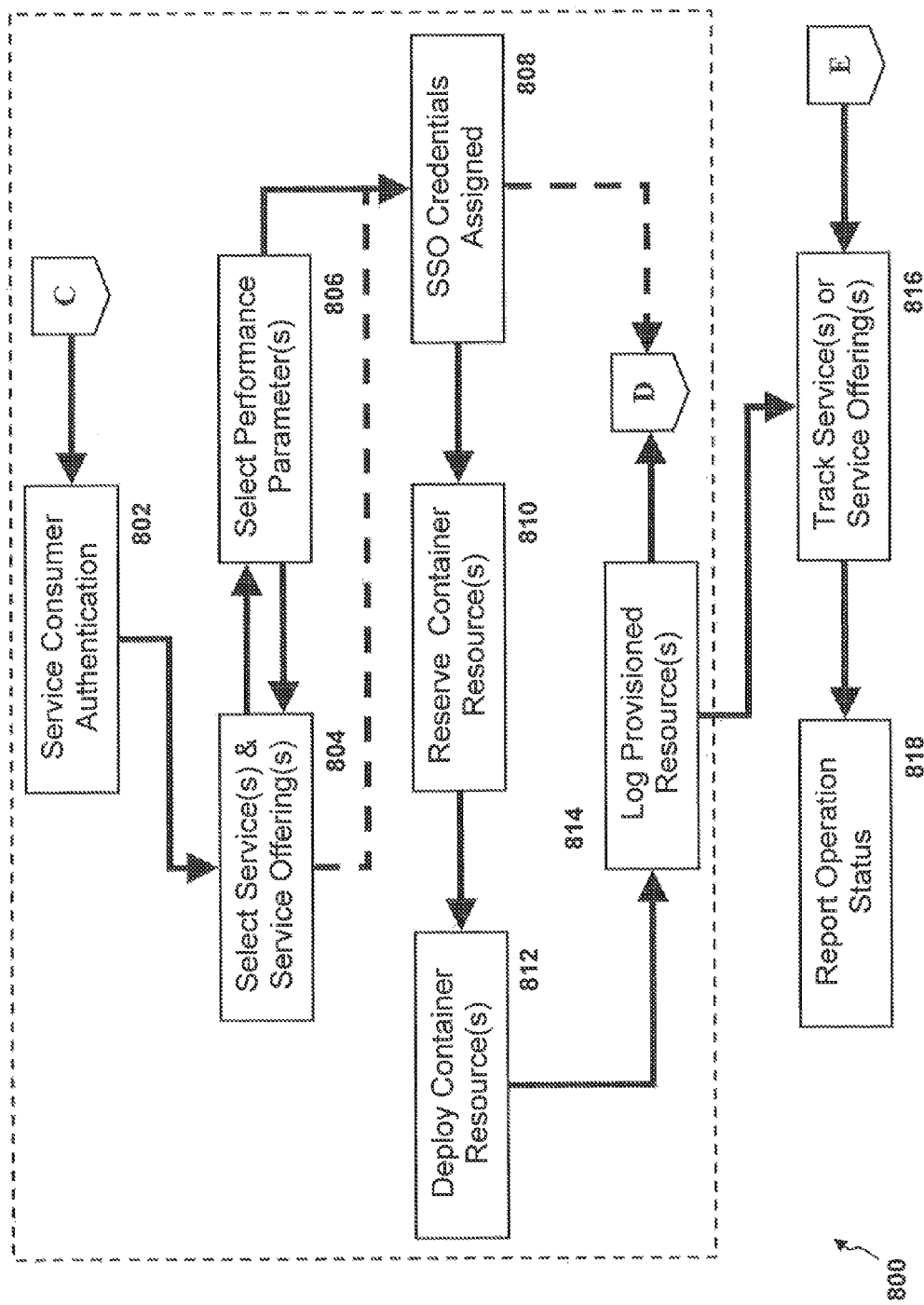
FIG. 8 is a flow diagram illustrating and example of a container execution process according to a non-limiting embodiment of the present disclosure.

Turning to FIG. 8, at step 802 of the container execution process depicted therein, a service consumer and/or a service provider logs onto the service provider system 104 and is authenticated via the user authentication capability of the CITS Console 200. While step 614 of the container implementation and modification process 600 is utilized to authenticate service providers that are authorized to download, modify, and/or execute CITS Containers 202 via the CMC Service 212 after the CITS delivery solution has been launched at step 528 of the solution model deployment process 500, step 802 is utilized to authenticate service consumers that are authorized to select and consume certain cloud IT services, service offerings, and/or performance parameters via the service request catalog 216 after a CITS Container 202 has been enabled for run-time execution by performing steps 602-612 of the container implementation and modification process 600 and steps 706-716 of the service offering publication process 700. Based on the authentication performed at step 802, different cloud IT services, service offerings, and/or performance parameters may be presented to different consumers in the service request catalog 216 such that only certain users may select and consumer certain services, service offerings, and/or performance parameters.

At step 804, a service consumer may select from among the cloud IT services and/or service offerings that are presented to that service consumer in the service request catalog 216 based on that service consumer's entitlements. The subject cloud IT services and/or service offerings may be displayed to the service consumer at a service consumer GUI (not shown) in accordance with the user-facing interfaces created utilizing the UI wizard and the SO template 230 of the CITS Container 202 that supports the corresponding cloud IT services and/or service offerings. And the service consumer may invoke that user-facing interface by clicking on or otherwise selecting a particular cloud IT service and/or service offering with an input device (e.g., a keyboard, a mouse, etc.) at that service consumer GUI.

In a similar manner, at step 806, a service consumer may select from among the performance parameters that are presented to that service consumer in the service request catalog 216 based on that service consumer's entitlements. For example, a service consumer may select various service metrics that are desired for a particular service offering, such throughput, packet loss, latency, and jitter, which may be selected individually or as part of predefined QoS levels or constraints (e.g., Set/Get_QoS). A service consumer also may select a plurality of different service metrics and/or QoS levels (e.g., bronze, silver, gold, etc.) for a plurality of different users so that those different users may be subject to different performance constraints based on different criteria, such as user ID, group ID, tenant ID, or the targeted resource. Run-time routing for each QoS level (e.g., Set_QoS_Route) also may be selected at step 806.

As described above, however, a service consumer's entitlements may not allow the selection of any performance parameters. Instead, a less sophisticated service consumer may only be allowed to select from among predefined combinations, or packages, of performance parameters for particular cloud IT services and/or service offerings. In that instance, step 806 may be skipped, as depicted by the dashed-line arrow extending from step 804 to step 808 in FIG. 8. And in either instance, one or both of steps 804 and 806 may be repeated by a service consumer as many times as required to select the cloud IT services or service offerings that they would like to consume, as depicted by the arrows extending to and from steps 804 and 806 in FIG. 8.

The accesses and routing that result from the selections made at steps 804 and 806 may be controlled via the console portal 210. And at step 808, SSO credentials may be assigned to different users at a service provider system 104 and/or different service consumers based on the different accesses those users are to have to different cloud IT services or service offerings. The service provider's preferences for those SSO credentials may be gathered at step 502, as discussed above. As also discussed above, however, some CITS Containers 202 may not depend on any external resources, other than the aggregated set of common capabilities 222 of the CITS Console 200, in which case steps 810-814 may be skipped, as depicted by the dashed-line arrow extending from step 808 to off-page connector D in FIG. 8.

At step 810, the resource reservation capability of the CITS Console 200 is invoked to create reservations for the resources utilized by the cloud IT services and/or service offerings selected at step 804. For example, the orchestration engine 214 may invoke an orchestration workflow to operate on the logical resources of the corresponding CITS Container 202, such as a logical virtual machine and a logical disk to create the reservation for the physical implementations of those logical resources. The physical implementations of those logical resources may comprise, for example, a product (e.g., a VM manager) and an appliance (e.g., a disk manager), respectively. Those resources are reserved in the quantities determined at step 506 of the solution model deployment process 500.

At step 812, the resources reserved at step 810 are deployed for use by a CITS Container 202 that supports the selected cloud IT service or service offering. The CITS Container 202 is configured to communicate with each of those resources at step 610 of the container implementation and modification process 600. For example, when the resources upon which a CITS Container 202 depends are provided by a third-party resource provider as external resources 304, those resources may have been configured at step 610 of the container implementation and modification process 600 by physical commands sent to the third-party resource providers that maintain those external resources 304. Similar commands may be sent to resources at step 812 to initiate them for run-time execution.

At step 814, the results of the commands sent at step 812 (e.g., "completed" or "failed") are logged by the log management capability of the CITS Console 200. Also logged by log management capability of the CITS Console 200 are the specific resource allocations initiated at step 812. Those resource allocations may be written to the solution specification before launching the CITS delivery solution at step 528 of solution model deployment process 500, as depicted by the off-page connector labeled D in FIGS. 5 and 8. And after the CITS delivery solution is launched at step at step 528 of the solution model deployment process 500, the accounting capability of the CITS Console 200 may begin tracking the cloud IT services and/or service offerings being delivered to a particular service consumer at step 816 of the container execution process 800, as depicted by off-page connector E in FIGS. 5 and 8.

Also after the CITS delivery solution is launched at step 528 of the solution model deployment process 500, the factory portal 400 may continue gathering sizing information and personalization information while that CITS delivery solution is up and running, and the sizing tool 402 may determine that a different quantity of one or more resources is required to provide the service level requested by the service provider based on any changes in that sizing information, that personalization information, or the reference values for those resources (e.g., Scale_Up or Scale_Down). For example, a server's processing capacity may be reduced if that server is bogged down with other processes not related to the CITS delivery solution, or a service provider may request a different service level after the CITS delivery solution is launched at step 528. Accordingly, steps 502-528 of the solution model deployment process 500, as well as the corresponding steps of the container implementation and modification process 600 and the container execution process 800, may be repeated in a continuous loop, as depicted by the arrow extending from step 528 back to step 502 in FIG. 5. That functionality allows the solution factory of the solution servers 108 to dynamically respond to changes in the CITS delivery solution and/or a service provider's preferences as the CITS delivery solution is being delivered.

At step 816, the accounting capability of the CITS Console 200 tracks the cloud IT services and/or service offerings being delivered to a particular service consumer and provides an accounting of those services. For example, chargeback amounts are calculated by invoking logical resource costing operations to determine the amount of services a service provider's tenant is consuming and the correspond costs associated with that consumption. Accordingly, service consumers may only be charged for certain services as they are consumed, in a self-service manner.

At step 818, the status of whether the preceding operations were successful or failed is reported back to the service consumer together with resource information for performing further operations. If each required resource was initiated at step 812 and is being logged and tracked at step 816, the operations are determined to be successful and the container execution process 800 is concluded. A successful status report at step 818 also may conclude the solution model deployment process 500.

As will be understood from the foregoing examples, the disclosed CITS Console 200 and CITS Containers 202 are configured to operate together to provide a hybrid cloud solution with one or more cloud IT services or service offerings. The resulting CITS delivery solution is flexible and modularly expandable by the addition or removal of different CITS Containers 202 to the CITS Console 200 and/or by the addition or removal of different processes or process sets 228 to one or more CITS Cartridges 202. The CITS Containers 202 may connect to and/or operate via the aggregated set of common capabilities 222 of the CITS Console 200 as well as carry or refer to other resources, such as payloads 208, upon which the cloud IT services or service offerings of a CITS Container 202 may depend.

The CITS Console 200 provides the foundational framework for advanced, granular management and control of the CITS Containers 202 and their corresponding processes or process sets 228, thereby enabling higher level operations to be performed on a container-by-container basis, such as listing services, setting entitlements, tracking consumer activity across a service, downloading/uploading containers, metering usage, etc. Further, the CITS Console 200 provides service providers and, therefore, their tenants with access to a large number or types of cloud IT services or service offerings that may be delivered via a reference model based on automatically instantiated CITS Containers 202 and payloads 208. Such CITS Containers 202 and payloads 208 may be developed for any type of cloud IT services and, therefore, the disclosed embodiments are not restricted to any particular service, vendor, or product.

Further, the schematic and flow diagrams in FIGS. 1-8 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. In FIGS. 5-8, for example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, although each of the process steps 502-528, 602-626, 702-716, and 802-818 depicted in FIGS. 5-8 is described as being performed on or by specific apparatuses or modules depicted in FIGS. 1-4, it should be understood that those process steps 502-528, 602-626, 702-716, and 802-818 are not limited to being performed by those specific apparatuses or modules. Instead, the foregoing descriptions of the solution model deployment process 500, the container implementation and modification process 600, and the container execution process 800 are intended to be illustrative only, and the references to specific apparatuses or modules are solely for the purpose of that illustration. Thus, it should be understood that the process steps 502-528, 602-626, 702-716, and 802-818 depicted in FIGS. 5-8 also may be performed by any other suitable apparatus and/or module.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   downloading, by one or more processors, a service delivery container that, as downloaded, comprises:
   a service offering template that comprises a plurality of user-facing interfaces,
   one or more processes that are configured to provide a cloud-based service via a plurality of resources,
   a container specification that specifies payloads that are required to implement the cloud-based service, and
   automation scripts configured to download and configure the payloads:
   configuring, by the one or more processors based on first input received via a console, a plurality of different combinations of performance parameters of the plurality of resources, the console being configured to provide a plurality of other cloud-based services via other service delivery containers;
   publishing, by the one or more processors, the plurality of user-facing interfaces downloaded with the service delivery container to a service request catalog as a plurality of different service offerings, the plurality of different service offerings corresponding to different levels of the cloud-based service that may be provided using the one or more processes downloaded with the service delivery container based on the plurality of different combinations of performance parameters for the cloud-based service;

selecting, by the one or more processors and based on a received second input via the console, one of the plurality of different combinations of performance parameters for one of the plurality of service offerings from the service request catalog; and initiating, by the one or more processors, the cloud-based service in a manner that corresponds to the selected one of the plurality of different combinations of performance parameters, wherein the initiating the cloud-based service comprises using the automation scripts downloaded with the service delivery container to download and configure the payloads that are required to implement the cloud-based service in the manner that corresponds to the selected one of the plurality of different combinations of performance parameters.

2. The method of claim 1, further comprising:

setting different entitlements that determine which of a plurality of users can access which of the plurality of different service offerings;

publishing a first user-facing interface to the service request catalog when the service request catalog is accessed with a first entitlement; and publishing a second user-facing interface to the service request catalog when the service request catalog is accessed with a second entitlement, wherein the first user-facing interface and the second user-facing interface correspond to a first service offering and a second service offering from among the plurality of different service offerings.

3. The method of claim 2, wherein:

configuring the plurality of different combinations of performance parameters comprises configuring, based on the first input, at least one of the plurality of different combinations of performance parameters to comprise a plurality of options for at least one of the plurality of performance parameters;

the method further comprises:

receiving the first input and the second input via the console, and receiving third input via the console to select one of the plurality of options for the at least one of the plurality of performance parameters; and initiating the cloud-based service in the manner that corresponds to one of the plurality of different combinations of performance parameters comprises initiating the cloud-based service in a manner that corresponds to the selected one of the plurality of options.

4. The method of claim 3, wherein receiving first input via the console comprises receiving first input to select different combinations of service level and pricing.

5. The method of claim 3, wherein receiving first input via the console comprises receiving first input to select different combinations of numbers of CPUs, amounts of memory, and pricing.

6. The method of claim 1, wherein the service delivery container is configured to be activated and deactivated by the console to provide and not provide the cloud-based service, respectively.

7. The method of claim 6, further comprising:

installing the console on a computer comprising a processor; and establishing a connection between the console and the resources that may be used to provide the cloud-based service.

8. A computer program product comprising a non-transitory computer readable storage medium having computer readable program code stored thereon that is executable by a computing system to perform operations comprising:

downloading a service delivery container that, as downloaded, comprises:

a service offering template that comprises a plurality of user-facing interfaces, one or more processes that are configured to provide a cloud-based service via a plurality of resources, a container specification that specifies payloads that are required to implement the cloud-based service, and automation scripts configured to download and configure the payloads;

configuring, based on first input received by a console, a plurality of different combinations of performance parameters of the plurality of resources, the console being configured to provide a plurality of other cloud-based services via other service delivery containers;

publishing the plurality of user-facing interfaces downloaded with the service delivery container to a service request catalog at the console as a plurality of different service offerings, the plurality of different service offerings corresponding to different levels of the cloud-based service that may be provided using the one or more processes downloaded with the service delivery container based on a plurality of different combinations of performance parameters that correspond to the performance of resources that may be used to provide the cloud-based service; and initiating the cloud-based service in a manner that corresponds to one of the plurality of different combinations of performance parameters for one of the plurality of service offerings when that one of the plurality of service offerings is selected from the service request catalog with second input received via the console, wherein:

initiating the cloud-based service comprises using the automation scripts downloaded with the service delivery container to download and configure the payloads that are required to implement the cloud-based service in the manner that corresponds to one of the plurality of different combinations of performance parameters.

9. The computer program product of claim 8, further comprising computer-readable program code configured to set different entitlements for the plurality of different service offerings that determine which of a plurality of users can access which of the plurality of user-facing interfaces so that at least one of the corresponding plurality of user-facing interfaces is published to the service request catalog when the service request catalog is accessed with a first entitlement and the at least one of the plurality of user-facing interfaces is not published to the service request catalog when the service request catalog is accessed with a second entitlement.

10. The computer program product of claim 9, wherein:

the computer-readable program code configured to configure the plurality of different combinations of performance parameters is configured to, based on the first input, configure at least one of the plurality of different combinations of performance parameters to comprise a plurality of options for at least one of the plurality of performance parameters;

the computer program product further comprises:

computer-readable program code configured to receive the first input via the console, computer-readable program code configured to receive the second input via the console, and
computer-readable program code configured to receive third input via the console to select one of the plurality of options for the at least one of the plurality of performance parameters; and
the computer-readable program code configured to initiate the cloud-based service is configured to initiate the cloud-based service in a manner that corresponds to the selected one of the plurality of options.

11. The computer program product of claim 8, wherein:
the performance parameters comprise a service level and pricing; and
the plurality of different combinations of performance parameters comprise different combinations of service level and pricing.

12. The computer program product of claim 8, wherein:
the performance parameters comprise a number of CPUs, an amount of memory, and pricing; and
the plurality of different combinations of performance parameters comprise different combinations of numbers of CPUs, amounts of memory, and pricing.

13. The computer program product of claim 8, wherein the service delivery container is configured to be activated and deactivated by the console to provide and not provide the cloud-based service, respectively.

14. The computer program product of claim 13, further comprising:
computer-readable program code configured to install the computer program product on the console; and
computer-readable program code configured to establish a connection between the console and the resources that may be used to provide the cloud-based service.

15. An apparatus comprising:
computer-readable program code; and
a processor that is configured to execute the computer-readable program code to perform the following:
 downloading a service delivery container that, as downloaded, comprises:
  a service offering template that comprises a plurality of user-facing interfaces,
  one or more processes that are configured provide a cloud-based service via a plurality of resources,
  a container specification that specifies payloads that are required to implement the cloud-based service, and
  automation scripts configured to download and configure the payloads;
 configuring, based on first input received via a console, a plurality of different combinations of performance parameters of the plurality of resources, the console being configured to provide a plurality of other cloud-based services via other service delivery containers;
 publishing the plurality of user-facing interfaces downloaded with the service delivery container to a service request catalog as a plurality of different service offerings, the plurality of different service offerings corresponding to different levels of the cloud-based service that may be provided using the one or more processes downloaded with the service delivery container based on a plurality of different combinations of performance parameters that correspond to the performance of resources that may be used to provide the cloud-based service; and
 initiating the cloud-based service in a manner that corresponds to one of the plurality of different combinations of performance parameters for one of the plurality of service offerings when that one of the plurality of service offerings is selected with second input received via the apparatus, wherein:
 initiating the cloud-based service comprises using the automation scripts downloaded with the service delivery container to download and configure the payloads that are required to implement the cloud-based service in the manner that corresponds to one of the plurality of different combinations of performance parameters.

16. The apparatus of claim 15, further comprising computer-readable program code configured to set different entitlements for the plurality of different service offerings that determine which of a plurality of users can access which of the plurality of user-facing interfaces so that at least one of the corresponding plurality of user-facing interfaces is published to the service request catalog when the service request catalog is accessed with a first entitlement and the at least one of the plurality of user-facing interfaces is not published to the service request catalog when the service request catalog is accessed with a second entitlement.

17. The apparatus of claim 16, wherein:
the computer-readable program code configured to configure the plurality of different combinations of performance parameters is configured to configure at least one of the plurality of different combinations of performance parameters to comprise a plurality of options for at least one of the plurality of performance parameters based on the first input;
the computer program product of the apparatus further comprises computer-readable program code configured to receive third input via the console to select one of the plurality of options for the at least one of the plurality of performance parameters; and
the computer-readable program code configured to initiate the cloud-based service is configured to initiate the cloud-based service in a manner that corresponds to the selected one of the plurality of options.

18. The apparatus of claim 15, wherein:
the performance parameters comprise a service level and pricing; and
the plurality of different combinations of performance parameters comprise different combinations of service level and pricing.

19. The apparatus of claim 15, wherein:
the performance parameters comprise a number of CPUs, an amount of memory, and pricing; and
the plurality of different combinations of performance parameters comprise different combinations of numbers of CPUs, amounts of memory, and pricing.

20. The apparatus of claim 15, wherein the service delivery container is configured to be activated and deactivated by the apparatus to provide and not provide the cloud-based service, respectively.

21. The apparatus of claim 20, wherein:
the apparatus further comprises computer-readable program code configured to install the plurality of service delivery containers on the apparatus; and
each of the plurality of service delivery containers comprises computer-readable program code configured to establish a connection between the apparatus and the resources that may be used to provide the cloud-based service.

* * * * *